(12) United States Patent
Matsuo

(10) Patent No.: US 7,010,677 B2
(45) Date of Patent: Mar. 7, 2006

(54) DATA PROCESSOR SPEEDING UP REPEAT PROCESSING BY INHIBITING REMAINING INSTRUCTIONS AFTER A BREAK IN A REPEAT BLOCK

(75) Inventor: Masahito Matsuo, Tokyo (JP)

(73) Assignee: Renesas Technology Corp., Tokyo (JP)

(*) Notice: Subject to any disclaimer, the term of this patent is extended or adjusted under 35 U.S.C. 154(b) by 460 days.

(21) Appl. No.: 09/921,554

(22) Filed: Aug. 6, 2001

(65) Prior Publication Data

US 2002/0133692 A1    Sep. 19, 2002

(30) Foreign Application Priority Data

Feb. 2, 2001    (JP)    ............................... 2001-027416

(51) Int. Cl.
    *G06F 9/40* (2006.01)
(52) U.S. Cl. ..................... 712/241; 712/233; 712/244
(58) Field of Classification Search ................ 712/241, 712/233, 244
    See application file for complete search history.

(56) References Cited

U.S. PATENT DOCUMENTS

| | | | | |
|---|---|---|---|---|
| 5,752,015 A | * | 5/1998 | Henry et al. ................. | 712/241 |
| 5,901,301 A | | 5/1999 | Matsuo et al. | |
| 6,079,008 A | * | 6/2000 | Clery, III ....................... | 712/11 |
| 6,085,315 A | * | 7/2000 | Fleck et al. .................. | 712/241 |
| 6,263,489 B1 | * | 7/2001 | Olsen et al. ................. | 717/129 |
| 6,345,357 B1 | * | 2/2002 | Sato ........................... | 712/241 |

FOREIGN PATENT DOCUMENTS

JP    9-237186    9/1997

OTHER PUBLICATIONS

The American Heritage College Dictionary, 2002, Houghton Mifflin, 4$^{th}$ Edition, p. 751—"jump".*
The Authoritative Dictionary on IEEE Standards Terms, 2000, IEEE press, 7$^{th}$ Edition, p. 17—"address".*

* cited by examiner

*Primary Examiner*—William M. Treat
(74) *Attorney, Agent, or Firm*—Buchanan Ingersoll PC

(57) ABSTRACT

A comparator 172 compares the value held in an RPT_B register 171 with the address of the instruction which is held in an IA register 181 and is to be fetched next, and outputs coincidence information indicating whether these value coincide with each other. Based on the coincidence information, a control part 112 generates hardware-wise a control signal for switching an instruction processing sequence to the next instruction of a repeat block in the last repeat processing of the repeat block.

4 Claims, 25 Drawing Sheets

BIT NUMBER  REP  Rsrc1, Rsrc2, disp16

| | | | | | |
|---|---|---|---|---|---|
| AND3 | R11,R10,#h'0003 | | | | ; I1 |
| LD2W | R0,@R8+ | \|\| | SRLI | R10,#2 | ; I2 |
| LD2W | R4,@R9+ | \|\| | NOP | | ; I3 |
| LD2W | R2,@R8+ | \|\| | CLRAC | A0 | ; I4 |
| REP | R11,R10,rep_end | | | | ; I5 |
| LD2W | R6,@R9+ | \|\| | MAC | A0,R0,R4 | ; I6 |
| LD2W | R0,@R8+ | \|\| | MAC | A0,R1,R5 | ; I7 |
| LD2W | R4,@R9+ | \|\| | MAC | A0,R2,R6 | ; I8 |
| rep_end : | | | | | |
| LD2W | R2,@R8+ | \|\| | MAC | A0,R3,R7 | ; I9 |
| RACHI | R0,A0,#0 | \|\| | NOP | | ; I10 |
| : | | | | | ; I11 |
| : | | | | | ; : |

FIG.20
| BIT NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | SM | 0 | 0 | 0 | RE | IE | RP | MD | FX | ST | 0 | 0 | F0 | F1 | 0 | C |
| | 41 | | | | 601 | 42 | 43 | 44 | 45 | 46 | | | 47 | 48 | | 49 |
FIG.25
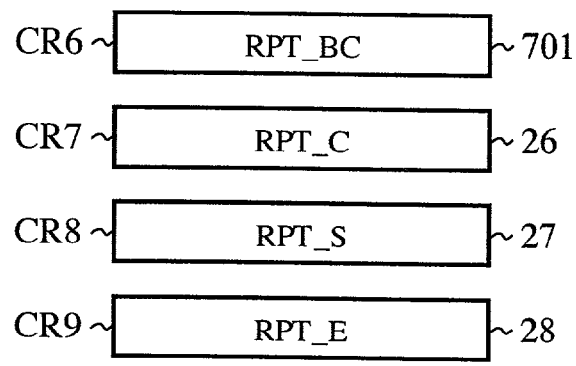
FIG.29
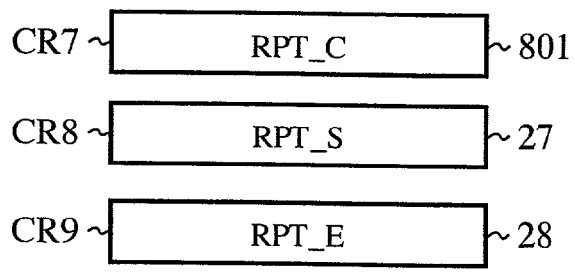

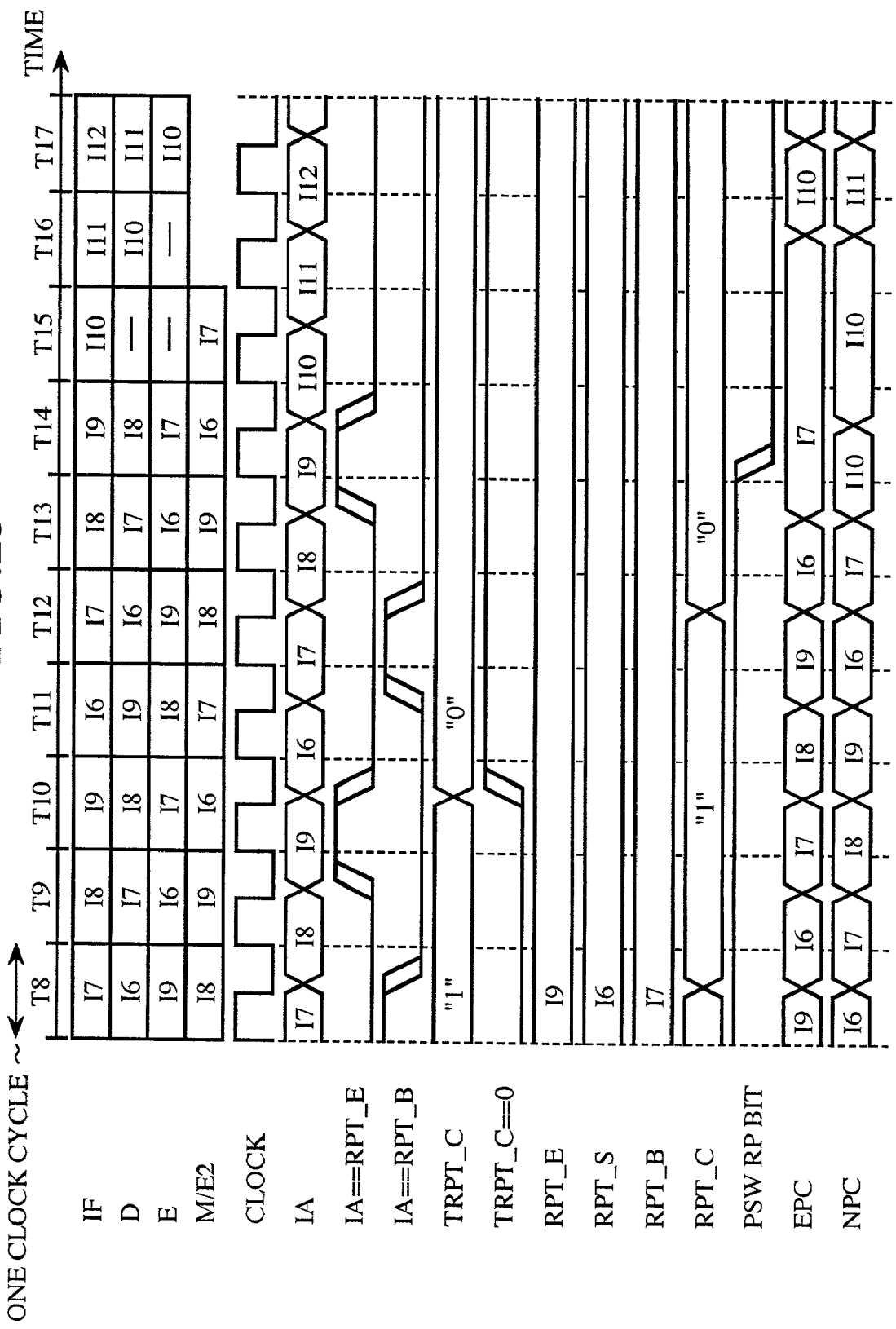

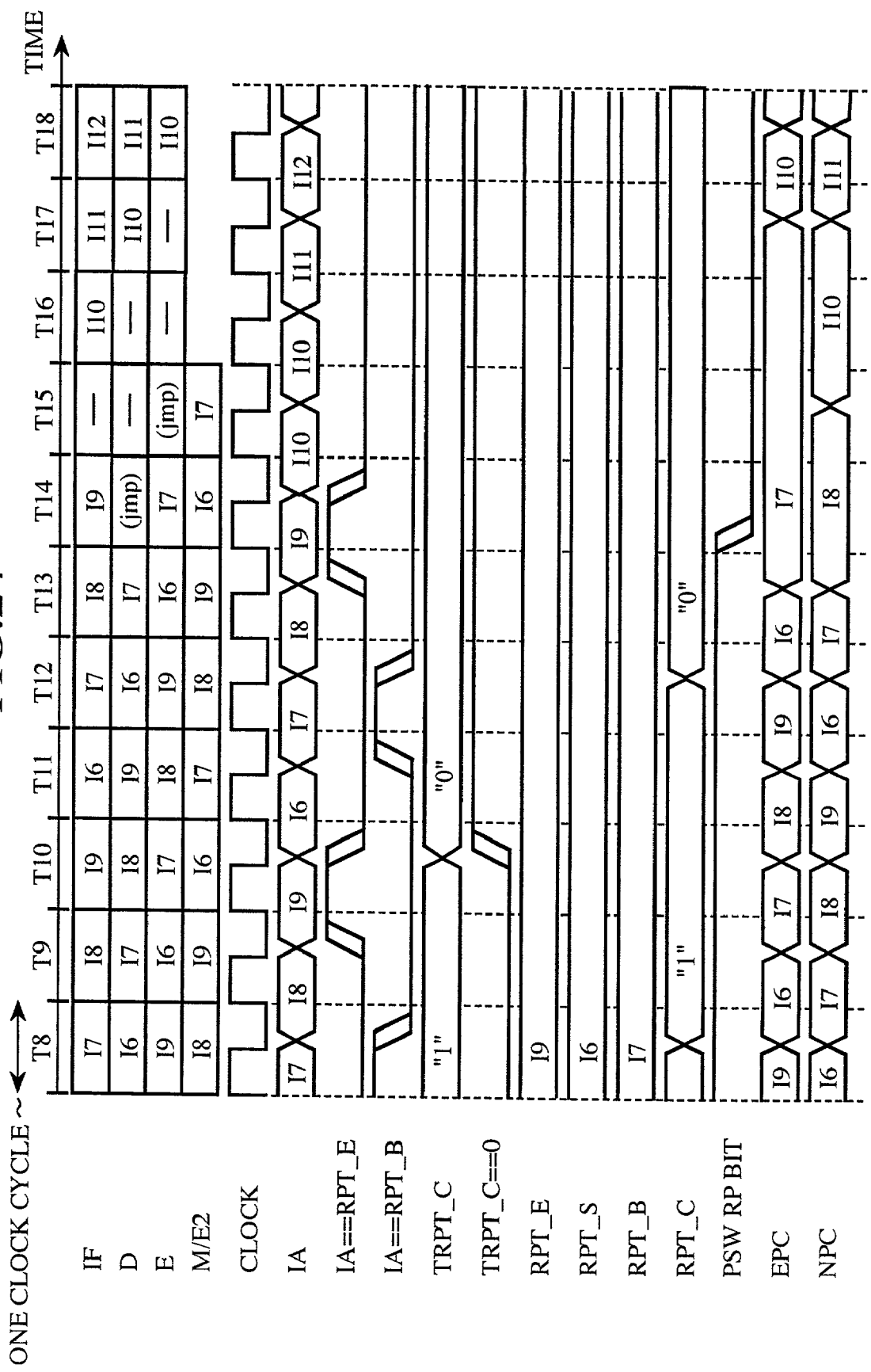

FIG.31

BIT NUMBER  DREP Rsrc, disp16

| 0 1 2 | 7 8 | 11 12 | 15 16 | 31 |
|---|---|---|---|---|
| 11 | opcode | 0000 | Rsrc | disp16 |
| 831 | 832 | 833 | 834 | 835 |

FIG.32

BIT NUMBER  DREPI imm8, disp16

| 0 1 2 | 7 8 | 15 16 | 31 |
|---|---|---|---|
| 11 | opcode | imm8 | disp16 |
| 836 | 837 | 838 | 839 |

DREP    R10,rep_end                      ; I2

LD2W    R2,@R8+     ||  CLRAC   A0       ; I3
rep_start :
    LD2W    R6,@R9+     ||  MAC     A0,R0,R4 ; I4
    LD2W    R0,@R8+     ||  MAC     A0,R1,R5 ; I5
    LD2W    R4,@R9+     ||  MAC     A0,R2,R6 ; I6
rep_end :
    LD2W    R2,@R8+     ||  MAC     A0,R3,R7 ; I7

RACHI   R0,A0,#0    ||  NOP              ; I8
      :                                      ; I9
      :                                      ; :
```

DATA PROCESSOR SPEEDING UP REPEAT PROCESSING BY INHIBITING REMAINING INSTRUCTIONS AFTER A BREAK IN A REPEAT BLOCK

BACKGROUND OF THE INVENTION

1. Field of the Invention

The present invention relates to a data processor for executing a program that consists of plural instructions and contains a repeat block which is repeatedly processed.

2. Description of the Prior Art

In general, digital signal processing involves frequent repeat processing. Digital signal processors (DSPs) are processors designed specifically for high-speed digital signal processing, and many of these processors have a single instruction or repeat instruction for efficient processing of a repeat block that contains plural instructions which are repeatedly processed.

On the other hand, there have been developed multimedia-oriented data processors for efficient digital signal processing through utilization of VLIW (Very Long Instruction Word) techniques. FIG. 36 is a flowchart showing repeat processing implemented by software of such a conventional data processor disclosed in Japanese Patent Laid-Open Gazette 9-212361 (U.S. Pat. No. 5,901,301). Unlike a DSP of the type that implements the flow of signal processing by hardware, this data processor requires, for speeding up repeat processing, software pipelining of load latency, lifetime of register values or the like, and calls for optimization by expanding the repeat processing to some extent by software. Further, even a simple multiply-add operation necessitates readout of data from two areas on a memory. Hence, to realize high-speed processing, it is customary to use processing of plural pieces of data as a loop unit.

A brief description will be given below of the operation of the prior art example.

The FIG. 36 example shows the case where the basic number of repetitions of the multiply-add operation to be performed is set to 4 for loop processing; plural programs are independently provided which perform the multiply-add operation processing 1, 2, ..., 7, 4n, 4n+1, 4n+2 and 4n+3 (where n is an integer equal to or greater than 2) times, respectively. The data processor decides, in step ST1, whether the number of times the repeat block is repeatedly processed, that is, the repeat count is 8 or more. When the repeat count is 8 or more, the data processor goes to step ST2 to further decide whether the repeat count is equal to 4n, 4n+1, 4n+2 or 4n+3, and based on the result of decision, causes a branch to the corresponding program for the multiply-add operation processing, thereafter executing the program (steps ST3a to ST3d). On the other hand, when the repeat count is smaller than 8, the data processor goes to step ST4, in which it further decides to which of 1 to 7 the repeat count is equal, and based on the result of decision, causes a branch to the corresponding program for the multiply-add operation processing, thereafter executing the program (steps ST5a to ST5g).

As described above, when the repeat count for repeat bock processing changes dynamically, the data processor decides the repeat count by software and causes a branch to the program corresponding to the repeat count.

With the conventional data processor of the above construction, when the repeat count for processing the repeat block undergoes a dynamic change, or when the same subroutine is called with a given repeat count, the overhead for deciding the repeat count becomes too large to achieve a high level of performance. Further, since codes are needed for decision of the repeat count, branching based on the result of decision and repeat processing according to the repeat count, the program size for repeat processing becomes inevitably large. In particular, ROMed software raises the hardware cost because of the code-size-dependence of the actual ROM size; furthermore, even simple repeat processing for speedup requires quite a complicated program, placing a high load on program development and increasing the possibility of bugs mixing into the program.

SUMMARY OF THE INVENTION

It is therefore an object of the present invention to provide a high-performance, low-cost data processor which makes it possible, using a single program, to terminate processing of a repeat block prematurely halfway through its repeat procedure after processing the repeat block a given number of times, and hence permits substantial reduction of the program size and provides increased program development efficiency.

According to a first aspect of the present invention, there is provided a data processor comprises: the data processor comprises: detecting means implemented by hardware, for detecting a break of repeat processing in a repeat block independently of an operation specified by an instruction being executed; and instruction execution inhibit means responsive to the detection of the break of the repeat processing by the detecting means to inhibit the execution of the remaining instructions in the repeat block.

Preferably, according to a second aspect of the present invention, the instruction execution inhibit means is means implemented by hardware for converting the remaining instructions in the repeat block to no operation instructions upon detection of the break of the repeat processing by the detecting means.

Preferably, according to a third aspect of the present invention, the instruction execution inhibit means is instruction processing sequence switching means for switching the instruction processing sequence to the next instruction of the repeat block at an instruction fetch stage upon detection of the break of the repeat processing by the detecting means.

Preferably, according to a fourth aspect of the present invention, the instruction execution inhibit means is instruction processing sequence switching means for switching the instruction processing sequence to the next instruction of the repeat block at an instruction execution stage upon detection of the break of the repeat processing by the detecting means.

Preferably, according to a fifth aspect of the present invention, the instruction processing sequence switching means is means for performing jump processing to the next instruction of the repeat block during execution of last instruction that is executed last in the repeat processing of the repeat block.

Preferably, according to a sixth aspect of the present invention, the instruction processing sequence switching means is means for performing jump processing to the next instruction of the repeat block after execution of the last instruction that is executed last in the repeat processing of the repeat block.

Preferably, according to a seventh aspect of the present invention, the instruction processing sequence switching means is means for performing jump processing to the next instruction of the repeat block after execution of the last instruction that is executed last in the repeat processing of the repeat block.

Preferably, according to an eighth aspect of the present invention, the detecting means has count means for counting the number of repetitions of processing of the repeat block, and comparison means for comparing the address of the instruction to be currently executed in the repeat block with the address of the last instruction to be executed last. Upon being informed from the comparison means of the coincidence of address between the current and last instructions when the count number of the count means has reached a predetermined value, the detecting means decides that the repeat processing breaks.

Preferably, according to a ninth aspect of the present invention, the detecting means is means for deciding whether the repeat processing breaks, based on the number of instructions to be executed during repeat processing of the repeat block.

Preferably, according to a tenth aspect of the present invention, the detecting means has count means for counting the number of instructions executed in the repeat block, and decides that the repeat processing breaks when the count number of the count means reaches a predetermined value.

Preferably, according to an eleventh aspect of the present invention, the detecting means has first count means for counting the number of repetitions of processing of the repeat block and second count means for counting the number of instructions executed in the repeat block, and the detecting means decides that the repeat processing breaks when the count number of the first count means reaches a first predetermined value and the count number of the second count means reaches a second predetermined value in the last repeat processing of the repeat block.

These and other objects, features and advantages of the present invention will become more apparent from the following description taken in conjunction with the accompanying drawings.

BRIEF DESCRIPTION OF THE DRAWINGS

FIG. 20 illustrates a processor status word for a data processor according to a second preferred embodiment of the present invention;

FIG. 23 is a timing chart of pipeline processing for the execution of the FIG. 16 program according to a third preferred embodiment of the present invention;

FIG. 24 is a timing chart of pipeline processing for the execution of the FIG. 16 program according to a fourth preferred embodiment of the present invention;

FIG. 25 illustrates a set of repeat-associated control registers for a data processor according to a fifth preferred embodiment of the present invention;

FIG. 29 illustrates a set of repeat-associated control registers for a data processor according to a sixth preferred embodiment of the present invention;

FIG. 31 illustrates the format of a delayed repeat instruction "DREP Rsrc, disp16" for the data processor according to the sixth preferred embodiment of the present invention;

FIG. 32 illustrates the format of a delayed repeat instruction "DREPI imm8, disp16" for the data processor according to the sixth embodiment of the present invention;

FIG. 33 illustrates an example of a program described in the assembler for a multiply-add operation and including the DREP instruction;

DETAILED DESCRIPTION OF THE PREFERRED EMBODIMENTS

First Embodiment

Figure 1:
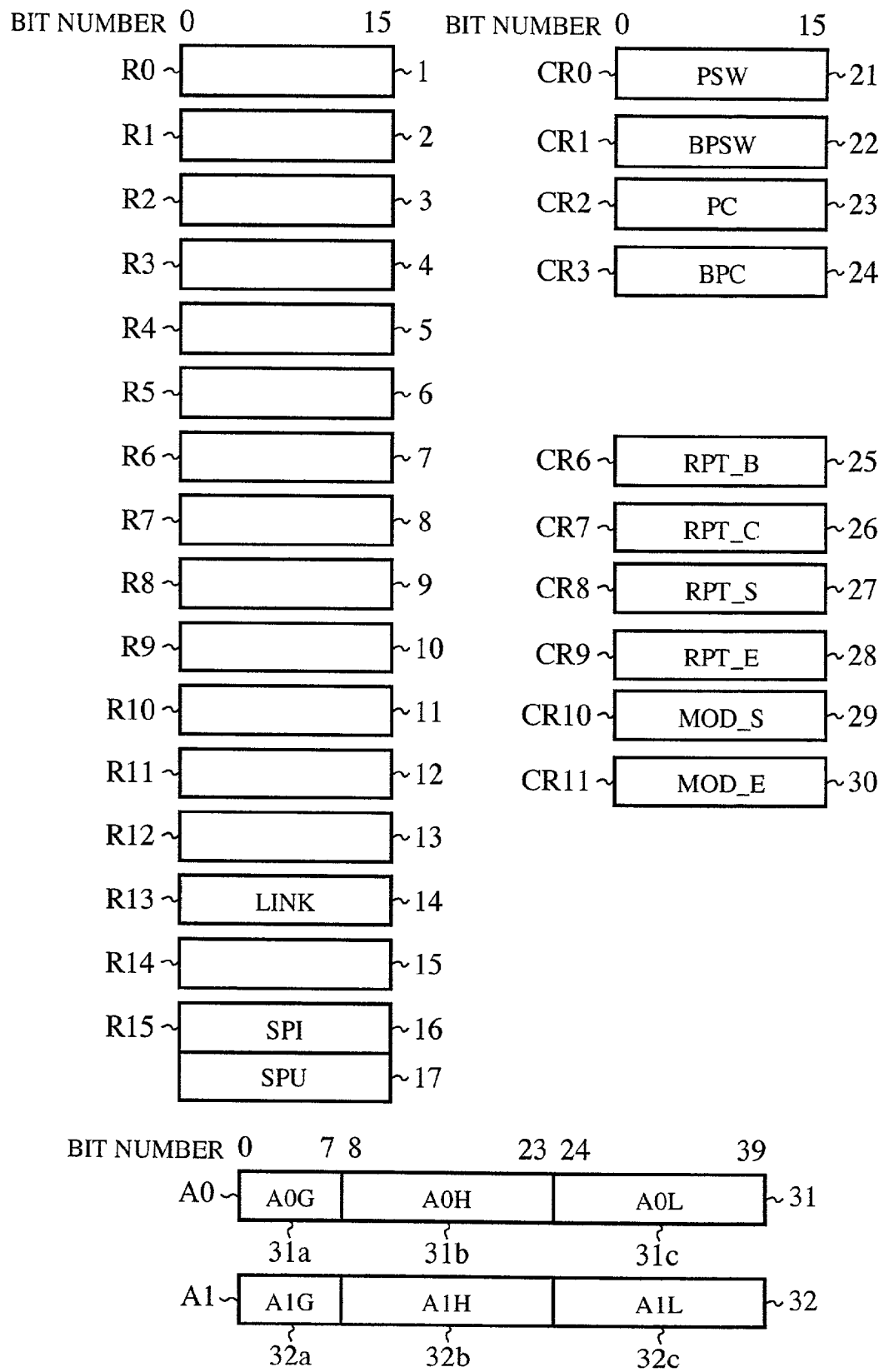
FIG. 1 illustrates a set of registers for a data processor according to a first preferred embodiment of the present invention.

FIG. 1 depicts a set of registers for the data processor according to the first embodiment (Embodiment 1) of the present invention. Let it be assumed that the data processor according to the present invention is a 16-bit processor whose addresses and data are 16 bits in length. The data processor employs big endian bit and byte ordering wherein the most significant bit is the bit 0.

Reference numerals 1 to 15 denote general-purpose registers R0 to R15 for storing data or addresses. The general-purpose R13 is a link (LINK) register for storing a return address for a subroutine jump. The general-purpose register R15 is a register for a stack pointer (SP) including an interruption stack pointer (SPI) 16 and a user stack pointer (SPU) 17. The general-purpose register R15 is switched, by a processor status word (PSW) described later, between the interruption stack pointer (SPI) 16 and the user stack pointer (SPU) 17. The SPI 16 and the SPU 17 will hereinafter be generically referred to as a stack pointer (SP). The number of each of the general-purpose registers is specified in a 4-bit register specification field unless otherwise specified. The data processor according to this embodiment includes an instruction for specifying a pair of registers, for example, R0-1 and R1-2. In this instance, the pair of registers are specified in such a manner that an even-numbered register is specified to thereby implicitly specify the corresponding register of the odd number that equals the even number plus one.

Reference numerals 21 to 30 denote 16-bit control registers CR0 to CR3 and CR6 to CR11. The number of each control register is also specified in a 4-bit register specification field as is the case with the general-purpose registers. The control register CR0-21 is one that stores a processor status word (PSW) including a bit for specifying the operation mode and a flag indicating the result of operation.

Figure 2:
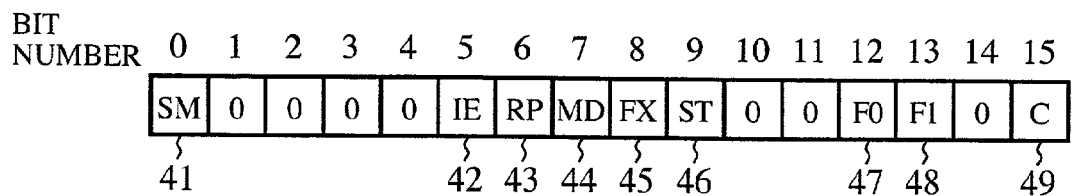
FIG. 2 illustrates the construction of a processor status word for the data processor according to the first preferred embodiment of the present invention.

FIG. 2 depicts the format of the PSW that is stored in the control register CR0-21. Reference numeral 41 denotes an SM bit (bit 0) indicating a stack mode. The SM bit 41 indicates an interruption mode when it is "0", and the SPI-16 is selected as the general-purpose register R15. When it is "1", the SM bit 41 indicates a user mode and the SPU-17 is selected as the general-purpose register R15. Reference numeral 42 denotes an IE bit (bit 5) that specifies an interruption enable state. When the IE bit 42 is "0", an interruption is masked (ignored if asserted), whereas when the IE bit 42 is "1", the interruption is accepted.

The data processor according to this embodiment is equipped with a repeat function for achieving zero-overhead loop processing. In FIG. 2, reference numeral 43 denotes an RP bit (bit 6) that indicates a repeat state. The RP bit 43 indicates no repeat being executed when it is "0", whereas when it is "1" the RP bit 43 indicates a repeat is being executed. In the data processor of this embodiment there is implemented a modulo addressing function that is addressing for accessing a circular buffer. Reference numeral 44 denotes an MD bit (bit 7) for specifying a modulo enable state. When the MD bit 44 "0", the modulo addressing is disabled, whereas when it is "1", the modulo addressing is enabled. Reference numeral 45 denotes an FX bit (bit 8) for specifying a data format of an accumulator. When the FX bit 45 is "0", the result of multiplication is stored in an integral format in the accumulator. When the FX bit 45 is "1", the result of multiplication is shifted left one bit position and stored in a fixed-point format in the accumulator. Reference numeral 46 denotes an ST bit (bit 9) for specifying a saturation mode. When the ST bit 46 is "0", the result of operation is written in 40-bit form in the accumulator. When the ST bit 46 is "1", the result of operation is limited to a value that can be expressed by 32 bits, and is written in the accumulator accordingly. For example, when the result of operation is larger than a hexadecimal value 007fffff, 007fffff is written in the accumulator. When the result of operation is smaller than a hexadecimal value ff80000000, ff80000000 is written in the accumulator.

Reference numeral 47 denotes an execution control flag (F0 flag) (bit 12), in which the result of a comparison instruction or the like is set. Reference numeral 48 denotes also an execution control flag (F1 flag) (bit 13), to which the value of the F0 flag 47 is copied prior to its updating by a comparison instruction or the like. Reference numeral 49 denotes a carry flag (bit 15), in which a carry is set when addition and subtraction instructions are executed.

In FIG. 1 the control register CR2-23 is a program counter (PC), which indicates an instruction address being executed. The instruction processed by the data processor of this embodiment basically has a 32-bit fixed length. The program register CR2-23 stores an instruction word address in which 32 bits make up one word. The control register CR1-22 is a register for storing a backup processor status word (BPSW), and the control register CR3-24 is a backup program counter (BPC). These control registers CR1-22 and CR3-24 are registers for saving and holding the values of the PSW and PC being executed upon detection of an exception or interruption. The control registers CR6-25 to CR9-28 are repeat-associated registers, which allow a user to read and write the values thereof so that an interruption is accepted during a repeat. The control register CR7-26 is a repeat count (RPT_C) register for holding the count value RPT_C) indicative of the repeat count. The control register CR8-27 is a repeat block start address (RPT_S) register for holding the address RPT_S of the first instruction (i.e. a start instruction) address in the repeat block. The control register CR9-28 is a repeat block end address (RPT_E) register for holding the address RPT_E of the address RPT_E of the last instruction in the repeat block (which instruction will hereinafter be referred to as a repeat block last instruction). The control register CR6-25 is a repeat break address (RPT_B) register for holding the address RPT_B) of the last instruction for ending repeat processing in the repeat block (which instruction will hereinafter be referred to as a repeat processing last instruction).

The control registers CR10-29 and CR11-30 are provided to execute modulo addressing. The control register CR10-29 holds a modulo start address (MOD_S), and the control register CR11-30 holds a modulo end address (MOD_E).

These control registers each hold a data word (16-bits) address. When the modulo addressing is used for address updating during a post-increment, the lower address is set in the control register CR10-29, and the higher address is set in the control register CR11-30. If the value held in the register to be incremented matches the address held in the control register CR11-30, the value held in the control register CR10-29 is written back to the general-purpose register as an incremented result.

In FIG. 1, reference numerals 31 and 32 denote 40-bit accumulators A0 and A1. The accumulator A0-31 comprises an area A0H-31b for holding the high-order 16 bits of the result of a multiply-add operation, an area A0L-31c for holding the low-order 16 bits of the result of the multiply-add operation, and an 8-bit guard bit area A0G-31a for holding bits overflown out of the high order bit of the result of the multiply-add operation. Similarly, the accumulator A1-32 comprises an area A1H-32b for holding the high-order 16 bits of the result of a multiply-add operation, an area A1L-32c for holding the low-order 16 bits of the result of the multiply-add operation, and an 8-bit guard bit area A1G-32a for holding bits overflown out of the high order bit of the result of the multiply-add operation.

Figure 3:
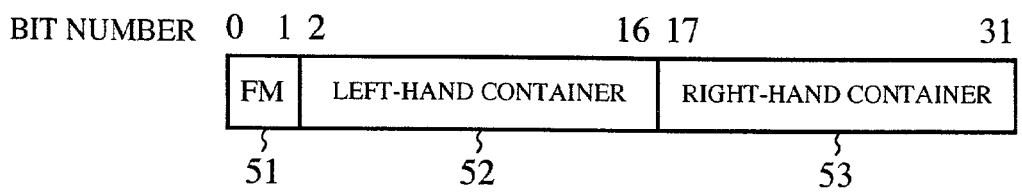
FIG. 3 illustrates the format of a 32-bit instruction for the data processor according to the first preferred embodiment of the present invention.

The data processor of this embodiment processes a 2-way VLIW (Very Long Instruction Word) instruction set. FIG. 3 depicts the format of a 32-bit instruction for the data processor of this embodiment. The basic instruction length is 32-bit fixed, and each instruction is aligned in groups of 32 bits. Each 32-bit instruction code comprises two format specification bits (FM bits) 51 indicating the format of the instruction, a 15-bit left-hand container 52, and a 15-bit right-hand container. Each of the containers 52 and 53 can store a 15-bit short-format sub-instruction. Further, the containers 52 and 53 can, in combination, store one 30-bit long-format sub-instruction. For simplicity sake, the short-format sub-instruction and the long-format sub-instruction will hereinafter be referred to as a short instruction and a long instruction, respectively.

The FM bit 51 specifies the format of the instruction and the order of execution of two short instructions. When the FM bits 51 are "11", they indicate that the left- and right-hand container 52 and 53 hold the 32-bit long instruction. If they are not "11", the FM bits 51 indicate that the left- and right-hand containers 52 and 53 each hold the short instruction. Further, when the instruction code holds two short instructions, the FM bits 51 specifies the order of their execution. When the FM bits 51 are "00", they indicate that the two short instructions are executed in parallel. When they are "01", the FM bits 51 indicate that the short instruction held in the left-hand container 52 is executed prior to the execution of the short instruction held in the right-hand container 53. When they are "10", the FM bits 51 indicate that the short instruction held in the right-hand container 53 is executed prior to the execution of the short instruction held in the left-hand container 52. In this way, the data processor of this embodiment aims to provide increased encoding efficiency by encoding into one 32-bt instruction including two short instructions to be executed sequentially.

Figure 4:
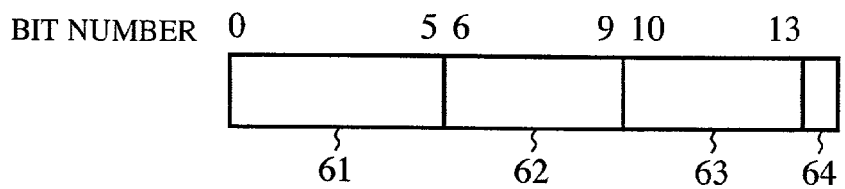
FIG. 4 illustrates a short format of a 2-operand instruction for the data processor according to the preferred first embodiment of the present invention.
Figure 5:
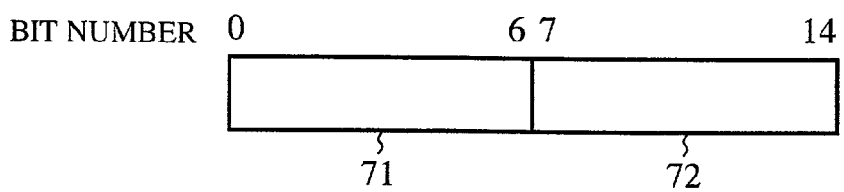
FIG. 5 illustrates a short format of a branch instruction for the data processor according to the first preferred embodiment of the present invention.
Figure 6:
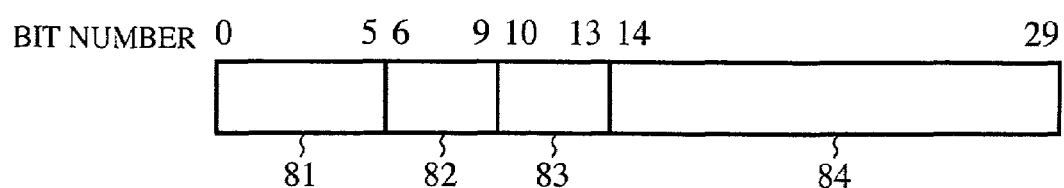
FIG. 6 illustrates a long format of a 3-operand instruction or a load/store instruction for the data processor according to the first preferred embodiment of the present invention.
Figure 7:
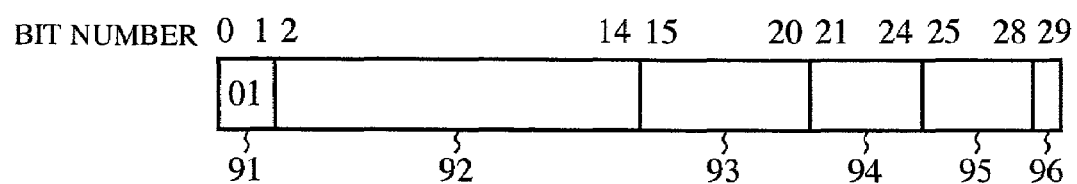
FIG. 7 illustrates a long format of an instruction having an operation code in its right-hand container for the first preferred embodiment of the present invention.

FIGS. 4 to 7 depict typical examples of instruction encoding. FIG. 4 shows encoding of a short instruction having two operands. Reference numerals 61 and 64 denote operation code fields. The field 64 may sometimes specify an accumulator number. Reference numerals 62 and 63 denote fields for specifying, by a register or accumulator number, the position where to store data that is referred to or updated as an operand. The field 63 may sometimes specify 4-bit short immediate value data. FIG. 5 shows an example of encoding of a short-format branch instruction. Reference numeral 71 denotes an operation field, and 72 an 8-bit branch displacement field. A branch displacement is specified by an instruction word (32 bits) offset like the PC value. FIG. 6 shows an example of encoding of a 3-operand instruction having a 16-bit displacement or immediate value data or load/store instruction. Reference numeral 81 denotes an operation field, 82 and 83 fields for specifying a register number like the short format, and 84 a 16-bit extended data field for specifying a displacement or immediate value data. FIG. 7 shows an example of encoding of a long-format instruction having an operation code in its right-hand container 53. In this example 2-bit field 91 is "01". Reference numerals 93 and 96 denote operation fields, 94 and 95 fields for specifying a register number, and 92 a reserved field that is used for specifying an operation code or register number as required.

Moreover, there are instruction of special encoding, for example, an instruction in which 15 bits all constitute an operation code, such as an NOP (no operation) instruction, or a 1-operand instruction.

Sub-instructions for the data processor of this embodiment are a RISC-like instruction set. Only the load/store instruction accesses memory data, and an operation instruction performs an arithmetic operation on an operand in the register/accumulator or using an immediate operand. There are five operand data addressing modes: a register indirect mode, a register indirect mode with post-increment, a register indirect mode with post-decrement, a push mode, and a register relative indirect mode. Their mnemonics are "@Rsrc", "@Rsrc+", "@Rsrc−", "@-SP" and "@(disp16, Rsrc)", respectively, where Rsrc indicates a register number for specifying a base address and disp16 indicates a 16-bit displacement value. The address of the operand is specified by a byte address.

The load-store instruction in the other modes than the register relative indirect mode has the instruction format depicted in FIG. 4. For such a load/store instruction, the field 63 specifies a base register number, and the field 62 specifies the number of a register into which a value loaded from a memory is written, or the number of a register for holding the value to be stored. In the register indirect mode, the value of the specified as the base register serves as the operand address. In the register indirect mode with post-increment, the value of the register specified as the base register serves as the operand address, and the value of the base register is post-incremented by the size (the number of bytes) of the operand and written back. In the register indirect mode with post-decrement, the value of the register specified as the base register serves as the operand address, and the value of the base register is post-decremented by the size (the number of bytes) of the operand and written back. The push mode is usable only when the store instruction is provided and the base register is the general-purpose register R15. In the push mode, the stack pointer (SP) value pre-decremented by the size (the number of bytes) of the operand serves as the operand address, and the decremented value is written back to the SP.

The load/store instruction in the register relative indirect mode has the instruction format of FIG. 6. The field 83 specifies a base register number, and the field 82 specifies the number of a register into which the value loaded from the memory is written, or the number of a register for holding the value to be stored. The field 84 specifies a displacement value of the operand storage position from the base address. In the register relative indirect mode, the total value of the value of the register specified as the base register and the 16-bit displacement value added serves as the operand address.

In the post-increment type register indirect mode and the post-decrement type register indirect mode, the modulo addressing mode can be used by setting the MD bit 44 in the PSW held in the control register CR0-21 to "1".

Jump-to addressing of a jump instruction includes a register indirect mode in which to specify a jump-to address by a register value, and a PC relative indirect mode in which to specify the jump-to address by a branch displacement of the jump instruction from the PC. The PC relative indirect mode includes a short format for specifying the branch displacement by 8 bits, and a long format for specifying the branch displacement by 16 bits. Further, the data processor of this embodiment has a repeat instruction that enables a repeat function for loop processing without overhead.

Figure 8:
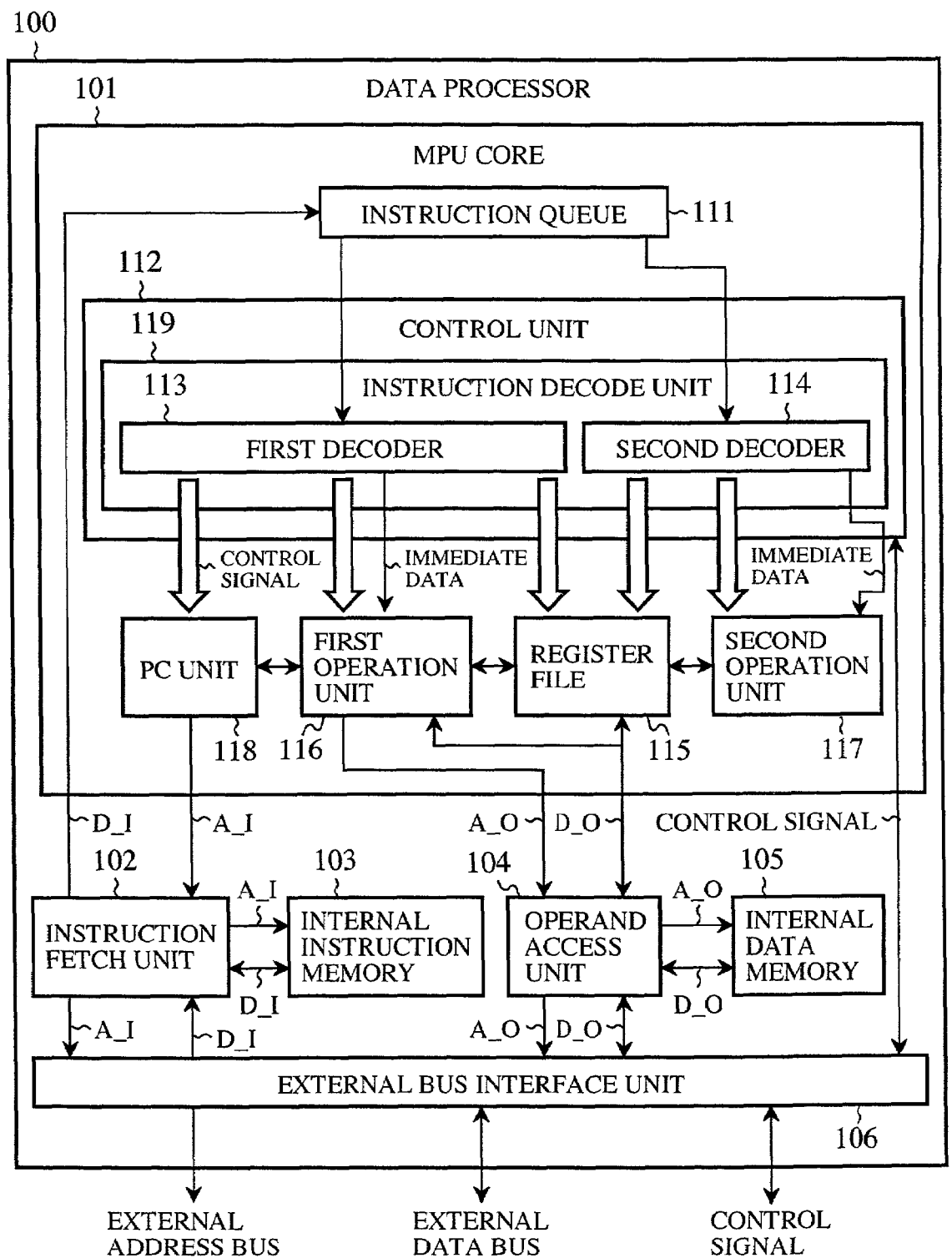
FIG. 8 is a functional block diagram of the data processor according to the first preferred embodiment of the present invention.

FIG. 8 is a functional block diagram illustrating the configuration of the data processor according to Embodiment 1, which is indicated generally by 100. Reference numeral 101 denotes an MPU core; 102 denotes an instruction fetch unit for accessing instruction data in response to a request from the MPU core 101; 103 denotes an internal instruction memory for storing instruction data; 104 denotes an operand access unit for accessing operand data in response to a request from the MPU core 101; 105 denotes an internal data memory for storing operand data; and 106 denotes an external bus interface unit for arbitrating requests from the instruction fetch unit 102 and the operand access unit 104 and for accessing a memory outside the data processor 100.

The MPU core 101 comprises an instruction queue 111, a control unit ((detecting means, instruction execution suppress means, instruction processing sequence switching means) 112, a register file 115, a first operation unit 116, a second operation unit 117, and a PC unit (detecting means, instruction execution suppress means, instruction processing sequence switching means) 118.

The instruction queue 111 has 32-bit instruction buffer and a valid bit of two entries and an I/O pointer, and is controlled on a FIFO (first-in first-out) basis. The instruction queue 111 temporarily holds instruction data fetched by the instruction fetch unit 102, and sends the instruction data to the control unit 112.

The control unit 112 effects all control of the MPU core 101, such as control of the instruction queue 111, pipeline control, instruction execution control, and control of the interface with the instruction fetch unit 102 and the operand access unit 104. The control unit 112 has an instruction decode unit 119 for decoding an instruction code sent from the instruction queue 111, and comprises first and second decoders 113 and 114. The first decoder 113 decodes an instruction that is executed in the first operation unit 116. The second decoder 114 decodes an instruction that is executed in the second operation unit 117. In a first cycle of decoding of a 32-bit instruction, the first decoder 113 decodes analyzes an instruction code in the left-hand container 52, and the second decoder 114 analyzes an instruction code in the right-hand container 53. In this case, however, the data in the FM bits 51 and the bits 0 and 1 of the left-hand container 52 is analyzed by both of the first and second decoders 113 and 114. The data in the right-hand container 53 is sent to the first decoder 113 to extract extended data but is not analyzed. Accordingly, the instruction to be executed first must be placed at the position corresponding to an operation unit for executing the instruction, that is, in the left- or right-hand container 52 or 53.

When two short instructions are executed one after the other, the instruction to be executed later is decoded by a predecoder (not shown) during decoding of the instruction to be executed first, and the predecoder decides which decoder is used to decode the instruction to be executed later. If the instruction to be executed later is executable by either decoder, it is decoded by the first decoder 113. The preceding instruction, after decoded, is provided to the decoder in which the instruction code of the instruction to be executed, and is analyzed.

The register file 115 includes a plurality of registers corresponding to the general-purpose registers R0 to R15 and is connected to the first operation unit 116, the second operation unit 117, the PC unit 118 and the operand access unit 104 by a plurality of buses.

Figure 9:
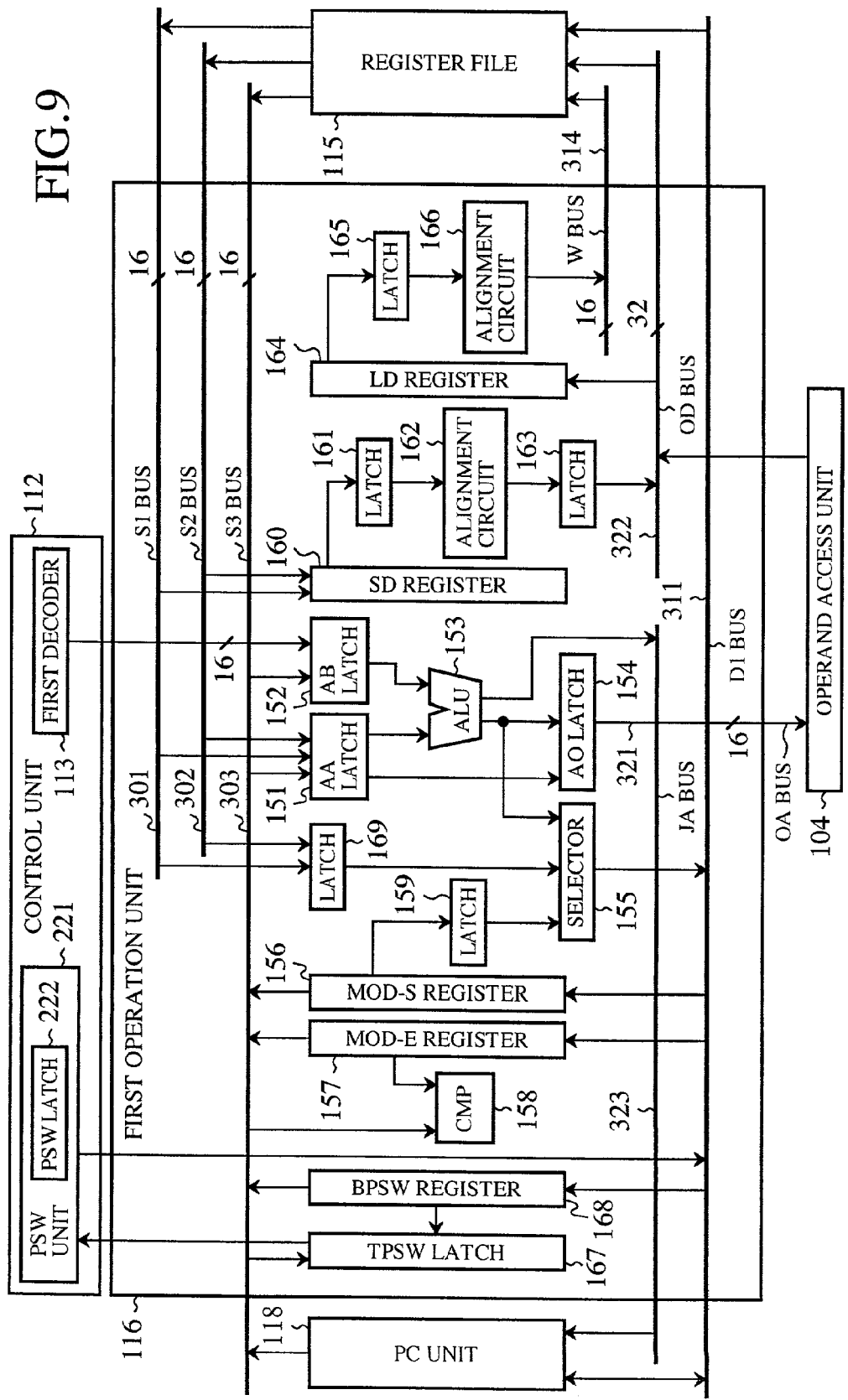
FIG. 9 is detailed block diagram of a first operation unit for the data processor according to the first preferred embodiment of the present invention.

FIG. 9 is a block diagram illustrating in detail the configuration of the first operation unit 116. As shown, the first operation unit 116 is connected to the register file 115 via an S1 bus 301, an S2 bus 302 and an S3 bus 303. The first operation unit 116 reads out data from the register file 115 via the three buses, and transmits to its arithmetic unit or the like data that serves as a read operand, or store data. The S1 bus 301 is connected to only even-numbered registers in the register file 115, and the S2 bus 302 is connected only odd-numbered registers. The first operation unit 116 is also capable of reading out 2-word data from the register file 115 in parallel via the SI bus 301 and the S2 bus 302. The S3 bus 303 is connected to all registers in the register file 115.

The register file 115 is connected via a 32-bit OD bus 322 to the operand access unit 104, and the data processor is capable of transmitting 1-word data or 2-word data in a pair of registers from the operand access part 104 in parallel to form to the register file 115. The high-order 16 bits and low-order 16 bits of the OD bus 322 are both connected to all the registers in the register file 115 so that data or the like may be written into an arbitrary register in the register file 115.

In FIG. 9, reference numeral 153 denotes an arithmetic and logic unit (ALU) that mainly performs transfer, comparison, arithmetic and logic operations, calculation/transfer of operand addresses, increment/decrement of operand address values, and calculation/transfer of jump-to addresses. Reference numerals 151 and 152 denote an AA latch and an AB latch that are input latches of the ALU 153. The AA latch 151 receives a register value read via the S1 bus 301, S2 bus 302, or S3 bus 303. The AA latch 151 is also equipped with a function of clearing its contents to zero. The AB latch 152 receives a register value read via the S3 bus 303 or 16-bit immediate value data generated by decoding in the first decoder 113. The AB latch 152 also possesses the function of clearing its contents to zero.

As described above, the ALU 153 mainly performs transfer, comparison, arithmetic and logic operations, calculation/transfer of operand addresses, increment/decrement of operand address values, and calculation/transfer of jump-to addresses. Further, the ALU 153 writes back the results of operations and address modifications via the D1 bus 311 to the register specified by the instruction in the register file 115 that is executed.

Reference numeral 154 denotes an AO latch for holding operand addresses. The AO latch 154 selectively holds and outputs the result of address calculation by the ALU 153 or base address value held in the AA latch 151 to the operand access unit 104 via an OA bus 321. When the ALU 153 calculates the jump-to address or repeat end address, its output is transferred via a JA bus 323 to the PC unit 118.

Reference numerals 156 and 157 denote MOD_S and MOD_E registers corresponding to the control registers CT10-29 and CR11-30 in FIG. 1, respectively. Reference numeral 158 denotes a comparator (CMP) for comparing the value held in the MOD_E register 157 with the base address value on the S3 bus 303. The MOD_S register 156 is connected via a latch 159 to a selector 155.

Reference numeral 169 denotes a latch for forming a transfer routes between the S1 and S2 buses 301 and 302 and the D1 bus 311 in cooperation with the selector 155.

Reference numeral 160 denotes a store data (SD) register composed of two 16-bit registers, for temporarily storing store data output on the S1 bus 301 or S2 bus 302, or on both of them. Reference numeral 162 denotes an alignment circuit by which the store data transferred via a latch 161 from the SD register 160 is aligned into 32-bit form in accordance with the operand address. The thus aligned stored data is output via a latch 163 and the OD bus 322 to the operand access unit 104.

Reference numeral 164 denotes a 16-bit load data (LD) register that receives via the OD bus 322 the byte data loaded by the operand access unit 104. The data received by the LD register 164 is transferred to an alignment circuit 166 via a latch 165. The alignment circuit 166 byte-aligns the data and performs zero/code extension of the byte data. And, the aligned and extended data is written via a W bus 314 into the register specified in the register file 115. When 1-word (16-bit) or 2-word (32-bit) data is loaded, the loaded value is written directly into the register file 115.

Reference numeral 221 denotes a PSW unit contained in the control unit 112 and composed of a PSW latch 222 for holding the content of the control register CR0-21 in FIG. 1 and a PSW updating circuit. The PSW unit 221 updates the value in the PSW latch 22 in response to the result of an operation or execution of an instruction. In the case of transferring a value to the PSW latch 222, the data processor transfers only necessary bits (assigned bits) of the data output on the S3 bus 303 via a TPSW latch 167. In the case of reading out the value from the PSW latch 222, the data processor provides the value from the PSW unit 221 onto the D1 bus 311 and writes it into the register file 115. Reference numeral 168 denotes a BPSW register corresponding to the control register CR1-22 in FIG. 1. During exception processing the value in the PSW latch 222 provided therefrom onto the D1 bus 311 is written in the BPSW register 168. The value held in the BPSW register 168 is read out therefrom onto the S3 bus 303 and then transferred to the register file 115 or a location where it is required. In this instance, unassigned zero bits are forced out onto the S3 bus 303. In a return from exception processing, only required bits (assigned bits) of the value held in the BPSW register 168 are transferred via the TPSW latch 167 to the PSW latch 222 of the PSW unit 221.

Figure 10:
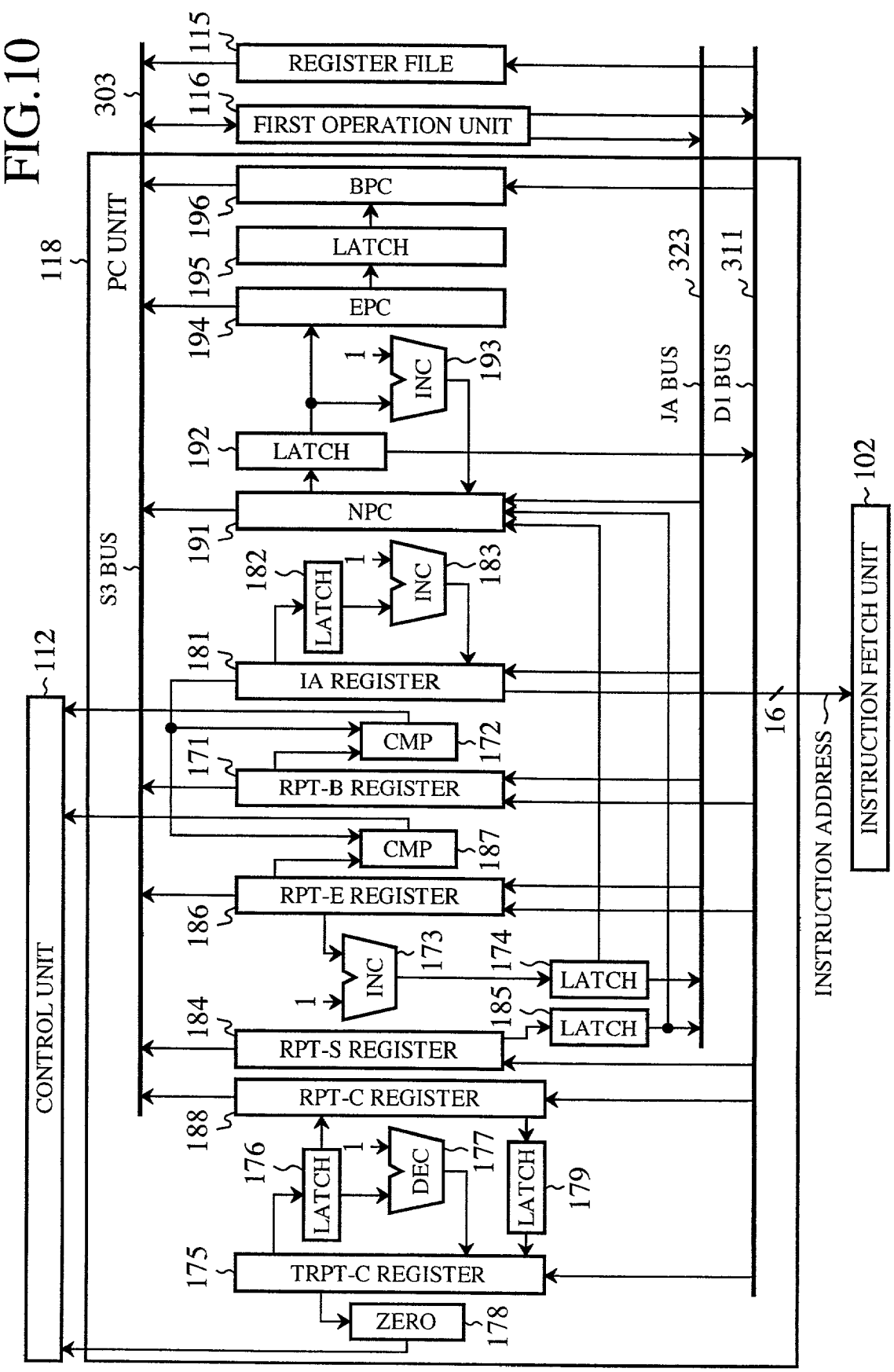
FIG. 10 is a detailed block diagram of a PC unit for the data processor according to the first preferred embodiment of the present invention.

FIG. 10 is a block diagram depicting in detail the configuration of the PC unit 118. Reference numeral 181 denotes an instruction address (IA) register that holds the address of the instruction to be fetched next, i.e. an instruction fetch address, and outputs the address to the instruction fetch unit 102. Reference numeral 183 denotes an incrementor (INC) by which the address value transferred thereto from the IA register 181 via a latch 182 is incremented by 1 so as to enable the instruction fetch unit 102 to fetch the subsequent instruction. The value incremented by the incrementor 183 is written back to the IA register 181. When the sequence is changed by a jump or repeat, the IA register 181 receives the jump-to address, repeat block start address, or the address of an instruction subsequent to the repeat block transferred via the JA bus 323.

Reference numerals 184, 186, 188 and 171 denote repeat control registers RPT_S, RPT_E, RPT_C and RPT_B, which correspond to the control registers CR8, CR9, CR7 and CR6 in FIG. 1, and hold RPT_S, RPT_E, RPT_C and RPT_B, respectively. The RPT_S, RPT_E, RPT_C and RPT_B registers 184, 186, 188 and 171 each have an input port connected to the D1 bus 311 and an output port connected to the S3 bus 303. For each register, initialization for repeat processing and save and return operations are performed as required.

The RPT_S register 184 holds the address RPT_S of a repeat block start instruction. Immediately after the initialization of the RPT_S register 184 the content of the latch 185 is updated. In the case of returning to the first instruction in the repeat block during repeat processing, the value held in the latch 185 is transferred via the JA bus 323 to the IA register 181.

The RPT_E register 186 holds the address RPT_E of the last instruction in the repeat block. The address of the last instruction in the repeat block is calculated by the first operation unit 116 during repeat instruction processing, and is set via the JA bus 323 to the RPT_E register 186.

Reference numeral 187 denotes a comparator (CMP) that compares the value held in the RPT_E register 186 with the instruction fetch address held in the IA register 181, and outputs coincidence information indicating whether these values coincide with each other. Reference numeral 173 denotes an incrementor (INC) that, during updating the content of the RPT_E register 186, increments the value in the register 186 by 1 to calculate the address of the next instruction, and the incremented value is written in a latch 174. Upon completion of repeat processing, the value in the latch 174 is transferred via the JA bus 323 to the IA register 181.

The RPTB register 171 holds the repeat break address RPT_B for breaking repeat processing. The repeat break address RPT_B is calculated by the first operation unit 116 during repeat instruction processing, and is sent via the JA bus 323 to the RPT_B register 171. Reference numeral 172 denotes a comparator (CMP) that compares the value in the RPT_B register 171 with the instruction fetch address in the IA register 181, and outputs coincidence information indicating whether these values coincide with each other. The comparator 172 corresponds to comparing means.

The RPT_C register 188 and a TRPT_C register 175 each hold the count value RPT_C for management of the repeat count of the repeat block. The TRPT_C register 175 has an input port connected to the D1 bus 311, and is initialized simultaneously with initialization of the RPT_C register 188. The count value RPT_C held in the TRPTC register 175 will hereinafter be referred to as preceding update information.

Reference numeral 177 denotes a decrementor (DEC) by which, when the repeat count is updated at the instruction fetch stage, the value transferred thereto vi the latch 171 from the TRPT_C register 175 is decremented by 1, and the decremented value is written back to the TRPT_C register 175. Reference numeral 178 denotes a zero detector (ZERO) for detecting whether the value held in the TRPT_C register 175 is zero. The value in the TRPT_C register 175 is transferred via a latch 176 to the RPT_C register 188. Reference numeral 179 denotes a latch that forms a transfer route from the RPT_C register 188 to the TRPT_C register 175 so as to initialize the value in the latter when a jump occurs. Incidentally, count means is composed of the TRPT_C register 175, the latch 176 and the decrementor 177.

Reference numeral 194 denotes an execution stage program counter (EPC) for holding the PC value of the instruction being executed, and 191 denotes a next instruction program counter (NPC) for holding the PC value of the instruction to be executed next. The NPC 191 receives the jump-to address value on the JA bus 323 upon occurrence of a jump during execution. When repeat processing is finished, the NPC 191 receives the address of the next instruction in the repeat block from the latch 174. In other cases, the value transferred from the NPC 191 via a latch 192 is incremented by an incrementor (INC) 193 by 1, and the incremented value is written back to the NPC 191. In the case of a subroutine jump instruction, the value held in the latch 192 is provided as a return address on the D1 bus 311 and written in the general-purpose register R13-14 defined as a link register in the register file 115. To refer to the PC value of the instruction to be executed next, the value in the NPC 191 is transferred via the S3 bus 303 to the first operation part 116. To start the execution of the next instruction, the value in the latch 192 is transferred to the EPC 194. To refer to the PC value of the instruction being executed, the value in the EPC 194 is transferred via the S3 bus 303 to the first operation unit 116.

Reference numeral 196 denotes a backup program counter (BPC) that corresponds to the control register CR3-24 in the register set shown in FIG. 1. Upon detection of an exception or interruption, the value held in the EPC 194 is transferred via a latch 195 to the BPC 196. The BPC 196 has its input port connected to the D1 bus 311 and its output port connected to the S3 bus 303. for the BPC 196, save and return operations are performed as required.

Figure 11:
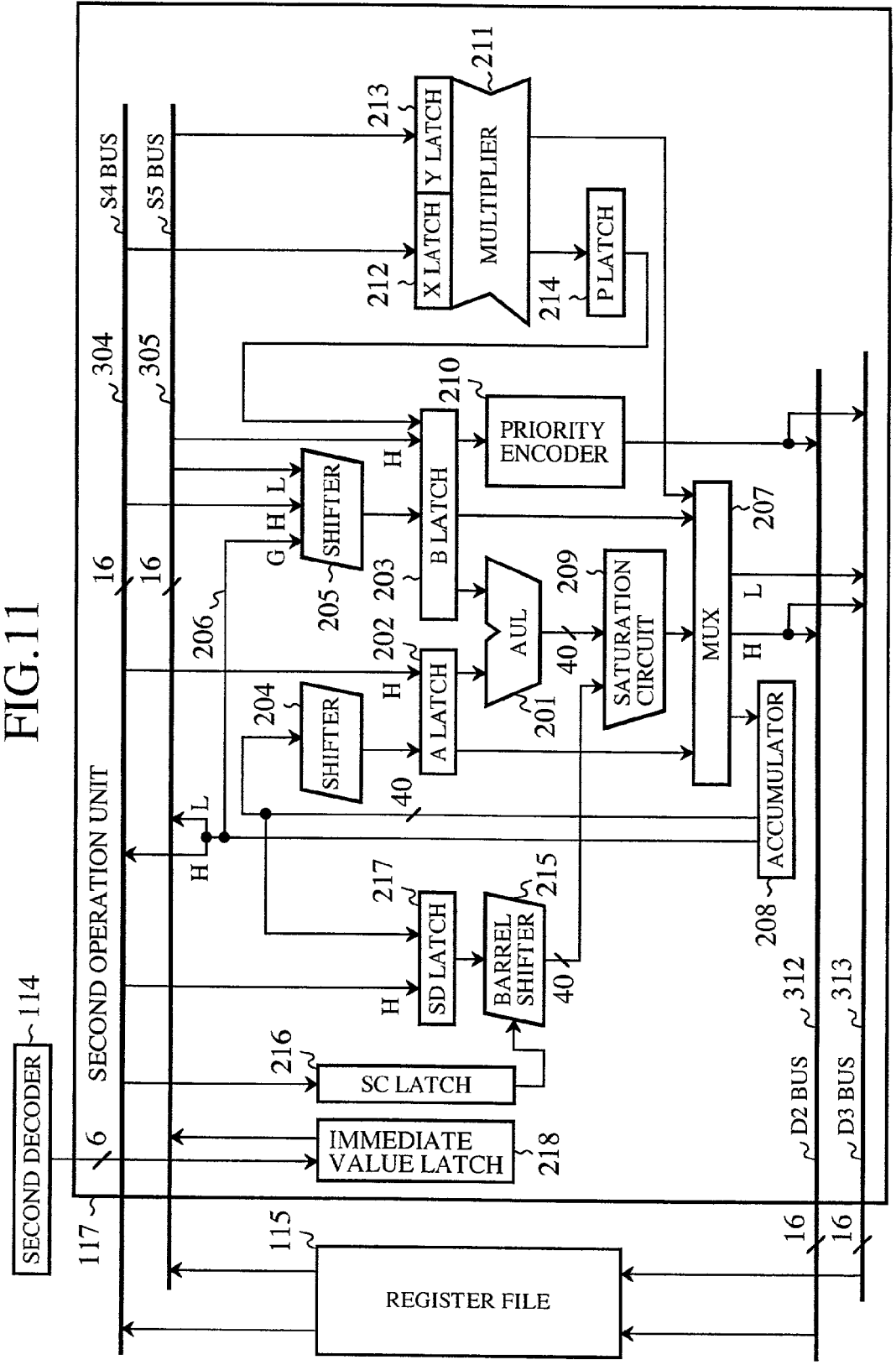
FIG. 11 is a detailed block diagram of a second operation unit for the data processor according to the first preferred embodiment of the present invention.

FIG. 11 is a detailed block diagram of the second operation unit 17. As shown, the second operation unit 117 is connected to the register file 115 via S4 and S5 buses 304 and 305, and reads out data from two arbitrary registers via the two buses. Further, the second operation unit 117 is capable of reading out two words in parallel from a given pair of registers in the register file 115 via the S4 and S5 buses 304 and 305. The second operation unit 117 is further connected via D2 and D3 buses 312 and 313 to the register file 115, and writes data in an arbitrary register in the register file 115 via either one of the two buses. The D2 bus 312 is connected to only the even-numbered registers in the register file 115, whereas the D3 bus 313 is connected to only the odd-numbered registers. The second operation unit 117 is capable of writing 2-word data in parallel in a given pair of registers in the register file 115.

In FIG. 11, reference numeral 208 denotes an accumulator that corresponds to the two 40-bit accumulators A0-31 and A1-32 in FIG. 1, and 201 denotes a 40-bit ALU. In the ALU 201, 8 bits from bits 0 to 7 constitute a guard bit adder for the accumulator 208, 16 bits from bit 8 to 23 constitute an arithmetic and logic unit, and 16 bits from bit 24 to 39 constitute an adder for adding low-order 16 bits of the accumulator 208. The ALU 201 performs additions and subtractions of up to 40 bits and a logic operation of 16 bits.

Reference numerals 202 and 203 denote an A latch and a B latch both of which are 40-bit input latches of the ALU 201, and 204 denotes a shifter that outputs the value in the accumulator 208 intact or after arithmetically shifting it right 16 bit positions. The A latch 202 receives the register value from the S4 bus 304 at the bit 8 to bit 23 positions of the input of the ALU 201, or receives the value output from the shifter 204.

Reference numeral 205 denotes a shifter that receives the value in the accumulator 208 via a line 206 (8 guard bits), the S4 bus 304 (high-order 16 bits) and the S5 bus 305 (low-order 16 bits), or receives the value in a given register in the register file 115 via only the S5 bus 305 or both of the S4 and S5 buses 304 and 305 as 16- or 32-bit flush right data, then sign-extends the input data to 40 bits, and arithmetically shifts it by a given shift amount ranging from a 3-bit left shift to a 2-bit right shift. The B latch 203 receives the data on the S5 bus 305 at the bit 8 to bit 223 positions of the input of the ALU 201, or receives the value in a P latch 214 fed from a multiplier 211 described later on or the output from the shift 205. The A and B latches 202 and 203 each possess functions of clearing the value therein to zero and setting therein a constant value.

Reference numeral 209 denotes a saturation circuit that receives the 40-bit output from the ALU 201. The saturation circuit 209 possesses the function of clipping the high-order 20 bits of the ALU output or entire 40-bit output to a maximum or minimum value expressible by 16 or 32 bits by checking the guard bit at the time of converting the ALU output to data of high-order 16 bits or both high-order and low-order 32 bits. The saturation circuit 209 further has the function of outputting the input intact. Reference numeral 207 denotes a multiplexer (MUX). The output of the saturation circuit 20 is connected to the multiplexer 207.

When a destination operand indicates the accumulator 208, the output from the multiplexer 207 is written in the accumulator 208. When the destination operand indicates the register, the output from the multiplexer 207 is written in the register specified in the register file 115 via the D2 and D3 buses 312 and 313. For a 1-word transfer, the 1-word data is provided on the D2 bus 312 or D3 bus 313, depending on the number of the destination register is even or odd. For a 2-word transfer, the high-order 16-bit data is output to the D2 bus 312, and the low-order 16-bit data is output to the D3 bus 313. For the execution of a transfer instruction, an absolute value calculation instruction and a maximum or minimum value setting instruction, the outputs of the a and B latches 202 and 203 are connected to the multiplexer 207, through which the values held in the latches 202 and 203 can be transferred to the accumulator 208 and the register file 115.

Reference numeral 210 denotes a priority encoder that receives the value held in the B latch 203, calculates the shift amount necessary for normalizing the number of fixed-point formats, and outputs the result of calculation to the D2 bus 312 or D3 bus 313 for transfer to the register file 115. Reference numeral 212 and 213 denote X and Y latches that serve as input registers of the multiplier 211, receive 16-bit values on the S4 bus 304 and S5 bus 305, and zero-extend or sign-extend the respective 16-bit inputs to 17-bits data. The multiplier 211 is a 17 bits by 17 bits multiplier, which multiplies the value held in the X latch 212 by the value held in the Y latch 213. When the second operation unit 117 receives a multiply-add or multiply-subtract instruction, the multiplier 211 writes the result of its multiplication in the P latch 214, from which it is transferred to the B latch 203. When the destination operand indicates the accumulator 208 in the multiply instruction, the second operation unit 117 writes the result of multiplication by the multiplier 211 in the accumulator 208 via the multiplexer 207.

Reference numeral 215 denotes a barrel shifter that performs an up-to-16-bit arithmetic/logic shift of 40- or 16-bit data; 216 denotes a shift count (SC) latch that receives as a shift count the immediate value data or register value via the S5 bus 305; and 217 denotes a shift data (SD) latch that receives as shift data the value held in the accumulator 208 or the value output therefrom on the S4 bus 304. The barrel shifter 215 performs a shift specified by the operation code for the shift data in the SD latch 217 by the shift count specified by the SC latch 216. The result of the shift operation is provided to the saturation circuit 209, wherein it is subjected to saturation as required as is the case with the result of calculation by the ALU 201, thereafter being fed to the multiplexer 207. The value fed to the multiplexer 207 is written back to the accumulator 208, or to the register file 115 via the D2 bus 312 and the D3 bus 313.

Reference numeral 218 denotes an immediate value latch that extends 6-bit immediate value generated by the second decoder 114 to a 16-bit value and holds and transfers the 16-bit immediate value to the second operation unit 117 via the S5 bus 305. The immediate value latch 218 also generates a bit mask for a bit manipulation instruction.

The operation of the first embodiment will be described below.

Figure 12:
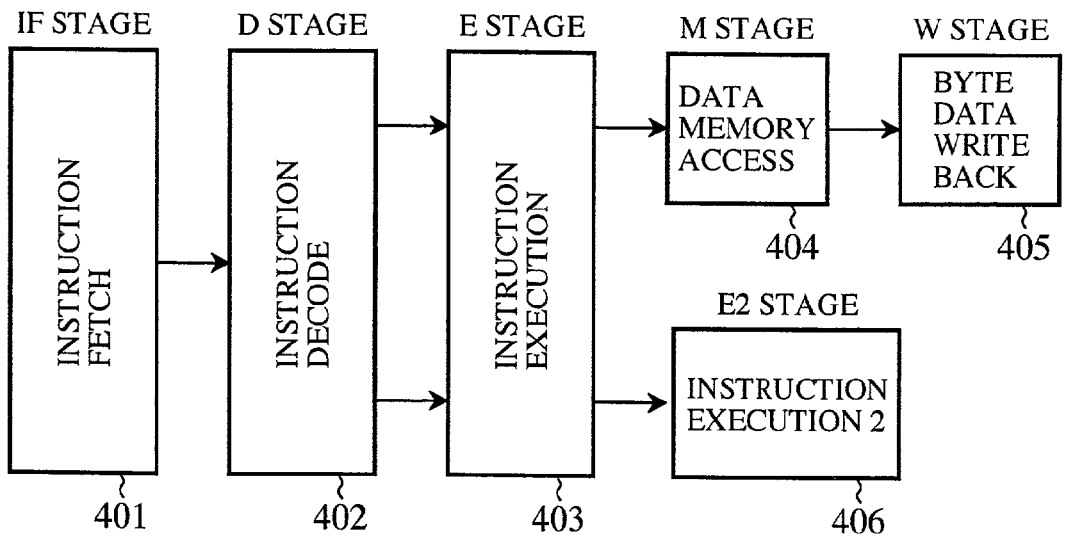
FIG. 12 illustrates pipeline processing for the data processor according to the first preferred embodiment of the present invention.

A description will be given first of pipeline processing in the data processor of this embodiment. FIG. 12 depicts the pipeline processing. The data processor performs 5-stage pipeline processing comprising an instruction fetch (IF) stage 401 for fetching instruction data, an instruction decode (D) stage 402 for analyzing instructions, an instruction execution (E) stage 403 for executing operations, a memory access (M) stage 404 for accessing a data memory, and a write back (W) stage 405 for writing byte operands loaded from a memory to a register. The write of the results of operations in the E stage 403 into a register reaches completion in the E stage 403. The write into the register at the time of loading a word (2-byte) or 2 words (4-byte) is completed in the W state 404. Multiply-add/multiply-substract instructions are executed by pipeline processing including two more stages of multiplication and addition. The latter stage processing will hereinafter be referred to as an instruction execution 2 (E) stage 406. A sequence of multiply-add/multiply-subtract operations can be executed with the throughput of once/one clock cycle.

In the IF stage 401, a fetch of instruction, management of the instruction queue 111 and repeat control are mainly performed. The IF stage 401 controls the operations of the instruction fetch unit 102, the internal instruction memory 103, the external bus interface unit 106, the instruction queue 111 and some of the PC unit 118 (the IA register 181, the latch 182, the incrementor 183, the TRPTC register 175, the latch 176, the decrementor 177, the zero detector 178, and the comparators 182 and 172), and the control unit 112 for IF stage control, instruction fetch control and the PC unit 118. The IF state 401 is initialized by a jump in the E stage 403.

The instruction fetch address is held in the IA register 181 in FIG. 10. Upon occurrence of a jump in E stage 403, the IA register 181 receives a jump address via the JA bus 323 under the control of the control unit 112. As a result, the IA register 181 is initialized. For sequential fetch of instruction data, the control unit 112 causes the incrementor 183 to increment the address held in the IA register 181 by 1, and writes back the incremented value to the IA register 181. In the case of returning to the first instruction in the repeat block after the execution of the last instruction during repeat processing and at the end of the repeat processing, the control unit 112 changes the instruction processing sequence in the IF stage 401. In the former case, the PC unit 118 transfers the address held in the RPT_S register 184 to the IA register 181 via the latch 185 and the JA bus 323 under the control of the control unit 112. In the latter case, the address value having the content of the RPT_E register 186 added with 1 is transferred to the IA register 181 via the latch 174 and the JA bus 323.

The value in the IA register 181 is sent to the instruction fetch unit 102, which in turn fetches instruction data in accordance with the input value. When the corresponding instruction data is stored in the internal instruction memory 103 shown in FIG. 8, the instruction fetch unit 102 reads out the instruction code from the internal instruction memory 103. In this instance, a 32-bit instruction fetch is completed within one clock cycle. When no corresponding instruction data is stored in the internal instruction memory 103, the instruction fetch unit 102 sends an instruction fetch request to the external bus interface unit 106. The external bus interface unit 106 arbitrates between the instruction fetch request and a request from the operand access unit 104. The external bus interface unit 106 reads out the instruction data from an external memory and sends it to the instruction fetch unit 102. The external bus interface unit 106 is capable of accessing the external memory within a minimum of two clock cycles. The instruction fetch unit 102 transfers its received instruction to the instruction queue 111.

The instruction queue 111 is a 2-entry queue, and provides the instruction code received under FIFO control to the instruction decode unit 119 of the control unit 112. The instruction queue 111 holds, together with the instruction code corresponding to the instruction queue, repeat block last instruction information indicating that the content of the TRPT_C register 175 is not zero and that the instruction fetch address coincides with the content of the RPT_E register 186, or repeat processing last instruction information indicating that the content of the TRPT_C register 175 is zero and that the instruction fetch address coincides with the content of the RPT_B register 171 (that is, when the coincidence information by the comparator 172 indicates the coincidence). The instruction queue 111 outputs such repeat processing last instruction information to the instruction decode unit 119 together with the corresponding instruction code. Incidentally, when the contents of the RPT_E register 186 and RPT_B register 171 coincide, the repeat processing last instruction information is sent. In the subsequent stages, instruction-independent hardware control, associated with repeat processing, is effected base on the repeat block last instruction information and the repeat processing last instruction information.

In the D stage 402, the instruction decode unit 119 analyzes the operation code and generates control signals for the execution of instructions in the first operation unit 116, the second operation unit 117 and the PC unit 118. The D stage 402 is initialized by a jump in the E stage 403. When the instruction code sent thereto from the instruction queue 111 is invalid, the instruction decode unit 119 enters an idle cycle, waiting for the reception of a valid instruction code. When the E stage 403 cannot begin the next processing, the instruction decode unit 119 invalidates the control signals for the first operation unit 117, the second operation unit 117 and so forth, waiting for the termination of processing of the preceding instruction in the E stage 403. For example, such a condition occurs when the instruction being executed in the E stage 403 is a memory access instruction and the memory access in the M stage 404 is not terminated.

Figure 13:
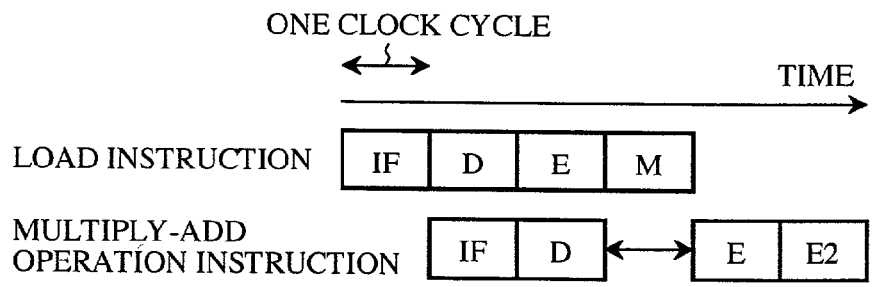
FIG. 13 illustrates an example of a load operand interference.
Figure 14:
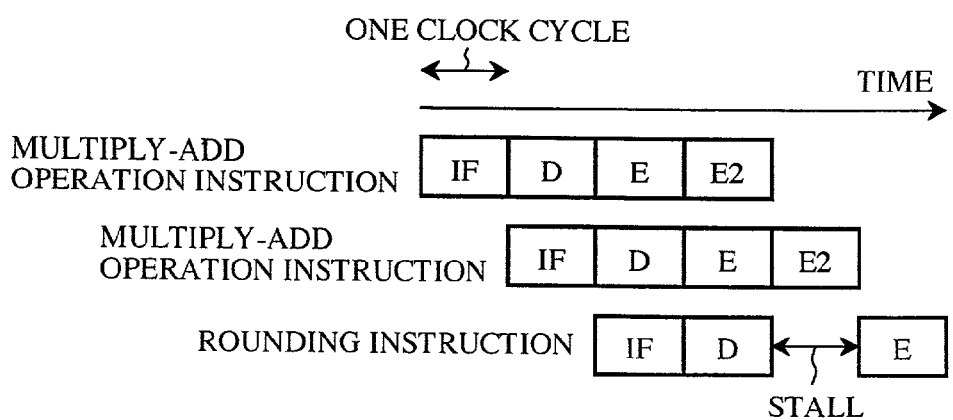
FIG. 14 illustrates an example of an arithmetic hardware interference.

In the D stage 402, the instruction decode unit 119 also performs the division of two instructions to be sequentially executed and sequence control of 2-cycle execution instruction. Further, the instruction decode unit 119 makes a conflict check of a load operand by using a scoreboard register (not shown) and a conflict check of an operating means in the second operation unit 117. If a conflict is detected, the instruction decode unit 119 inhibits the outputting of the control signals until the conflict is cancelled. FIG. 13 shows an example of the load operand conflict. When a 1- or 2-word load instruction is immediately followed by a multiply-add operation instruction that refers to an operand to be loaded, the instruction decode unit 119 inhibits the start of execution of the multiply-add operation instruction until the loading of the operand in the register is completed. In this instance, a 1-clock-cycle stall occurs even if a memory access ends within one clock cycle. When byte data is loaded, a 2-clock-cycle stall occurs since a write in the register file 115 terminates in the W stage 405. FIG. 14 shows an example of an operation hardware conflict. For example, when a multiply-add operation instruction is immediately followed by a rounding instruction using an adder, the instruction decode unit 119 inhibits the start of execution of the rounding instruction until the preceding multiply-add operation ends. In this case, a 1-clcok-cycle stall occurs. No stall occurs when multiply-add instructions are executed in succession.

The first decoder 113 generates control signals mainly for controlling: the first operation unit 116 in its entirety; parts of the PC unit 118 except those placed under the control of the IF stage 401; and the readout from the register file 115 to the S1 bus 301, the S2 bus 302 and the S3 bus 303 and the write therein from the D1 bus 311. Further, the first decoder 113 generates instruction-dependent control signals necessary for processing in the M stage 404 and the W stage 405, and transfers thereto the control signals in accordance with the flow of pipeline processing. On the other hand, the second decoder 114 generates control signals mainly for controlling the execution in the second operation unit 117, the readout from the register file 115 to the S4 bus 304 and the S5 bus 305 and the write therein from the D2 bus 312 and the D3 bus 313.

The instruction decode unit 119 generates, based on the repeat block last instruction information and repeat processing last instruction information received from the instruction queue 111, a control signal for updating the NPC 191 and a control signal for updating the RPT_C register in FIG. 10 and a control signal for updating RP bit 43 of the PSW latch 222 in FIG. 9 that are instruction-independent repeat processing.

The E stage 403 performs processing for the execution of almost all instructions except a memory access and the addition of a multiply-add/multiply-subtract operation, such as arithmetic operations, comparison, data transfer between registers including control registers, calculation of the operand address of a load/store instruction, calculation of a jump address of a jump instruction, jump processing, EIT (generic name for exception, interruption, and trap) detection and jump to each EIT vector address.

An enabled interrupt is always detected at the end of a 32-bit instruction. Accordingly, no interrupt is accepted between two short instructions that are executed one after the other in the 32-bit instruction.

When the instruction being processed in the E stage 403 is an operand access instruction and the memory access in the M stage 404 has not been completed, the processing of the instruction in the E stage 403 is held incomplete until completion of the memory access. In this case, the E stage 403 is placed under the control of the control unit 112.

In the E stage 403, the ALU 153 of the first operation unit 116 performs arithmetic and logic operations, comparison and transfer. The ALU 153 further conducts an address calculation of the memory operand including modulo control and an address calculation of a branch destination. The register file 115 outputs to the S1 bus 302, the S2 bus 302 and the S3 bus 303 the value held in the register specified as the operand. The ALU 153 conducts the required operation or address calculation, using the value provided on these values or extended data received, as required, such as immediate or displacement value. The result of operation is written, via the D1 bus 311, in that one of the general-purpose register in the register file 115 that is specified by the operand. When the load/store instruction is provided, the data processor transfers the ALU output as the operand address to the operand access unit 104 via the AO latch 154 and the OA bus 321. When supplied with the jump instruction, the data processor transfers the ALU output as the jump address to the PC unit 118 via the JA bus 323. The first operation unit 116 transfers the store data provided from the register file 115 onto the S1 bus 301 and the S2 bus 302 to the alignment circuit 162 via the SD register 160 and the latch 161. And the alignment circuit 162 aligns its received data. The PC unit 118 manages the PC value of the instruction being executed and generates the address of the instruction to be executed next. The data transfer between the control registers (except the accumulators) in the first operation unit 116 and in the PC unit 118 and the register file 118 is carried out via the S3 bus 303 and the D1 bus 311.

In the E stage 403, the second operation unit 116 performs all operations except addition of the multiply-add operation, such as arithmetic and logic operations, comparison, transfer and shift. Having received from the operand from the register file 115, the immediate value register 218 or accumulator 208 via the S$ bus 304, S5 bus 305, or some other dedicated path, each operation means of the second operation unit 116 conducts the specified operation. The result of each operation is written back to the accumulator 218 or the register file 115 via the D2 bus 312 and the D3 bus 313.

The value held in the PSW latch 222, based on the results of operations by the first and second operation units 116 and 117, is also updated in the E stage 403. Since the results of the operations are determined late in the E stage 403, however, the actual updating of the value held in the PSW latch 222 is carried out in the next clock cycle. On the other hand, the update of the value held in the PSW latch 222 by the data transfer thereto terminates in the corresponding clock cycle.

In the E stage 403, updating of the PC value independent of the instruction to be executed and repeat control are also performed. Upon each start of processing a 32-bit instruction, the PC unit 118 transfers the held in the latch 192 to the EPC 194 under the control of the control unit 112. The NPC 119 holds the address of the instruction to be processed next. When a jump occurs in the E stage 403, the jump address generated by the ALU 153 of the first operation unit 116 is transferred via the JA bus to the NPC 191 to initialize it. For sequential processing of instructions, upon each start of processing of the 32-bit instructions, the PC unit 118 writes back to the NPC unit 191 the 1-incremented value by the incrementor 193 under the control of the control unit 112. At the start of processing of the repeat block last instruction, the NPC 191 receives the first address of the repeat block from the latch 185. At the start of processing of the repeat processing last instruction, the NPC 191 receives from the latch 174 the address of the next instruction. And, in the clock cycle in which to terminate the processing of the repeat block last instruction, the PC unit 118 transfers from the latch 176 to the RPT_C register 188 the count value already decremented by 1 in the IF stage 401 under the control of the control unit 112. In the clock cycle in which to terminate the processing of the repeat processing last instruction, the control unit 112 clears the RP bits 43 of the PSW latch 222 to zero.

The control signals generated by the second decoder 114 for addition and subtraction of the multiply-add/multiply-subtract operation are held under the control of the E stage 403. The memory access information and load register information are sent to the M stage 404. The control unit 112 controls the E stage 403 as well.

In the M stage 404 the address sent from the first operation unit 116 is used to access the operand memory. The operand access unit 104 reads/writes the operand from/to the internal data memory 105 or on-chip I/O (not shown) once in one clock cycle. When the operand is not in the internal data memory 105 or on-chip I/, the operand access nit 104 sends a data access request to the external memory. The external bus interface unit 106 makes a data access to the external memory, and in the case of a load instruction, transfers the read-out data to the operand access unit 104. The external bus interface unit 106 is capable of accessing the external memory within a minimum of two clock cycles. In the case of the load instruction, the operand access unit 104 provides the read-out data onto the OD bus 322. In the case of a byte data load instruction, the LD register 164 reads therein the load data on the OD bus 322. In the case of a 1- or 2-word data load instruction, the register file 115 directly reads therein the load data on the OD bus 322. In the case of a store instruction, the first operation unit 116 transfers the store data value, aligned under the control of the control unit 112, from the alignment circuit 162 to the operand access unit 104, effecting a write in the memory specified. The control unit 112 controls the M stage 404 as well.

In the W stage 405, the first operation unit 116 transfers the load operand (byte) in the LD register 164 to the latch 165 and thence to the alignment circuit 166, wherein it is subjected to alignment and zero/sign extension, thereafter being output onto the W bus 314. The register file 115 writes the load data on the W bus 314 into the register specified by the instruction.

In the E stage 406, the ALU 201 of the second operation unit 117 depicted in FIG. 11 conducts the addition and subtraction of the multiple-add/multiple-subtract operation, and writes back the results of the addition and subtraction to the accumulator 208.

The data processor according to Embodiment 1 effects internal control based on the input clock. Each pipeline stage requires a minimum of one clock cycle to terminate processing. The clock control is not directly related to the present invention, and hence it will not be described.

Next, a description will be given of an example of processing of sub-instructions.

The processing of operation instructions for addition and subtraction, logic operation and comparison and a register-to-register transfer instruction terminates in three stages: the IF stage 401, the D stage 402, and the E stage 403. The operations and data transfer are performed in the E stage 403. When the multiply-add/multiply-subtract instruction is executed, the E stage 403 for the multiplication and the E2 stage 406 for addition and subtraction are each processed in one clock cycle. That is, the execution of the multiply-add/multiply-subtract operation instruction requires 4-stage processing.

The execution of the byte load instruction requires five stages: IF stage 401, the D stage 402, the E stage 403, the M stage 404 and the W stage 405. The execution of the 1-/2-word load or store instruction requires four stages: the IF stage 401, the D stage 402, the E stage 403 and the M stage 404.

In the case of an unaligned access, the operand access unit 104 divides the unaligned access into two under the control of the M stage 404, and accesses the memory accordingly. For an instruction that requires two clock cycles for execution, the first and second instruction decoders 113 and 114 generate control signals for each clock cycles, and execute the instruction in two clock cycles.

When one 32-bit instruction is formed by one long instruction, the execution of the 32-bit instruction is completed by executing the long instruction. When two short instructions are executed in parallel, the number of clock cycles necessary for their execution is determined by that one of the two short instructions which requires a larger number of processing cycles. For example, the parallel execution of a 2-clock-cycle instruction and a 1-clock-cycle instruction requires two clock cycles. The execution of two short instructions is performed by their sequential decoding. For instance, when two addition instructions whose execution terminates in one clock cycle are executed sequentially, both the D stage 402 and the E stage 403 requrie one clock cycle for processing each addition instruction; a total of two clock cycles is needed for the execution of each addition instruction. In parallel to the execution of the preceding instruction in the E stage 403, the subsequent instruction is decoded in the D stage 402.

Next, a detailed description will be given of the repeat processing operation of the data processor according to Embodiment 1.

Figures 15, 16:
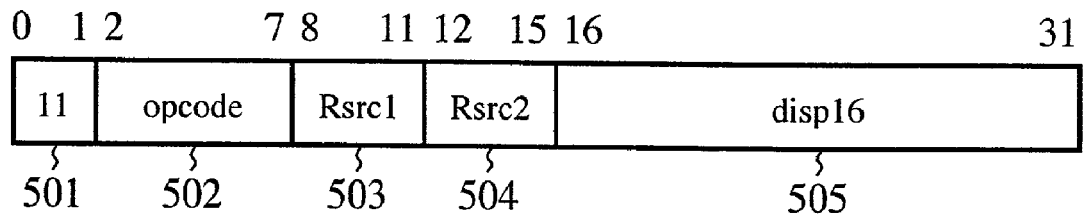
FIG. 15 illustrates the format of a repeat instruction "REP Rsrc1, Rsrc2, disp16"
FIG. 16 illustrates an example of a program described in an assembler for a multiply-add operation and including an REP instruction.

FIG. 15 illustrates the bit assignment of a repeat instruction "REP Rsrc1, Rsrc2, disp16". The repeat instruction has the format of the long instruction depicted in FIG. 6. Reference numeral 501 denotes an FM bit, which is "11" indicating the long format in this example; 502 denotes an operation code; and 503 denotes a register number Rsec1 for specifying the repeat break address where repeat processing in the repeat block is terminated. The repeat break address is specified by a displacement from the start instruction address in the repeat block, and this displacement value is set in the Rsec1. When no branch or the like occurs in the repeat block, the value that is set in Rsrc1 equals the "number of instructions in the repeat block that are executed in the last repeat cycle −1". It is possible to specify, as the repeat break address, the address of a given instruction in the repeat block (but a displacement from the start instruction address). The address of the start or last instruction of the repeat block may also be used. Reference numeral 504 denotes a register number Rsrc2 for specifying the register that holds "repeat count of the repeat block (including the last processing in which to cause a break prematurely) −1"; and 505 denotes a displacement value disp16 from the last repeat instruction in the repeat block. Accordingly, the repeat block is equal to the range from the instruction immediately following the repeat instruction to the instruction specified by disp16. In Embodiment 1, let it be assumed, for convenience of pipeline processing, that no operation is guaranteed when the repeat block includes fewer than two 32-bit instructions, or when the value set in the register specified by the register number Rsrc2 is "0" and the value set in the register by the register number Rsrc1 is smaller than "2".

Now, the operation of this embodiment will be described concretely with reference to the following multiply-add operation.

$$\sum_{i=0}^{N-1}(A[i]*B[i]) \quad (1)$$

FIG. 16 depicts an example of an assembler-described program for performing the multiply-add operation according to Equation (1) and including a REP instruction. In FIG. 16, each line contains a comment after the semicolon. The symbol "‖" indicates the parallel execution of two short instructions.

In the following, assume that an address A[0]. And an address B[0] and the "number N of multiply-add operations" are set in the general-purpose register R8-9, the general-purpose register R9-10 and the general-purpose register R10-11, respectively. Let it be assumed that A[i] and B[i] (where i=0 to N−1) are each 16-bit data, that A[0] to A[N−1] and B[0] to B[N−1] are respectively stored in this order in the internal data memory 105 at a plurality of storage positions of addresses arranged in ascending order, and that A[0] and B[0] are each 32-bit (4-byte) aligned. Further, assume that the result of the multiply-add operation is rounded to 16 bits and stored in the general-purpose register R0-1.

In the following, the 10 32-bit instructions in FIG. 16 are referred to by I1 to I10, respectively; that one of the two instructions to be executed in parallel which is on the left-hand side of "‖" is referred to by Ixa (where x is any one of 2 to 4 or 6 to 10); and the instruction on the right-hand side of "‖" is referred to by Ixb (where x is any one of 2 to 4 or 6 to 10). For example, instructions LD2W and SRLI in the instruction I2 will be identified by I2a and I2b, respectively. The instructions I1 to I4 are preprocessing instructions for repeat processing; the instruction I5 is a repeat instruction; instructions I6 to I9 constitute a repeat block; and the instruction I10 is a postprocessing instruction.

In the data processor according to Embodiment 1, when two pieces of array data assigned to two different areas are loaded, different load instructions are needed to read them out. Further, since data loading is carried out in the M stage 404, it is necessary for the execution of the multiply-add operation without pipeline stall that the operand data to be referred to by the multiply-add instruction be loaded by an instruction to be executed more than two clock cycles earlier even if the operand data is stored in the internal data memory 105. Accordingly, the execution of the multiply-add operation with one throughput in one clock cycle requires the use of at least four instructions for repeat processing. The four general-purpose registers R0-1 to R3-4 are used as A[i] buffers, and the four general-purpose registers R4-5 to R7-8 are used as B[i] buffers.

In the case of executing an AND3 instruction in I1, the data held in the general-purpose register R10-11 and immediate value data "3" are ORed for each bit, and the result of the ORing are written in the general-purpose register R11-12. As shown in I5 in FIG. 16, the value held in the general-purpose register R11 is specified by the register number Rsrc1 in the repeat instruction. The SRLI instruction in I2b is an arithmetic 2-bit right shift instruction for the value held in the general-purpose register R10-11. The value held in the general-purpose register R10-11 is specified by the register number Rsrc2 in the repeat instruction. For example, when N in Equation (1) is 10, the initial value set in the general-purpose register R10-11 is "9", and as the result of the execution of the instructions I1 and I2, "2" and "1" are written in the general-purpose registers R10-11 and R11-12, respectively. The NOP instruction in I3b is a no operation instruction. This instruction is provided for the alignment of the instruction code, and even if it is executed, no effective operation is performed. The CLRAC instruction in I4b is an instruction for clearing the accumulator A0-31 to zero.

To start the repeat processing, loading of the operand data needs to be done as preprocessing. The preprocessing is carried out by LD2W instructions in I2a, I3a and I4a. For instance, the LD2W instruction in I2a is a 2-word load instruction of the register indirect mode with postincrement. When this instruction is executed, two pieces of 16-bit data starting at the address specified by the general-purpose register R8-9 are loaded in the general-purpose registers R0-1 and R1-2, respectively, and the value held in the general-purpose register R8-9 is postincremented by 4 corresponding to the operand size.

The data processor executes next the REP instruction in I5. The REP instruction is executed in two clock cycles. In the first clock cycle the RPT_E register 186 and the RPT_C register 188, which corresponds to the control register CR9-28 (RPT_E) and the control register CR7-26 (RPT_C) in FIG. 1, respectively, are set, and in the second clock cycle the RPT_B register 171 and the RPT_S register 184, which corresponds to the control register CR6-25 (RPT_B) and the control register CR8-27 (RPT_S) in FIG. 1, respectively, are set, and the RP bit 43 of PSW in the control register CR0-21 is set to "1".

In the first clock cycle, the PC unit 118 outputs the PC value of the REP instruction onto the S3 bus 303 from the EPC 194 under the control of the control unit 184. The AA latch 151 in the first operation unit 116 reads therein the PC value output on the S3 bus 303. The AB latch 152 reads therein the displacement value that is specified by disp16 of the REP instruction provided from the first decoder 113. The ALU 153 in the first operation unit 116 adds together the values held in the AA and AB latches 151 and 152 to calculate the address of the instruction I9 that is the address of the last instruction in the repeat block. The first operation unit 116 provides the result of the calculation by the ALU 153 onto the JA bus 323 under the control of the control unit 112, and the RPR_E register 186 in the PC unit 118 reads therein the result of the calculation provided on the JA bus 323. Thereafter, the incrementor 173 in the PC unit 118 increments the value in the RPT_E register 186 by 1. The incremented value is written in the latch 174. As a result, the latch 174 holds the address of the next instruction in the repeat block, that is, the address of the instruction I10. In parallel to the above processing the value, which is specified by the register number Rsrc2 in the REP instruction, that is, the value held in the general-purpose register R10-11, is transferred via the S1 bus 301 to the latch 169 in the first operation unit 116, and further, it is written in both of the RPT_C register 188 and the TRPT_C register 175 via the selector 155 and the D1 bus 311. And the value thus written in the RPT_C register 188 is further transferred to the latch 179.

In the second clock cycle, the NPC 191 in the PC unit 118 holds the address of the instruction I6 that is the address of the repeat block start instruction. The PC unit 118 outputs the value held in the NPC 191 to the S3 bus 303 under the control of the control unit 112. The AB latch 152 in the first operation unit 116 reads therein the value output on the S3 bus 303. The value held in the general-purpose register R11-12, which is specified by the register number Rsrc1 of the REP instruction, is transferred via the S2 bus 302 to the AA latch 151 in the first operation unit 116. The ALU 153 adds together the values held in the AA latch 151 and the AB latch 152 to calculate the address of the instruction that is executed last in the repeat processing. The first operation unit 116 provides the result of the calculation by the ALU 153 onto the JA bus 323 under the control of the control unit 112. The RPT_B register 171 of the PC unit 118 reads therein the result of the calculation provided on the JA bus 323. In parallel to the above processing the PC unit 118 transfers the value held in the NPC 191 to the RPT_S register 184 via the latch 192 and the D1 bus 311. After this, the PC unit 118 further transfers the value held in the RPT_S register 184 to the latch 185. And the control unit 112 sets the RP bit of the PSW latch 222 to "1".

Figure 17:
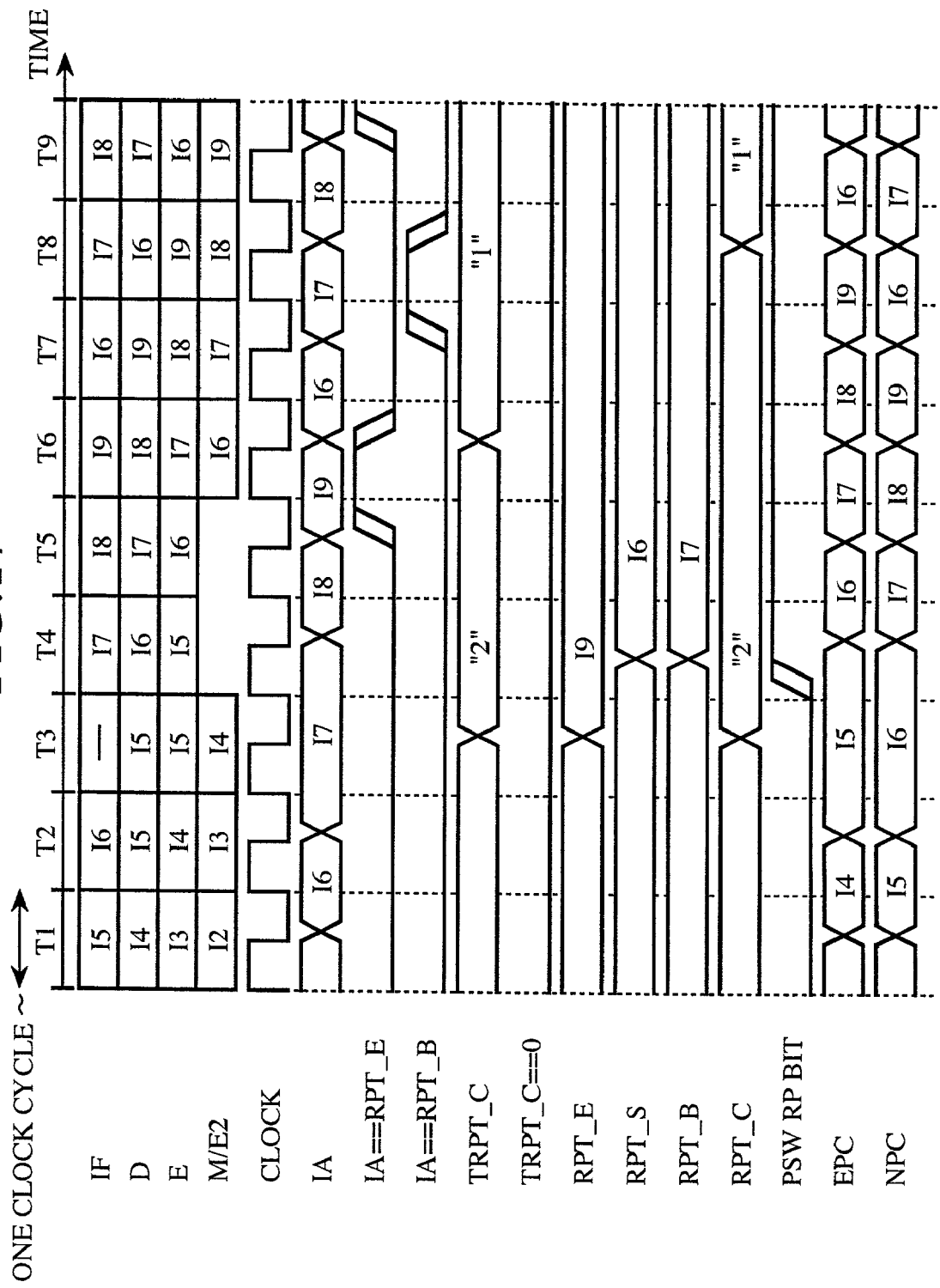
FIG. 17 is a timing chart of pipeline processing form the execution of the REP instruction to the completion of repeat processing in the program of FIG. 16 according to the first preferred embodiment of the present invention.
Figure 18:
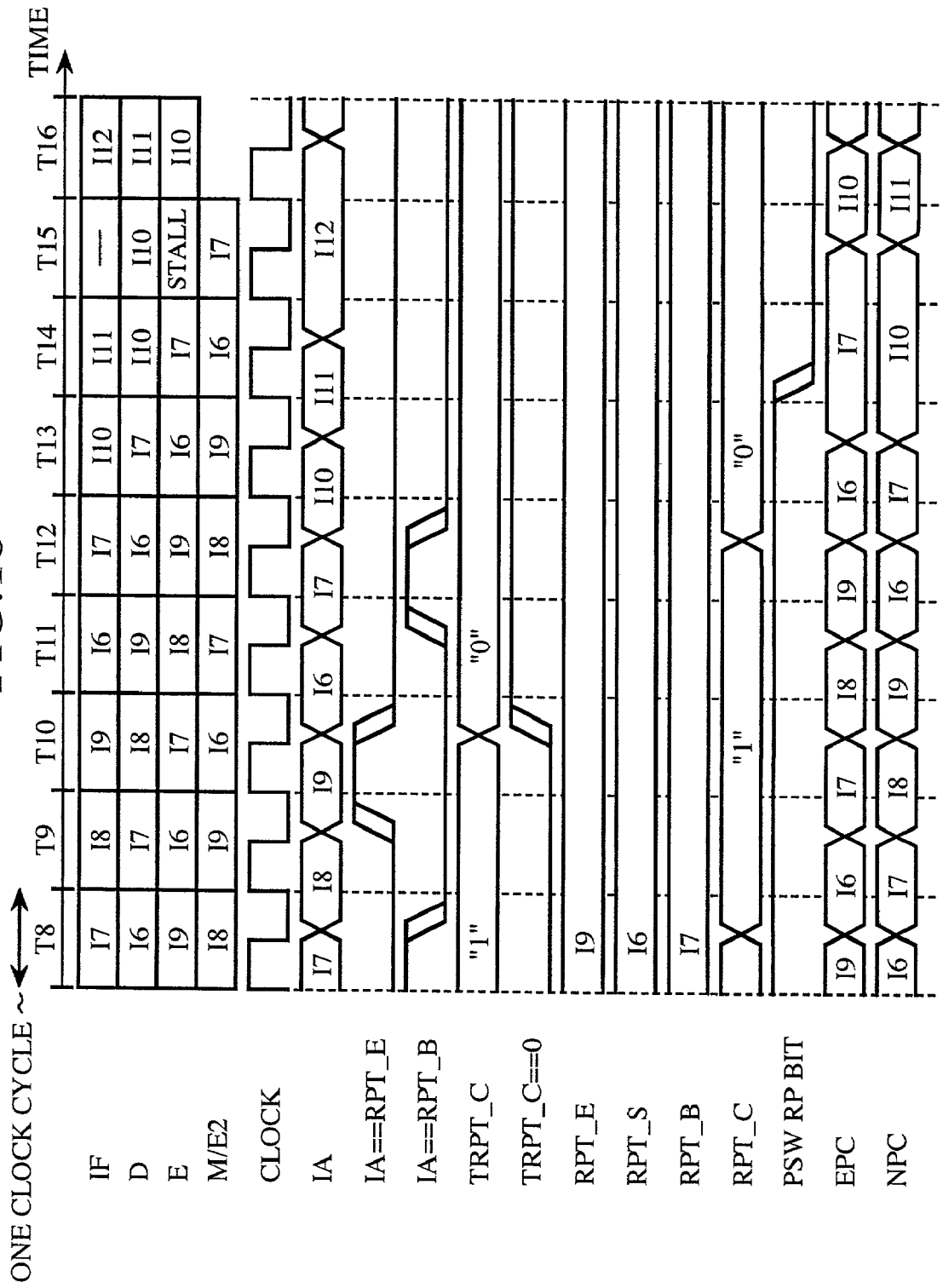
FIG. 18 is a timing chart of pipeline processing form the execution of the REP instruction to the completion of repeat processing in the program of FIG. 16 according to the first preferred embodiment of the present invention.

FIGS. 17 and 18 are timing charts showing pipeline processing from the execution of the REP instruction to the completion of the repeat processing in the program depicted in FIG. 16. The two charts show an unbroken sequence of operations, and two clock cycles T8 and T9 are shown in both of them with a view to facilitating a better understanding of the description given below. The upper four rows show processing of the respective pipeline stages, and the other lower rows show values held in registers and signal values that are associated with repeat processing. For simplicity sake, each instruction and each address will be referred to provisionally as instructions such as I5 or the like. "IA==RPT_E" and "IA==RPT_B" indicate the results of comparison by the comparators 187 and 172, respectively, and "TRPT_C==0" indicates the output from the zero detector 178. FIGS. 17 and 18 depict pipeline processing for performing the multiply-add operation 10 times. In the illustrated example, the last instruction in the repeat processing is the instruction I7, and the processing of the repeat block by four instructions I6 to I9 is performed two more times, followed by the execution of the two instruction I6 and I7 and then by the execution of the instruction I10.

As depicted in FIG. 17, the data processor executes the REP instruction I5 in two clock cycles T3 and T4. As mentioned above, the four instructions I6 to I9 are the repeat block, and the data processor repeatedly executes these instructions. The data processor executes the 2-word load (LD2W) instruction and the multiply-add operation (MAC) instruction in parallel. For example, when the MAC instruction of 16b is executed, the value held in the general-purpose register R0-1 and the value held in the general-purpose register R4-5 are multiplied, then the result of the multiplication and the value held in the accumulator A0-31 are added together, and the result of the addition is written back to the accumulator A0-31. for the execution of one multiply-add operation in one clock cycle without causing a load operand conflict, the pieces of data that are referred to by the instruction I6 and I7 are the instruction I7 and I8, and the pieces of data that are referred to by the instruction I8 and I7 are loaded by the instructions I9 and I6. Since details of the multiply-add operation are not directly related to the present invention, no description will be given.

Next, a detailed description will be given of instruction processing sequence control during repeat processing that is effected hardware-wise independently of the instruction to be executed next.

The switching of the processing sequence from the current to the next instruction takes place in the IF stage 401. At this time, the comparator 187 of the PC unit 118 compares the instruction fetch address held in the IA register 181 with the address of the repeat block last instruction held in the RPT_E register 186. The comparator 172 compares the instruction fetch address held in the IA register 181 with the address of the instruction to be executed last in the repeat processing, held in the RPT_B register 171.

If the instruction I9 is fetched in the case where the RP bit of the PSW latch 222 is set to "1" (the repeat being processed) and the value held in the TRPT_C register 175 is non-zero, the result of the comparison by the comparator 187 indicates a match between the values compared with each other, and based on such a result of comparison, the control unit 112 decides that the first instruction in the repeat block is the instruction to be executed next. The clock cycle T6 and the clock cycle T10 in FIG. 18 correspond to this state. When the address of the instruction I6 held in the latch 185, which is the first instruction in the repeat block, is transferred via the JA bus 323 to the IA register 181 after completion of the outputting of the address of the instruction I9, the instruction fetch unit 102 fetches the instruction I6. In the two clock cycles T6 and T10 the decrementor 177 decrements the value held in the TRPT_C register 175 by 1, and the decremented value is written back thereto. In this while, if the value held in the TRPT_C register 175 is non-zero, the control unit 112 ignores the result of the comparison by the comparator 172.

The repeat block last instruction information is transferred in the pipeline in synchronization with the execution of the instruction I9, and this information is used to perform the following processing. Prior to the start of the execution of the instruction I9 in the E stage 403 (two clock cycles T7, T11), the PC unit 118 transfers the address of the instruction I6 from the latch 185 to the NPC 191 as the PC value of the instruction to be executed next. Upon completion of processing of the instruction I9 in the E stage 403, the PC unit 118 transfers the value held in the TRPT_C register 175 to the RPT_C register 188 and the latch 179 via the latch 176 in the two clock cycles T8 and T12. Accordingly, the RPT_C register 188 always holds state update information associated with the execution instruction in the E stage 403.

When the instruction I7 is fetched in the case where the RP bit of the PSW latch 222 is "1" (the repeat being processed) and the value held in the TRPT_C register 175 is zero, the result of the comparison by the comparator 172 indicates a match between the values compared with each other. The clock cycle in FIG. 18 corresponds to this state. When the PC unit 118 transfers the address of the instruction I10 held in the latch 174, which is the next instruction in the repeat block, to the IA register 181 via the JA address 323 under the control of the control unit 112, the instruction fetch unit 102 fetches the next instruction I10. In this case the decrementor 177 does not decrement the value held in the TRPT_C register 175.

The repeat processing last instruction information is transferred in the pipeline in synchronization with the execution of the instruction I7, and this information is used to perform the following processing. Prior to the start of the execution of the instruction I7 in the E stage 403 (clock cycle T13), the PC unit 118 transfers the address of the instruction I10 from the latch 174 to the NPC 191 as the PC value of the instruction to be executed next. Upon completion of processing of the instruction I7 in the E stage 403, the control unit 112 clears the RP bit 43 of the PSW latch 222 to zero, with which the repeat processing terminates.

Upon completion of the repeat processing, the next instruction (I10) in the repeat block is performed. The RACHI instruction in I10a is an instruction by which bits 8 to 23 (A0H) held in the accumulator A0-31 are rounded to 16 bits, the rounded 16-bit value is subjected to saturation processing and the result of the saturation is written in the general-purpose register R0-1. In this example, since the MAC instruction of I7b and the RACHI instruction of I10 causes an operation hardware conflict, the instruction I10 is executed in the clock cycle T16 after the processing of the instruction I7 in the E stage 406 I the clock cycle T15.

While in the above the repeat processing last instruction is the instruction I7, the repeat processing last instruction is not limited specifically thereto but may be any instructions in the repeat block such as the repeat block start instruction I6 or the last instruction I9 in the repeat block. Moreover, the repeat processing last instruction may be an instruction outside the repeat block, such as an instruction in a subroutine for making a subroutine call in the repeat block.

For data loading, three instructions are simultaneously issued and executed.

When a jump instruction is executed in the E stage 403 during repeat processing, the jump processing takes precedence over the repeat-associated preprocessing. In this instance, the ALU 153 of the first operation unit 116 outputs its generated jump address to the JA bus 323, and the NPC 191 and the IA register 181 in the PC unit 118 read therein the jump address on the JA bus 323. When a jump of the execution stage is caused, the PC unit 118 transfers the value held in the latch 179 to the TRPT_C register 175, clearing the preceding update information held therein. However, when the jump is caused by the last instruction in the repeat block, however, the PC unit 118 does not transfer the value held in the latch 179 to the TRPT_C register 175; the reason for this is to reflect the updated information in the RPT_C register 188.

Next, a brief description will be given of processing that is performed when an external interruption is accepted during the repeat processing.

The data processor according to Embodiment 1 accepts the external interruption at a break in the 32-bit instruction. Upon detection of an external interruption when the IE bit 42 of the PSW held in the control register CR0-21 is "1", the data processor accepts the interruption. Then the E stage 403 remains in the no operation state for one clock cycle hardware-wise, and the data processor performs 1-clock-cycle interruption processing based on a control signal generated hardware-wise. In the first place, the PC unit 118 transfer the PC value of the instruction to be executed next, which is held in the NPC 191, to the EPC 194 via the latch 192 in the clock cycle preceding the interruption processing. This is intended to return the address of the instruction, which is executed after the interruption processing, to the value held in the EPC 194. The following processing is performed in the interruption processing cycle. The PC unit 118 saves the value held in the EPC 194 to the BPC 196 via the latch 195. And the data processor saves the value held in the PSW latch 222 to the BPSW register 168 in the first operation unit 116 via the D1 bus 311. Then, the PSW unit 221 of the control unit 112 clears the PSW latch 222 to zero hardware-wise. And the data processor generates hardware-wise the address of the instruction to be executed first in the interruption processing predetermined as the specification, and transfer the instruction address to the AB latch 152 of the first operation unit 116. The ALU 153 in the first operation unit 116 adds the value held in the AB latch 152 with 0, and outputs the result of the addition to the JA bus 323. The PC unit 118 reads in the NPC 191 and the IA register 181 the result of the addition on the JA bus 323, and performs the jump processing. During the interruption processing, since the RP bit 43 of the PSW latch 222 is zero-cleared, the repeat processing preceding the interruption is suspended. The BPSW register 168 of the first operation unit 116 holds information indicating that the repeat had been processed before the interruption was accepted.

The data processor according to this embodiment has an instruction for data transfer between the control and general-purpose registers depicted in FIG. 1. It is possible to save, as context information, the value held in a repeat-associated control register to a memory in an interruption handler prior to the interruption processing and to return the contents in the control register to the original value after the interruption processing. In the case of transferring the value held in the control register to the general-purpose register, the value is output to the S3 bus 302 from the control register and is transferred to the register file 115 via the AB latch 155 and the D1 bus 311. In the opposite case, the value to be returned is output to the S3 bus 303 from the register 115 and is written in each control register via the AB latch 152, the ALU 153 (for addition with 0), the selector 155 and the D1 bus 311. As is the case with the execution of the REP instruction, during updating the repeat-associated control register updating, associated resources necessary for repeat control are also updated. For example, writing to the RPT_C register 188 is accompanied by writing to the TRPT_C register 175. Further, when the RPT_S register 184 and the RPT_E register 186 are updated, the values held in the latches 185 and 175 are also updated accordingly.

In the case of returning from the interruption processing, the context information saved before the interruption processing is returned to the general-purpose registers and the control registers, followed by the execution of the return (RTE) instruction for returning from the interruption processing. Now, consider the case where the repeat had been processed before the interruption was accepted. Prior to the execution of the RTE instruction, the values held in the BPSW register 168 of the first operation unit 116, the BPC 196 of the PC unit 118 and the repeat-associated control registers are restored to the values held therein immediately after the start of the interruption processing. As a result, the bit corresponding to the RP bit of PSW of the BPSW register 168 goes to "1". In this state the data processor execute the RTE instruction. The execution of the RTE instruction includes such processing as described below. The PC unit 118 outputs he value held in the BPC 196 to the S3 bus 303, and the AB latch 152 If the first operation unit 116 reads therein the value on the S3 bus 303. The ALU 153 adds the value held in the AB latch 152 with 0, and outputs the result of the addition to the JA bus 323. The PC unit 118 reads in its NPC 191 and IA register 181 the result of the addition provided on the JA bus 323. As a result, the data processor performs processing for a jump to the address value held in the BPC 196. The first operation unit 116 transfers the value held in the BPSW register 168 to the control unit 112 via the TPSW latch 167, and the PSW latch 222 reads therein the transferred value. In consequence, 1 is set in the RP bit of the PSW latch 222, and the repeat processing is resumed accordingly.

As described above, even if interruption, trap or exception processing is started during repeat processing, the data processor of this embodiment can correctly resume the suspended repeat processing from where it is left off.

The above-mentioned REP instruction permits execution of repeat-associated parameter setting by one instruction, and hence it is very easy to use, but since various resources are set in the stage of executing the REP instruction, an instruction, which is already fetched at the time of executing the REP instruction, cannot be subjected to sequence control when the instruction is fetched. Accordingly, the minimum size of the repeat block and the minimum value of the repeat count at the time of using the REP instruction depends on the pipeline construction and the size of the instruction buffer (instruction queue); hence, the minimum size of the repeat block and the minimum value of the repeat count limited. For example, the REP instruction guarantee no operation when the repeat block includes two or fewer 32-bit instructions, or when the value to be specified by the register number Rsrc1 is "0" and the value to be specified by the register number Rsrc1 is equal to or smaller than "2".

Next, a brief description will be given of a repeat processing starting method different from the described above.

Figure 19:
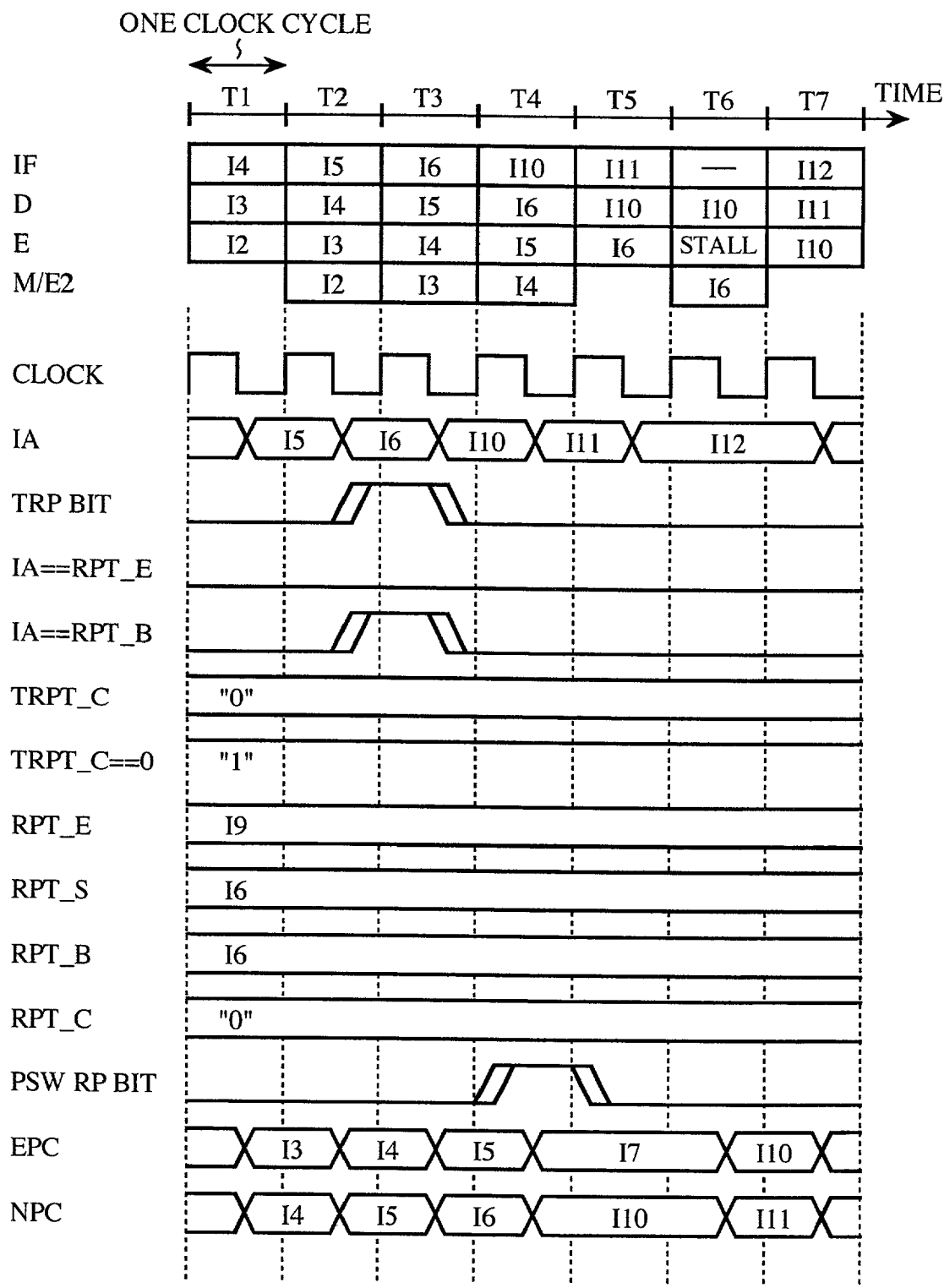
FIG. 19 is a timing chart illustrating an example of processing for executing only one instruction in a repeat block.

The data processor according to Embodiment 1 has a SETRP instruction for setting the RP bit 43 of PSW shown in FIG. 2. FIG. 19 is a timing chart depicting an example of processing for executing only one instruction in the repeat block. In FIG. 19, the instruction I5 is the SETRP instruction, the instruction I6 to I9 forms the repeat block, and the instruction I6 is the last instruction for the repeat processing. Prior to the execution of the SETRP instruction, the data processor executes a transfer instruction by which RPT_S, RPR_E, RPT_C and RPT_B in FIG. 1 are initialized in the control registers corresponding thereto, respectively. RPT_C is set to zero. That is, the data processor writes 0 in each of the RPT_C register 188 and the TRPT_C register 175.

When an instruction are fetched in the IF stage 401, the instruction decode unit 119 predecodes the instruction, and decides whether the instruction is the SETRP instruction. If the fetched instruction is the SETRP instruction, a temporary repeat (TRP) bit is set to "1". The TRP bit is held in a latch (not shown) in the control unit 112, and it is information that is managed in the IF stage 401 preceding the E stage 403. The TRP bit corresponds to the RP bit 43 of PSW. The TRP bit decides whether to perform the repeat processing in the IF stage.

With the TRP bit in the "1" state, hardware repeat (sequence) control is effected as in the case of the REP instruction. When the value held in he TRPT_C register 175 is zero and the value held in the RPT_B register matches the value held in the IA register 181, the control unit 112 clears the TRP bit to zero, terminating the repeat processing.

The RP bit 43 of the PSW latch managed in the E stage 403 is set in the clock cycle T5 in which the SETRP instruction is processed in the E stage 403. When a jump occurs in the E stage 403, the value of the RP bit 43 of the PSW latch 222 managed in the execution stage is written in the TRP bit, and the information updated in the IF stage 401 prior to updating in the E stage 403 but not executed is cancelled.

The pre-encoding of the SETRP instruction for easy discrimination permits reduction of the time for predecoding. Further, it is recommended to prescribe how many instructions the setting of the repeat-associated control registers be completed before the SETRP instruction to meet restrictions on the pipeline processing. In this embodiment, it is necessary that the setting of the repeat-associated control registers be completed two instructions before the SETRP instructions. The SETRP instruction is only to set a flag unlike the REP instruction, and hence it need not be executed immediately before the repeat block. The execution of the SETRP instruction may also be set to precede the repeat block more than two instructions so that it is timed to the progress of pipeline processing. As for the case where the repeat block is not executed after the setting of the repeat-associated control registers according to the result of decision on the condition for execution, it is necessary to prescribe some rules that, for example, inhibit the use of the SETRP instruction.

Unlike the REP instruction, the SETRP instruction requires that four values RPT_C, RPT_S, RPT_E and RPT_B in FIG. 1 be initially set by the preceding instruction in the corresponding control registers. When the same routine is repeatedly called, the values RPT_S and RPT_B need not be set each time.

As described above, the data processor according to Embodiment 1 possesses the hardware-implemented function that, independently of an operation specified by the instruction to be executed, detects the end of repeat processing in the repeat block, terminates the repeat processing prematurely halfway through the repeat block, and switches the instruction processing sequence to the next instruction in the repeat block. Accordingly, even when the number of repetitions of processing of the repeat block changes dynamically and the repeat processing terminate prematurely halfway through the repeat block, the repeat block can be processed a predetermined number of times at high speed using the same program. For example, in the case of repeating the multiply-add operation four times using the afore-mentioned EP instruction, too, if the data processor has no such hardware-implemented function of terminating the processing of the repeat block prematurely, synchronous execution of loading is allowed but it is necessary to decide which of at least four values 4n, 4n+1, 4n+2 and 4n+3 (where n is an integer equal to or greater than 1) the repeat count is. Of course, programs are necessary for the four repeat counts. Further, to deal with repeating the multiply-add operation three times or less, it is necessary to make a decision on the condition and prepare a program. In the case of preparing an operation library for the processing of the multiply-add operation or the like, too, the same problems arise if the repeat count is used as a parameter.

Also in the case where the repeat count is set statically, if synchronous execution of loading is allowed, it is possible to prepare such a program as shown in FIG. 16 for repeating the multiply-add operation four or more times according to Equation (1)—this provides the same results as are obtainable when the repeat count is specified dynamically. In other words, it is possible to increase the code efficiency and simplify the program used, providing increased program development efficiency.

According to the data processor of Embodiment 1, since repeat processing can be terminated prematurely halfway through the repeat block without overhead even if the repeat block is composed of plural instructions, no repeat count decision is required and a given number of repetitions can be dealt with by one program. This eliminates the overhead resulting from preprocessing/postprocessing for the decision on the repeat count and a branch, providing enhanced performance and permitting substantial reduction of the program size. In digital signal processing wherein the rate of the repeat processing to the overall processing is very high, reduction of the code size for repeat processing is particularly effective. In the case of putting programs in the form of ROM chips, since the code efficiency of the programs directly affects the chip size, the data processor of this embodiment greatly contributes to cost cutting as well. Moreover, since programs can be simplified, it is also possible to increase the productivity of program development and reduce the possibility of bugs mixing into programs.

The data processor according to Embodiment 1 basically needs only to possess the hardware-implemented repeat function of processing a repeat block a predetermined number of times, and the function of terminating the repeat processing by the repeat processing terminating instruction halfway through the repeat block and switching the instruction processing sequence to the next instruction in the repeat block. The data processor is not limited specifically to the configuration described above, and whatever hardware structure it has, the same results as described above could be obtained.

Further, this embodiment may be applied to a data processor of a pipeline configuration different from that described above, and is applicable as well to a usual processor or DSP, not the VLIW processor.

Also it is possible to preset for starting the repeat processing at a specified address instead of executing an instruction that starts repeat processing at an instruction subsequent to the instruction concerned, such as the REP or SETRP instruction.

In the REP instruction, when the number of instructions of the repeat block is 2 raised to n power (where n is an integer), the "repeat count of the repeat block −1" and the "number of instructions in the repeat block to be executed in the last cycle of repeat processing −1" are set as the register numbers Rsrc2 and Rsrc1, respectively, with a view to simplifying the calculation of the values for setting as the register numbers Rsrc1 and Rsrc2, but the present invention is not limited specifically thereto. For example, it is also possible to set the "repeat count of the repeat block" and the "number of instructions in the repeat block to be executed in the last cycle of repeat processing" as the register numbers Rsrc2 and Rsrc1, respectively. That is, if the values for setting as the register numbers can be calculated hardware-wise and their correspondence is clear, any repeat instructions would be feasible.

In this embodiment, for repeat processing, the two independent comparators 187 and 172 are each provided for comparing the address of the fetched instruction with the value held in the register concerned. It is also possible, however, to employ a construction in which one comparator is switched by a selector to compare the address of the fetched instruction with the value held in the RPRT_E register 186 or in the RPT_B register 171, depending on whether the value held in the TRPT_C register 175 is non-zero or zero.

With the use of a delayed repeat scheme of executing the repeat instruction two or more instructions earlier (as described in detail later on) instead of executing it immediately before the start of the repeat block, the limitations on the size of the repeat block and the address of the last repeat instruction are relaxed. This can be done by changing various set value for the repeat block and their setting and calculating methods. For example, if the repeat instruction is executed two instructions earlier than the repeat block, the value RPT_B can be calculated by setting the "number of instructions in the repeat block to be executed in the last cycle of repeat processing" as the register number Rsrc1 and conducting the calculation in the same manner as described above. The value RPT_S can be calculated without increasing the amount of hardware, by using the output from the incrementor 193 instead of using the output from the latch 192. With such delayed repeat control, the time difference by pipeline processing between the start of fetching the repeat block instruction and the setting of the repeat-associated control registers by the execution of the repeat instruction. Accordingly, the executing the repeat instruction two instructions earlier than the start of the repeat block guarantees correct operations in the cases where the repeat block includes 2 32-bit instructions and where the value specified by the register number Rsrc2 is "0" and the value specified by the register number Rsrc1 is "2", although the data processor of Embodiment 1 cannot guarantee correct operations.

The data processor of this embodiment may also have a multi-level repeat function.

In the above, the repeat instruction has been described to specify the repeat count by registers with a view to permitting dynamic change of the repeat count, but by using a repeat instruction that utilizes immediate value data to set the values corresponding to those set as the register numbers Rsrc1 and Rsrc2, it is possible to eliminate the necessity for register setting by such register numbers, reduce the overhead of the register setting and omit the preprocessing of the repeat instruction, speeding up the repeat processing.

Embodiment 2

In a second embodiment (Embodiment 2) of the present invention, after processing of the repeat-processing last instruction, the instruction processing sequence is not switched to the next instruction of the repeat block so as to inhibit the execution of the instruction until the repeat-block last instruction unlike in Embodiment 1. The data processor of this embodiment is basically identical in construction with the data processor of Embodiment 1, and hence no detailed description will be repeated except differences from the latter.

FIG. 20 illustrates the PSW configuration for use in this embodiment. The PSW in this embodiment differs from the counterpart of Embodiment 1 in the inclusion of an RE bit 601. When it is "1", the RE bit 601 indicates that the instruction until the last instruction of the repeat block is being processing after the processing of the last instruction of the repeat processing. That is, the RE bit 601, when set at "1", indicates that the repeat processing has been completed and that the instruction for inhibiting the execution of any instruction is being processed. When the RE bit 601 is "1", no instruction is executed in the E stage 403 (no operation).

Figure 21:
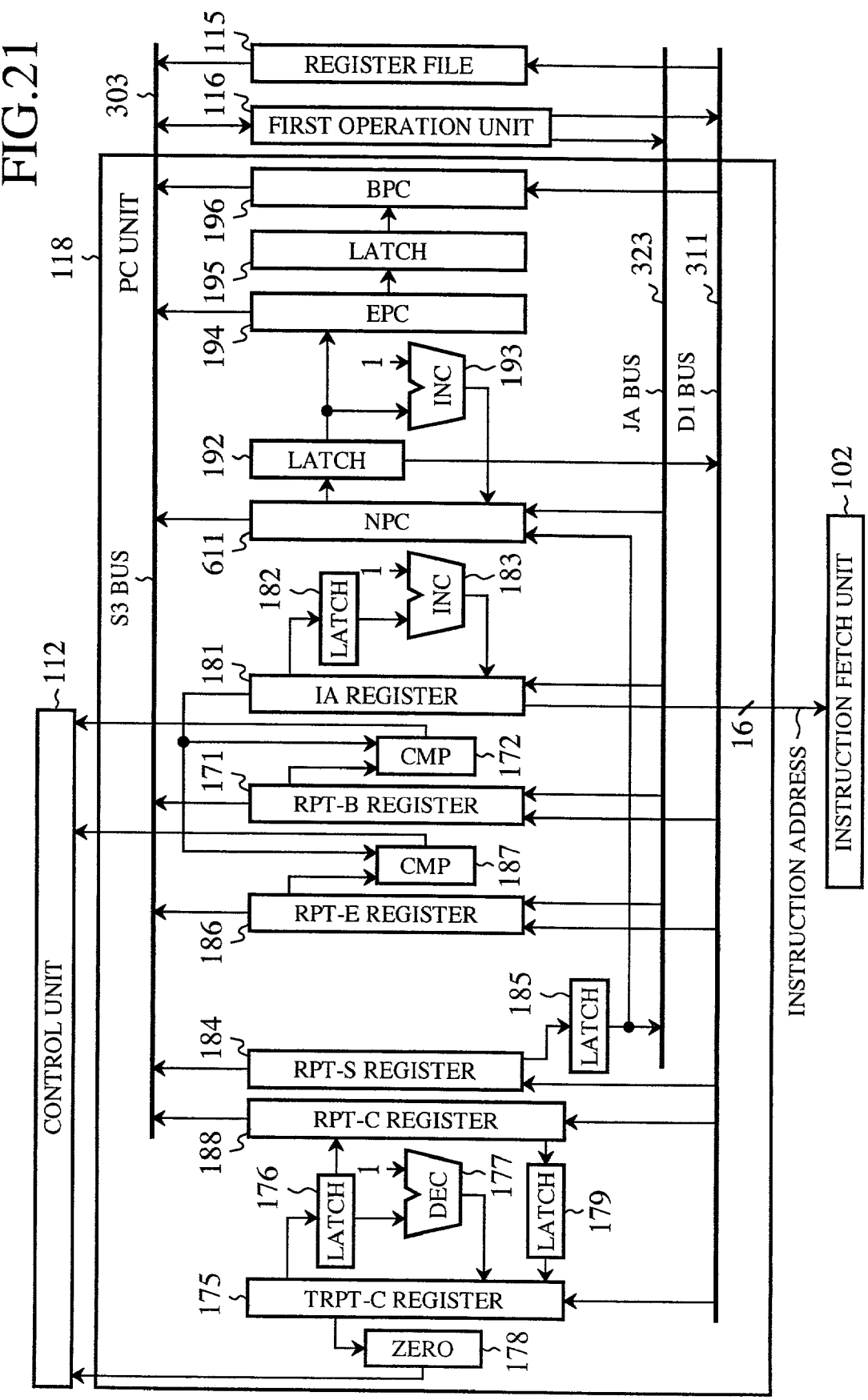
FIG. 21 illustrates a PC unit for the data processor according to the second preferred embodiment of the present invention.

FIG. 21 illustrates in block form the PC unit 118 of the data processor according to Embodiment 2. The PC unit 118 in this embodiment does not include the incrementor 173 and the latch 174 unlike the PC unit 118 in Embodiment 1. In this embodiment the PC unit 118 does not have the transfer path from the latch 174 to the NPC 611, either.

Next, the operation of this embodiment will be described below.

Figure 22:
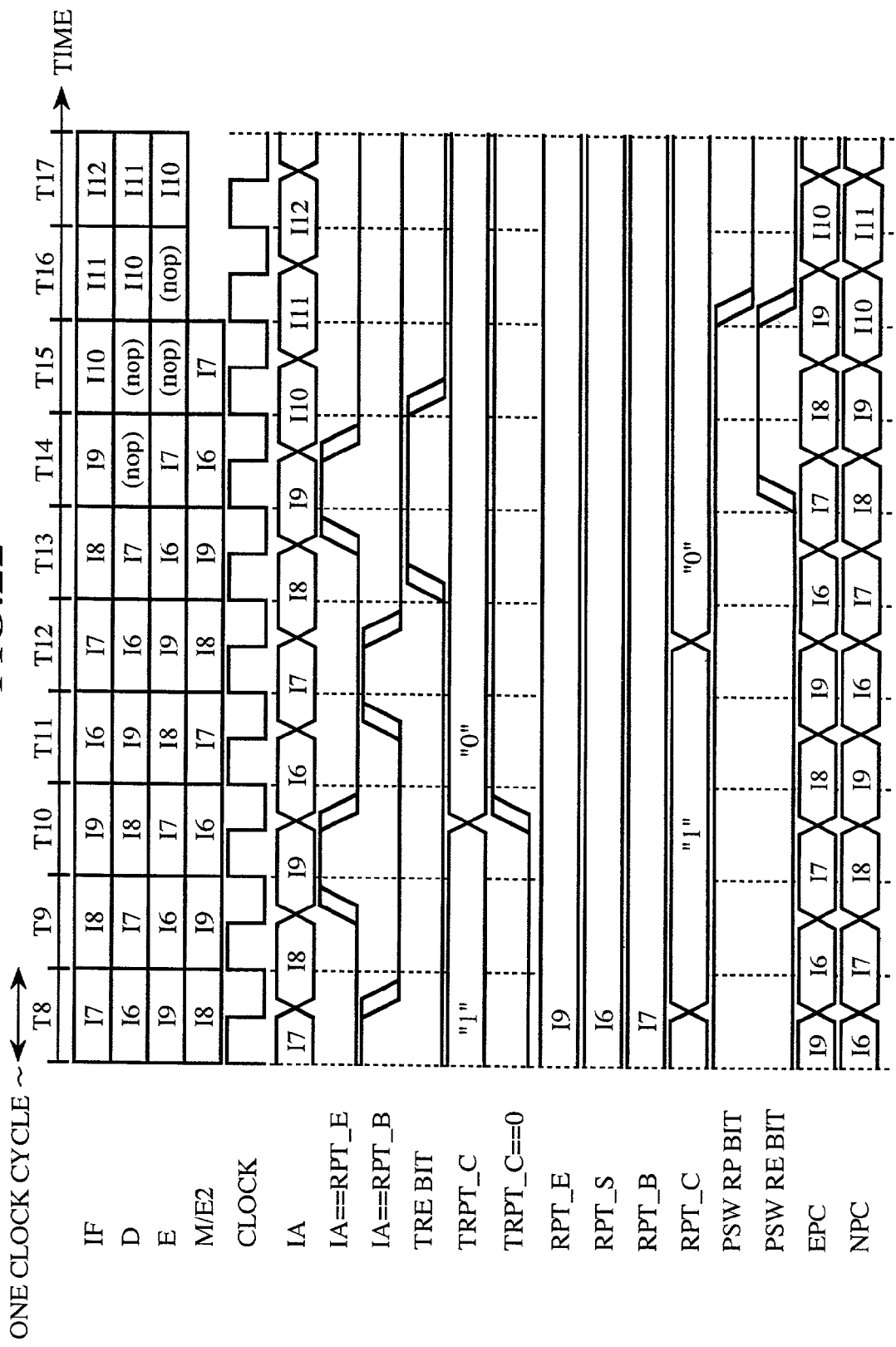
FIG. 22 is a timing chart of pipeline processing for the execution of the FIG. 16 program according to the second preferred embodiment of the present invention.

The following description will be given of operations in the case of executing the program depicted in FIG. 16. FIG. 22 is a timing chart showing pipeline processing during the execution of the program depicted in FIG. 16. FIG. 22 corresponds to FIG. 18. The parts corresponding to the clock cycles T1 to T9 are identical with those shown in FIG. 17. This embodiment differs greatly from the first embodiment in that after processing of the repeat-processing last instruction, the instruction processing sequence is not switched to the next instruction of the repeat block in the IF state 401 so as to inhibit the execution of the instruction until the repeat-block last instruction.

TRE bit is held in a register or the like (not shown) in the control unit 112. The TRE bit corresponds to the RE bit 601 of the PSW, and is updated in the IF stage 401. When the RP bit 43 of the PSW latch 222 of the PSW unit 221 in the control unit 112 is "1" (the repeat being processed) and the value held in the TRPT_C register 175 is non-zero, the same processing as in Embodiment 1 is performed. With the value held in the TRPT_C register 175 being zero, when the instruction fetch unit 102 fetches the instruction I7, the comparator 172 of the PC unit 118 sends to the control unit 112 a coincidence signal indicating the coincidence between the values compared. The clock cycle T12 in FIG. 22 shows this situation. Upon receiving the coincidence signal from the comparator 172, the control unit 112 sets the TRE bit to "1". Thereafter, when the instruction fetch unit 102 fetches the instruction I9, the comparator 187 sends to the control unit 112 a coincidence signal indicating the coincidence between the values compared. The clock cycle T14 shows this situation. Upon receiving the coincidence signal from the comparator 187, the control unit 112 clears the TRE bit to zero. When the last instruction of the repeat block is the last instruction of the repeat processing, that is, when the value held in the RPT_E register 186 and the value in the RPT_B register 171 are identical, the two comparators 187 and 172 simultaneously send coincidence signals indicating the coincidence between the values compared. In this instance, the control unit 112 does not set the TRE bit to "1". The value of the TRE bit is pipeline-transferred as instruction execution inhibiting information according to the corresponding instruction code. The value of the TRE bit is held at "1" during processing from the instruction succeeding the last instruction of the repeat processing to the last instruction of the repeat block.

In the D stage 402, when the instruction execution inhibiting information is 1, the data processor generates no-operation execution control information independently of the instruction code, and issues the information in the E stage 403.

In the E stage 403, the data processor refrains from executing instructions from the instruction succeeding the last instruction of the repeat processing to the last instruction of the repeat block. The repeat-processing last instruction information and the repeat-block last instruction information are pipeline-transferred as in Embodiment 1. At the time of its execution, the last instruction of the repeat processing is not the last instruction of the repeat block, the control unit 112 sets the RE bit 601 of the PSW held in the PSW latch 222 to "1". Upon execution of the repeat-block last instruction when the RE bit 601 is "1", the control unit 112 clears the RE bit 601 to zero. When the repeat-processing last instruction is the repeat-block last instruction, the control unit 112 the control unit 112 terminates the repeat processing without setting the RE bit 601. And the PC unit 118 updates the value held in the RPT_C register 188 as in Embodiment 1.

At the start of processing the repeat-processing last instruction and at the start of processing the repeat-block last instruction when the RE bit 601 is "1", the value in the NPC 611 of the PC unit 118 is updated with the address incremented by the incrementor 193 as in the case of executing instructions sequentially. At the start of processing of the repeat-block last instruction when the RE bit 601 is "1", the PC unit 118 writes the value held in the latch 185 into the NPC 611.

When a jump is caused in the E stage 403, the value of the TRE bit is updated based on the information on the RE bit 601 managed in the E stage 403, and the TRE bit is initialized.

As described above, according to Embodiment 2, the instruction to be inhibited from execution is rendered no-operation in the D stage 402, but this is not limited specifically to the D stage 402 but may be done in any pipeline stages prior to the E stage 403. As long as the hardware resources that can be seen by the user (the values of the general-purpose registers, accumulators, control registers and memories) are not updated, the instruction to be inhibited from execution may be rendered no-operation at any pipeline stages. It is also possible to inhibit the instruction fetch itself instead of rendering the instruction to be inhibited from execution no-operation, or to replace the fetched instruction with a specific instruction code. It is necessary only to effect control for correct management of the PC value including the instruction fetch address. For instance, if the fetched instruction is replaced with a parallel execution code of NOP instruction, no particular no-operation processing is required.

The instruction to be inhibited form execution may be made no-operation in the E stage 403 as well. In the case of making a decision for inhibiting the execution of an instruction in the E stage 403, the pipeline transfer of the instruction execution inhibiting information is not essential. However, since plural clock cycles may sometimes be required to decode two instructions to be executed sequentially, the number of needless clock cycles is likely to increase.

The RE bit 601 is allocated to the PSW so as to ensure correct return of processing even in the case of accepting an external interrupt or the like during inhibiting instructions from execution. Accordingly, the RE bit 601 becomes unnecessary if control is effected to reject any interruption until after the execution of the repeat-block last instruction from the instant the execution of the repeat-processing last instruction is completed.

As described above, according to this embodiment, after processing of the repeat-processing last instruction, the instruction processing sequence is not switched to the next instruction of the repeat block to inhibit the execution of the instruction until the repeat-block last instruction; but this embodiment produces the same effects as does the first embodiment. That is, in the repeat processing whose repeat count undergoes a dynamic change, this embodiment eliminates the overhead resulting from preprocessing/postprocessing for the decision on the repeat count and a branch, providing enhanced performance and permitting substantial reduction of the program size. Accordingly, it is possible to cut the cost for putting programs in the form of ROM chips and provide increased productivity in program development.

Moreover, since the PC unit 118 is not provided with the incrementor 173 and the decrementor 174 shown in FIG. 10, the data processor of this embodiment is less expensive than that of the first embodiment accordingly. In this embodiment, however, since the pipeline processing is carried out for the instruction to be inhibited from execution as well, the number of needless clock cycles is somewhat larger than in the first embodiment.

Embodiment 3

In a third embodiment (Embodiment 3) of the present invention, the processing of the repeat-processing last instruction is followed by switching the instruction processing sequence to the next instruction of the repeat block in the E stage 403, but not in the IF stage 401. The data processor of this embodiment is basically identical in construction with the data processor of Embodiment 1, and hence no detailed description will be repeated except differences from the latter.

The PC unit 118 in this embodiment has the same construction as depicted in FIG. 10.

Next, the operation of this embodiment will be described below.

The following description will be given of operations in the case of executing the program depicted in FIG. 16. FIG. 23 is a timing chart showing pipeline processing during the execution of the program depicted in FIG. 16. FIG. 23 corresponds to FIG. 18. The parts corresponding to the clock cycles T1 to T9 are identical with those shown in FIG. 17. This embodiment differs from the first embodiment in that the instruction processing sequence is switched to the next instruction of the repeat block in the E stage 403 after the processing of the repeat-processing last instruction.

The REP instruction processing and the repeat processing are carried out in exactly the same manner as in Embodiment 1 except that the fetch of the instruction I7 in the IF stage 401 is followed by the sequential instruction fetch, not by starting the fetch of the instruction I10. The data processor of this embodiment controls updating of the NPC 191 as in Embodiment 1. Further, the data processor of this embodiment effects control at the start of execution of the instruction I7 as in Embodiment 1. Still further, the value held in the NPC 191 is referred to as the return address in a subroutine call. Accordingly, as is the case with Embodiment 1, the address of the instruction I10 can be referred to as the return address even when the instruction I7 includes an instruction for the subroutine call.

In this embodiment, during the execution of the instruction I7 in the E stage (clock cycle T14 in FIG. 23) the processing for a jump to the instruction I10 that is the next instruction of the repeat block. Independently of the operation that is specified by the instruction to be executed, the control unit 112 generates hardware-wise control signals for the jump processing based on the repeat-processing last instruction information. In the clock cycle T14, the PC unit 118 transfers the address of the instruction I10 held in the latch 174 to the IA register 181 and the NPC 191 via the JA bus 323, performing the jump processing. When the execution of the repeat-processing last instruction requires plural clock cycles, the data processor performs the jump processing in the last one of the plural clock cycles.

In the case where the repeat-processing last instruction is the last instruction of the repeat block, however, the data processor of this embodiment needs only to execute the next instruction of the repeat block. In this case, no jump processing is carried out in the E stage 403 so as to keep needless overhead from occurrence. Unlike in embodiment 1, when the instruction fetch address coincides with the value held in the RPT_E register 186, coincidence information is output as information about the repeat-block last instruction even if the value held in the TRPT_C register 175 is zero. Based on the repeat-processing last instruction information indicating that the instruction to be executed is the repeat-processing last instruction and the repeat-block last instruction information indicating that the instruction to be executed is the repeat-block last instruction, the data processor decides whether the repeat-processing last instruction is the last instruction of the repeat block, and if so, merely executes the next instruction of the repeat block.

When the repeat-processing last instruction is an instruction for jump processing in the E stage 403, the data processor performs the jump processing accompanying the execution of an instruction but does not perform jump processing concerning repeat processing.

As described above, the data processor of this embodiment produces the same effects as obtainable by the first embodiment although the former conducts switching of the instruction processing sequence after the execution of the repeat-processing last instruction (a jump to the next instruction of the repeat block) in the E stage 403. That is, in the case where the repeat count undergoes a dynamic change and the repeat processing terminates prematurely halfway through the repeat block, this embodiment eliminates the overhead resulting from preprocessing/postprocessing for the decision on the repeat count and a branch, providing enhanced performance and permitting substantial reduction of the program size. Accordingly, it is possible to cut the cost for putting programs in the form of ROM chips and provide increased productivity in program development.

By inhibiting the use of the subroutine call instruction as the repeat-processing last instruction, the transfer path from the latch 174 to the NPC 191 is unnecessary.

Further, the incrementor 173 is provided in the PC unit 118 specifically for incrementing the value held in the RPT_E register 186 by 1, but it is possible to reduce hardware resources by using the existing resource in place of the incrementor 173. In this instance, it is preferable to determine the hardware configuration and its control method taking into account the system performance and hardware cost. However, the instruction for using the hardware resource must be inhibited from execution as the repeat-processing last instruction.

In the FIG. 23 example the instruction I8 and the subsequent ones are fetched continuously in the IF stage 401, but these fetches are needless, and hence they may be inhibited.

Embodiment 4

In a fourth embodiment (Embodiment 4) of the present invention, the processing of the repeat-processing last instruction is followed by switching the instruction processing sequence to the next instruction of the repeat block in the E stage 403 as in the Embodiment 3, but the jump processing is conducted in the clock cycle immediately after the execution of the repeat-processing last instruction. The data processor of this embodiment is basically identical in construction with the data processor of Embodiment 1, and hence no detailed description will be repeated except differences from the latter.

The PC unit 118 in this embodiment has the same construction as depicted in FIG. 10.

Next, the operation of this embodiment will be described below.

The following description will be given of operations in the case of executing the program depicted in FIG. 16. FIG. 24 is a timing chart showing pipeline processing during the execution of the program depicted in FIG. 16. FIG. 24 corresponds to FIG. 18. The parts corresponding to the clock cycles T1 to T9 are identical with those shown in FIG. 17. As mentioned above, in this embodiment the instruction processing sequence is switched to the succeeding instruction of the repeat block in the E stage 403 after the processing of the repeat-processing last instruction as in Embodiment 3. This embodiment differs from Embodiment 3 in that the jump processing for a jump is carried out in the clock cycle immediately after the execution of the repeat-processing last instruction.

In the clock cycle T14 in FIG. 24 the repeat-processing last instruction I7 is executed. In FIG. 24, "(jump)" represents the jump to the next instruction of the repeat block. Independently of the operation that is specified by the instruction to be executed, the control unit 112 generates hardware-wise control signals for the jump processing based on the repeat-processing last instruction information, and in the clock cycle T15 the jump processing is performed. In the cock cycle T15 the PC unit 118 outputs the value held in the RPT_E register 186 to the S3 bus 303, and the AA latch 151 of the first operation unit 116 reads therein the value on the S3 bus 303. And "1" is set in the AB latch 152 of the first operation unit 116. The ALU 153 generates the address of the next instruction of the repeat block from the values held in the AA and AB latches 151 and 152, and outputs the address to the JA bus 323, and the PC unit 118 reads the address on the JA bus 323 into the IA register 181 and the NPC 611. As a result, the data processor performs the jump processing.

In the case where the repeat-processing last instruction is the last instruction of the repeat block, however, the data processor of this embodiment needs only to execute the next instruction of the repeat block. In this case, no jump processing is carried out in the E stage 403 so as to keep needless overhead from occurrence. As is the case with Embodiment 3, when the instruction fetch address coincides with the value held in the RPT_E register 186, coincidence information is output as information about the repeat-block last instruction even if the value held in the TRPT_C register 175 is zero. Based on the repeat-processing last instruction information indicating that the instruction to be executed is the repeat-processing last instruction and the repeat-block last instruction information indicating that the instruction to be executed is the repeat-block last instruction, the data processor decides whether the repeat-processing last instruction is the last instruction of the repeat block.

When the repeat-processing last instruction is an instruction for jump processing in the E stage 403, the data processor performs the jump processing accompanying the execution of an instruction but does not perform jump processing concerning repeat processing.

As referred to above, the PC unit 118 in this embodiment has the construction depicted in FIG. 21, and does not include the incrementor 173 shown in FIG. 10. Hence, the data processor of this embodiment cannot execute a subroutine call instruction as the repeat-processing last instruction. In FIG. 24, the NPC value during the execution of the repeat-processing last instruction I7 is the address of the instruction I8, not I10. Accordingly, the subroutine call instruction could be executed as the repeat-processing last instruction by the additional provision of the incrementor in the PC unit 118.

As described above, according to this embodiment, the instruction processing sequence is switched (a jump to the next instruction of the repeat block) in the E stage 403 after the execution of the repeat-processing last instruction, and the jump processing for the repeat is carried out in the clock cycle immediately after the execution of the repeat-processing last instruction; but this embodiment produces the same effects as those obtainable by Embodiment 1. That is, in the case where the repeat count undergoes a dynamic change and the repeat processing terminates prematurely halfway through the repeat block, this embodiment eliminates the overhead resulting from preprocessing/postprocessing for the decision on the repeat count and a branch, providing enhanced performance and permitting substantial reduction of the program size. Accordingly, it is possible to cut the cost for putting programs in the form of ROM chips and provide increased productivity in program development.

Embodiment 5

In a fifth embodiment (Embodiment 5) of the present invention the decision about whether the repeat processing terminates is made in the last processing cycle of the repeat block based on the number of instructions executed in the repeat block (hereinafter referred to also as the executed instruction number), not based on the instruction address as in Embodiments 1 to 4. The data processor of this embodiment is basically identical in construction with the data processor of Embodiment 1, and hence no detailed description will be repeated except differences from the latter.

FIG. 25 illustrates repeat-associated control registers in the data processor of Embodiment 5. As will be seen from a comparison of FIG. 25 with FIG. 1, a control register CR6-701 in this embodiment holds RPT_BC that is set to an initial value equal to the "number of instructions to be executed in the last repeat cycle of the repeat block −1" in place of RPT_B. That is, the data processor makes the decision based on the number of instructions executed so far.

Figure 26:
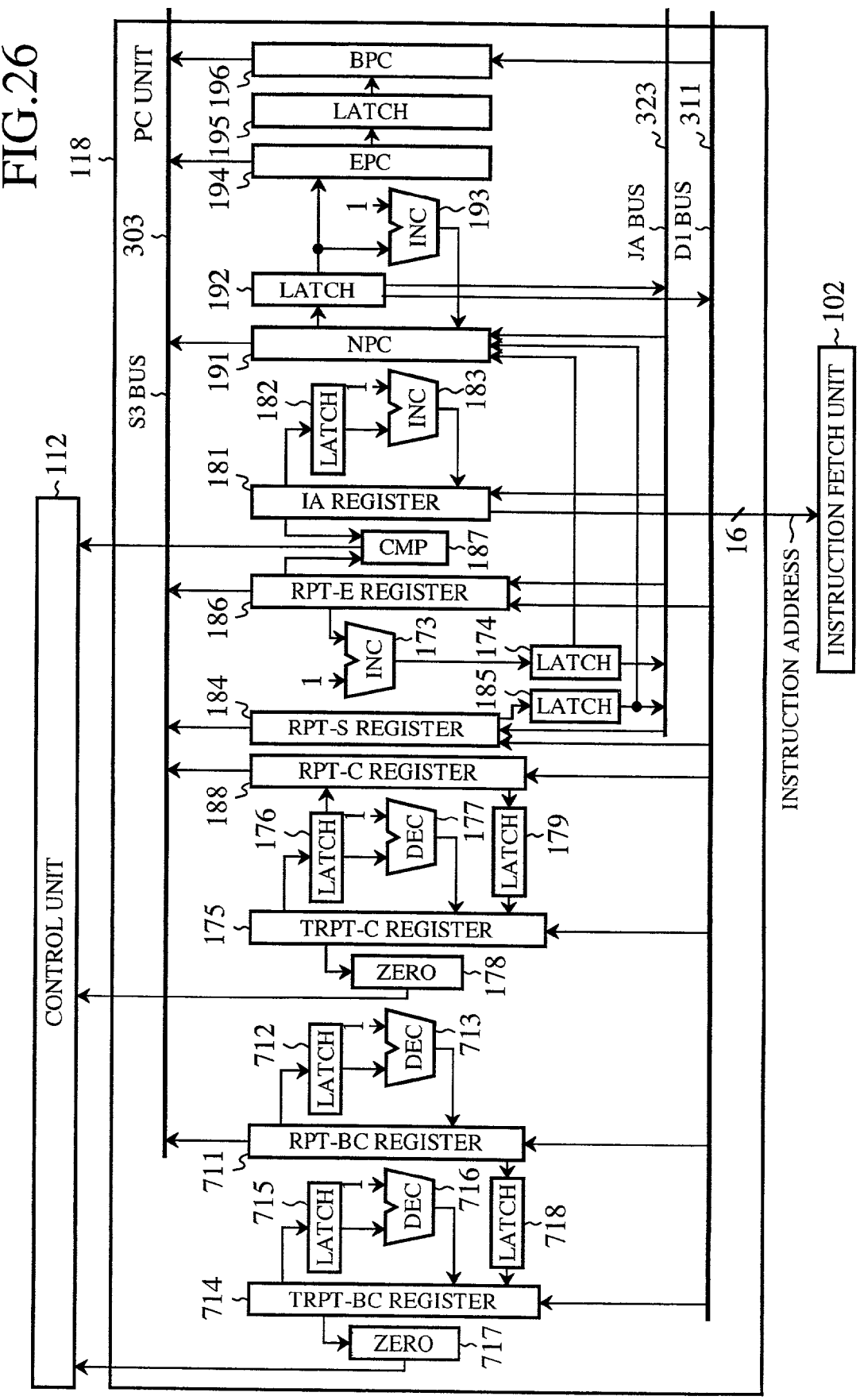
FIG. 26 illustrates a PC unit for the data processor according to the fifth preferred embodiment of the present invention.

FIG. 26 illustrates in block form the PC unit 118 of the data processor according to Embodiment 5. As shown, the PC unit 112 has no hardware associated with the RPT_B register 171. Reference numeral 711 denotes an RPT_BC register for holding RPT_BC; 713 denotes a decrementor (DEC) by which the value fed thereto from the RPT_BC 711 via a latch 712 is decremented by 1; 714 denotes a TRPT_BC register holding RPT_BC for updating first in the IF stage 401; and 716 denotes a decrementor (DEC) by which the value fed thereto from the TRPT_BC register 714 via a latch 716 is decremented by 1. To update RPT_BC for each instruction, the PC unit 118 has the two independent decrementors 713 and 716 for updating RPT_BC in the IF stage 401 and for updating RPT_BC in the E stage 403. Reference numeral 717 denotes a zero detector (ZERO) for detecting that the value held in the TRPT_BC 714 has gone to zero. The PC unit 118 is provided with a transfer path from the RPT_BC register 711 to the TRPT_BC register 714 via a latch 718 so as to cancel and initialize preprocessing at the preceding stage of the pipeline when a jump occurs. Incidentally, count means is made up of the TRPT_BC register 714, the latch 715 and the decrementor 716. First count means is composed of a TRPT_C 175, a latch 176 and a decrementor 177. Second count means s composed of the TRPT_BC register 714, the latch 715 and the decrementor 716.

Further, the PC unit 118 is provided with an output path to the JA bus 323 from a latch 192 that holds the PC value of the instruction to be executed next, and a transfer path from the JA bus 323 to an RPT_S register 184.

Next, the operation of this embodiment will be described below.

Figure 27:
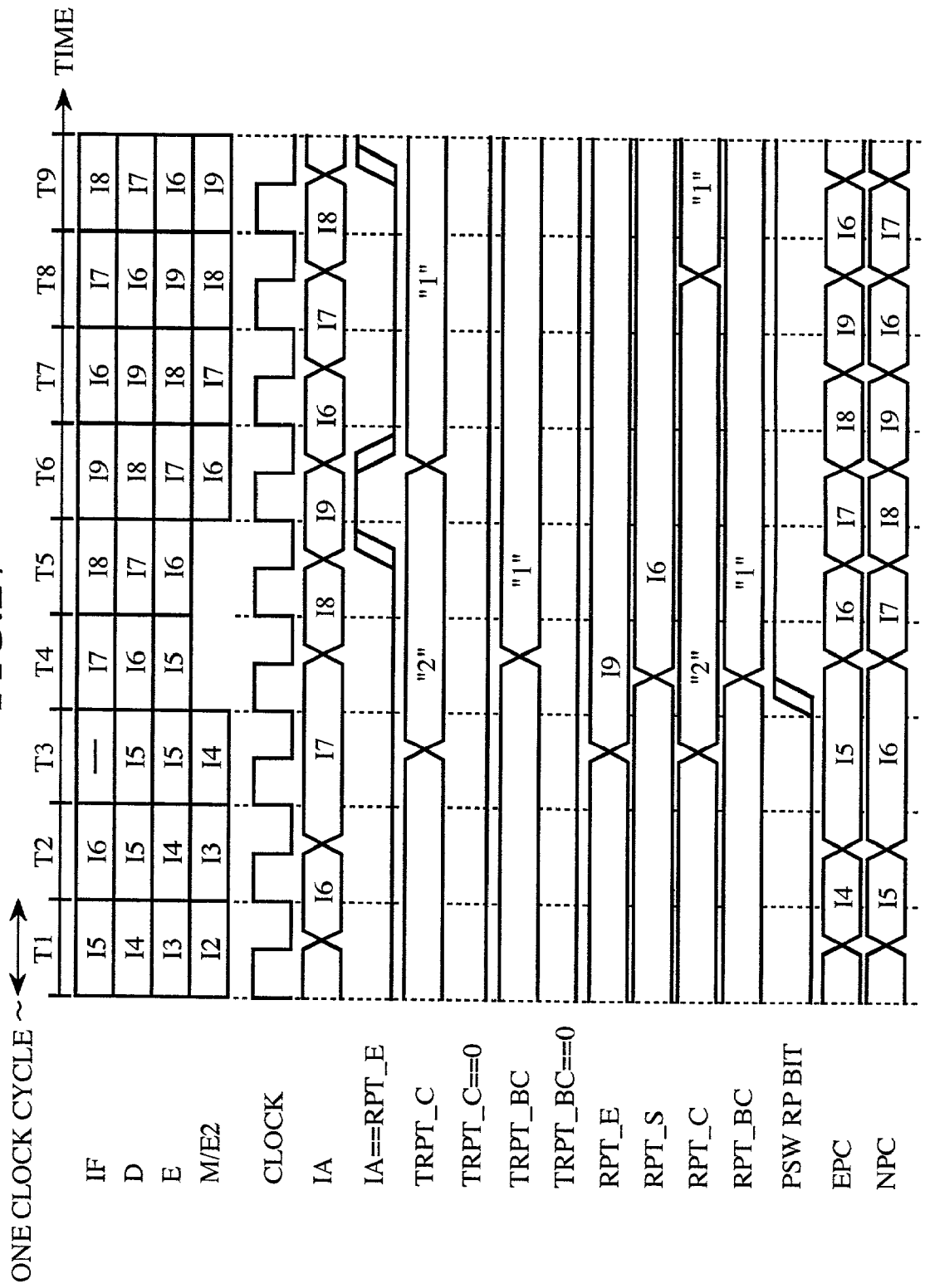
FIG. 27 is a timing chart of pipeline processing for the execution of the FIG. 16 program according to the fifth preferred embodiment of the present invention.
Figure 28:
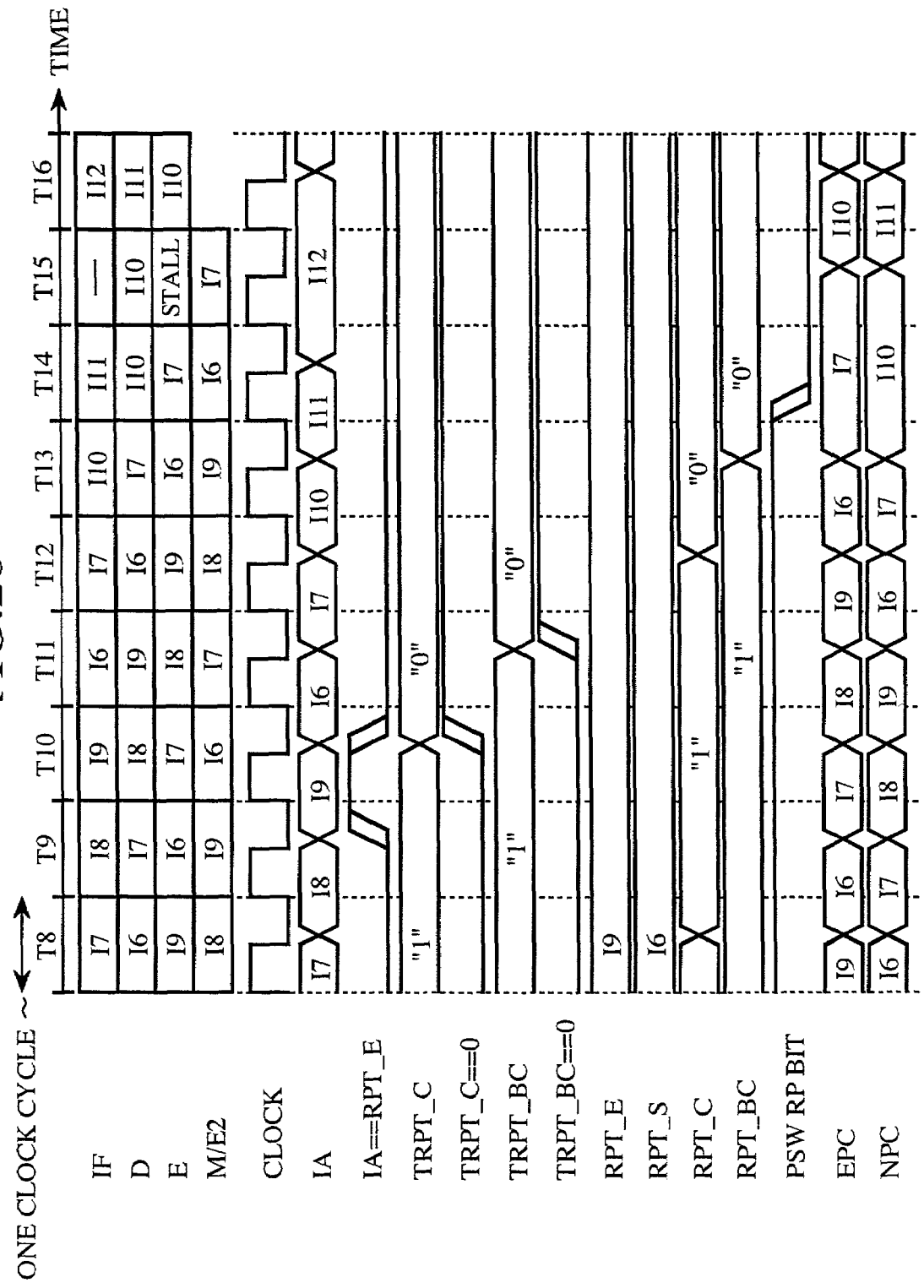
FIG. 28 is a timing chart of pipeline processing for the execution of the FIG. 16 program according to the fifth preferred embodiment of the present invention.

FIGS. 27 and 28 are timing charts showing pipeline processing during the execution of the program depicted in FIG. 16. FIGS. 27 and 28 corresponds to FIGS. 17 and 18 referred to in the description of Embodiment 1. As mentioned above, according to Embodiment 5, the decision whether the repeat processing has terminated is made in the last processing cycle based on the number of instructions executed so far.

In this embodiment, the REP instruction I5 shown in FIG. 16 is executed in two clock cycles as in Embodiment 1. In the first clock cycle, RPT_E and RPT_C shown in FIG. 25 are set, and in the second clock cycle, RPT_BC and RPTS in FIG. 25 and the RP bit of PSW shown in FIG. 2 are set.

The data processor of this embodiment performs the processing of the first clock cycle as in Embodiment 1. In the second clock cycle, the value held in the general-purpose register R11-12 specified by the register number Rsrc1 of the REP instruction I5 is transferred to the RPT_BC register 711 and the TRPT_BC register 714 via the S2 bus 302, the latch 169, the selector 155 and the D1 bus 311, and thereafter the value of the RPT_BC register 711 is transferred thence to the latch 718. In parallel to the above processing, the address of the next instruction of the REP instruction, which is used as the address of the first instruction of the repeat block, is transferred from the NPC 191 via the latch 192 and JA bus 323 to the RPT_S register 184, from which the next instruction address is transferred to the latch 185. The control unit 112 sets the RP bit of the PSW latch 222 to "1".

The data processor performs exactly the same processing as in Embodiment until the value held in the TRPT_C register 175 goes to zero. Once the value held in the TRPT_C register 175 has become zero, the decrementor 716 decrements the value in the TRPT_BC 174 by 1 each time the instruction fetch unit 102 fetches an instruction. And when the value held in the TRPT_BC 174 goes to zero, the control unit 112 switches the instruction processing sequence. That is, the control unit 112 controls the PC unit 118 to fetch the instruction I10 after fetching the instruction I7. In this embodiment the instruction processing sequence is switched in exactly the same manner as in Embodiment 1. As regards the instruction fetched when the value held in the TRPT_C register 175 is zero, information indicating the last processing cycle of the repeat block is transferred in synchronization with pipeline processing of the instruction. In the E stage 403, upon each completion of one instruction in the last processing cycle of the repeat block, the value held in the RPT_BC register 711 is decremented. This decrement is not carried out during the repeat-processing last instruction processing of I7. The control unit 112 clears the RP bit 43 of the PSW latch 222 to zero at the time of the repeat-processing last instruction processing of 17.

When a jump occurs in the E stage 403, the PC unit 118 transfers the value in the RPT_BC register 711 to the TRPT_BC register 714 via the latch 718.

As described above, according to this embodiment, the decision about the termination of the repeat processing in the last processing cycle of the repeat block is made based on the number of instructions executed so far unlike in Embodiments 1 to 4; however, this embodiment produces the same effects as does Embodiment 1. That is, in the case where the repeat count undergoes a dynamic change and the repeat processing terminates prematurely halfway through the repeat block, this embodiment eliminates the overhead resulting from preprocessing/postprocessing for the decision on the repeat count and a branch, providing enhanced performance and permitting substantial reduction of the program size. Accordingly, it is possible to cut the cost for putting programs in the form of ROM chips and provide increased productivity in program development. In this embodiment, however, since the above-mentioned decision is made based on the number of instructions executed, this embodiment cannot be adopted in the case where the number of instructions to be executed in the last processing cycle of the repeat block undergoes a dynamic change, for example, in the case where a conditional branch instruction occurs in the period from the time of having finally returned to the address of the first instruction of the repeat block to the time of executing the repeat processing end instruction (while the value held in the RPT_C register 188 is zero). Hence, the use of this data processor must be inhibited in such a situation.

Incidentally, it may be decided in the E stage 403 whether the current cycle is the last processing cycle of the repeat block. In this instance, no pipeline transfer of information is needed.

Further, the two independent decrementors for RPT_BC updating use in the IF stage 401 and for RPT_BC updating use in the E stage may be replaced with one decrementor for RPT_BC updating use in the IF stage 401 so that the value held in the TRPT_BC register 714 is pipeline-transferred to the RPT_BC register 711.

Still further, while in the above RPT_BC has been described to be decremented from a predetermined value, it may be incremented from zero and checked for coincidence with a predetermined value.

Embodiment 6

In this embodiment (Embodiment 6), the repeat processing break decision is made relying only on the number of instructions to be executed during repeat processing, and a delayed repeat instruction (a delay repeat) provided before two or more instructions of the repeat block is executed to process the repeat block, instead of executing the repeat instruction immediately before the start of the repeat block. The data processor of this embodiment is basically identical in construction with the data processor of Embodiment 1, and hence no detailed description will be repeated except differences from the latter.

FIG. 29 illustrates repeat-associated control registers of the data processor according this embodiment. As will be seen from comparison between FIGS. 29 and 1, the data processor of this embodiment does not include the control register CR6 (RTP_B). A control register CR7-801 holds RTP_C that corresponds to the "number of instructions to be executed during repeat processing". The number of instructions to be executed is the number of 32-bit instructions each counted as one instruction. At the start of the repeat processing, RPT_C is set to the total number of instructions to be executed, and during the repeat processing it is decremented by 1 upon each execution of one instruction. When RPT_C goes to zero, the repeat processing ends.

Figure 30:
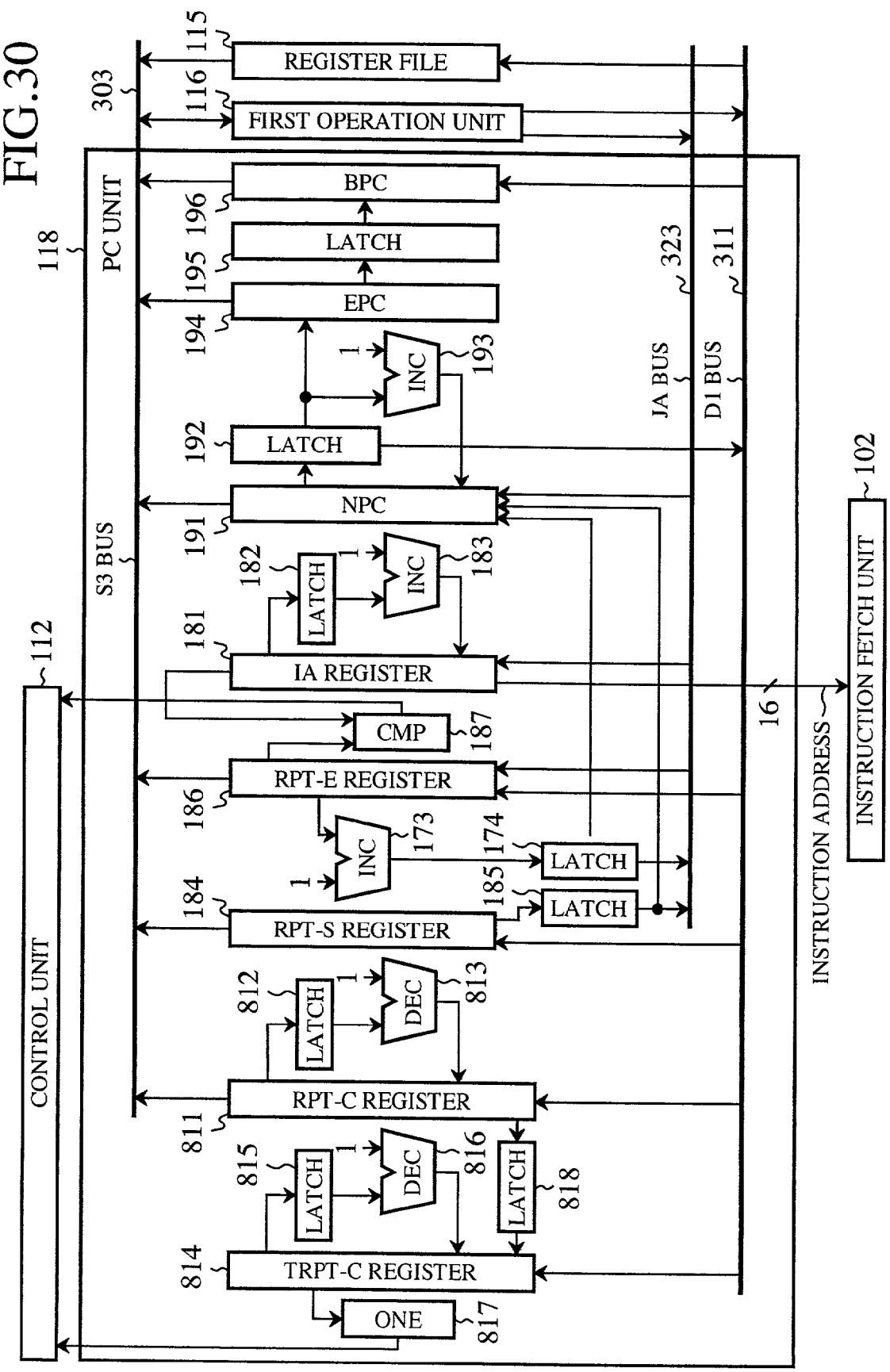
FIG. 30 is a timing chart of pipeline processing for the execution of the FIG. 16 program according to the sixth preferred embodiment of the present invention.

FIG. 30 illustrates in block form the PC unit 118 of the data processor according to Embodiment 6. As shown, the PC unit 118 is not provided with the hardware structure associated with the RPT_B register 171 depicted in FIG. 10. The hardware structure associated with RPT_C register in this embodiment greatly differs from that in Embodiment 1. In FIG. 30, reference numeral 813 denotes a decrementor (DEC) by which the value fed thereto from an RPT_C register 811 via a latch 812 is decremented by 1; 814 denotes a TRPT_C register that holds the count value PRT_C for updating it first in the IF stage 401; and 816 denotes a decrementor (DEC) by which the value fed thereto from a TRPT_C register 814 via a latch 815 is decremented by 1. To update RPT_C for each instruction, the PC unit 118 has the two independent decrementors 813 and 816 for updating RPT_C in the IF stage 401 and for updating RPT_C in the E stage 403. Reference numeral 817 denotes a 1 detector (ONE) for detecting that the value held in the TRPT_C 814 has gone to 1. The PC unit 118 is provided with a transfer path from the RPT_C register 811 to the TRPT_C register 814 via a latch 818 so as to cancel and initialize preprocessing at the preceding stage of the pipeline when a jump occurs. Further, there are provided transfer paths from the D1 bus 311 to the RPT_C register 811 and the TRPT_C register 814.

Next, the operation of this embodiment will be described below.

FIGS. 31 and 32 illustrate instruction formats of two examples, "DREP Rsrc, disp16" and "REP imm8, disp16", of a delayed repeat instruction for use in the data processor according to Embodiment 6. These instructions are long-format instructions. Reference numerals 831 and 836 denote FM bits; 832 and 837 denote operation codes; 833 denotes a reserved bit; 834 (Rsrc) denotes a register number for specifying a register that holds the number of instructions to be executed in the repeat block (the number of 32-bit instructions to be executed); 838 (imm8) denotes 8-bit immediate value data indicating the number of instructions executed in the repeat block; and 835 and 839 (disp16) each denote a displacement value of the address of the last instruction of the repeat block from the address of the repeat instruction.

The delayed repeat instruction is an instruction that effects control delayed one instruction behind the start of the repeat processing. The repeat block starts with an instruction after the instruction succeeding the delayed repeat instruction. Assume that the instruction succeeding the delayed repeat instruction is executed after the execution of the current delayed repeat instruction without fail. That is, even in the case where an external interruption request is being asserted and the interruption is acceptable (the IE bit of the PSW in FIG. 2 is "1"), the data processor inhibits the acceptance of the interruption. The instruction immediately following the delayed repeat instruction should not be, for instance, a jump instruction for switching the instruction processing sequence, and the repeat block should include two or more instructions. Even if the repeat block includes only one, however, the data processor achieves correct repeat processing.

FIG. 33 depicts an example of an assembler-described program for performing the multiply-add operation according to Equation (1) and including a DREP instruction. The general-purpose register R10-11 holds the number N of multiply-add operations, and the general-purpose registers R8-9 and R9-10 hold first addresses A[0] and B[0] of two arrays to be multiplied-added, respectively. The instructions I1a to I3 are preprocessing and repeat instructions, and the instruction I4 to 17 constitute the repeat block. The DREP instruction is executed two instructions before the instruction I4 that is the repeat block start instruction.

Figure 34:
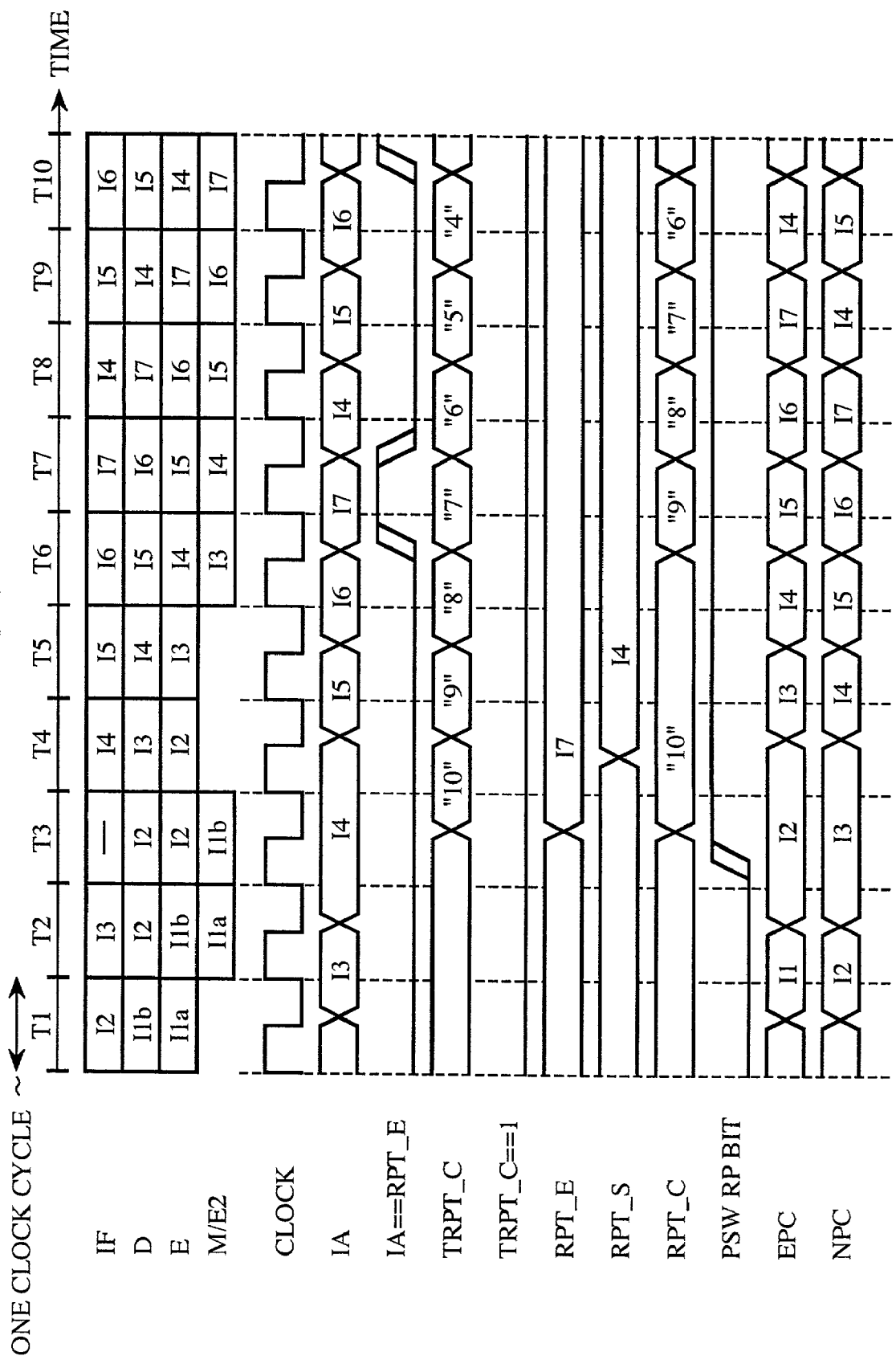
FIG. 34 is a timing chart of pipeline processing during repeat processing in the data processor according to the sixth preferred embodiment of the present invention.
Figure 35:
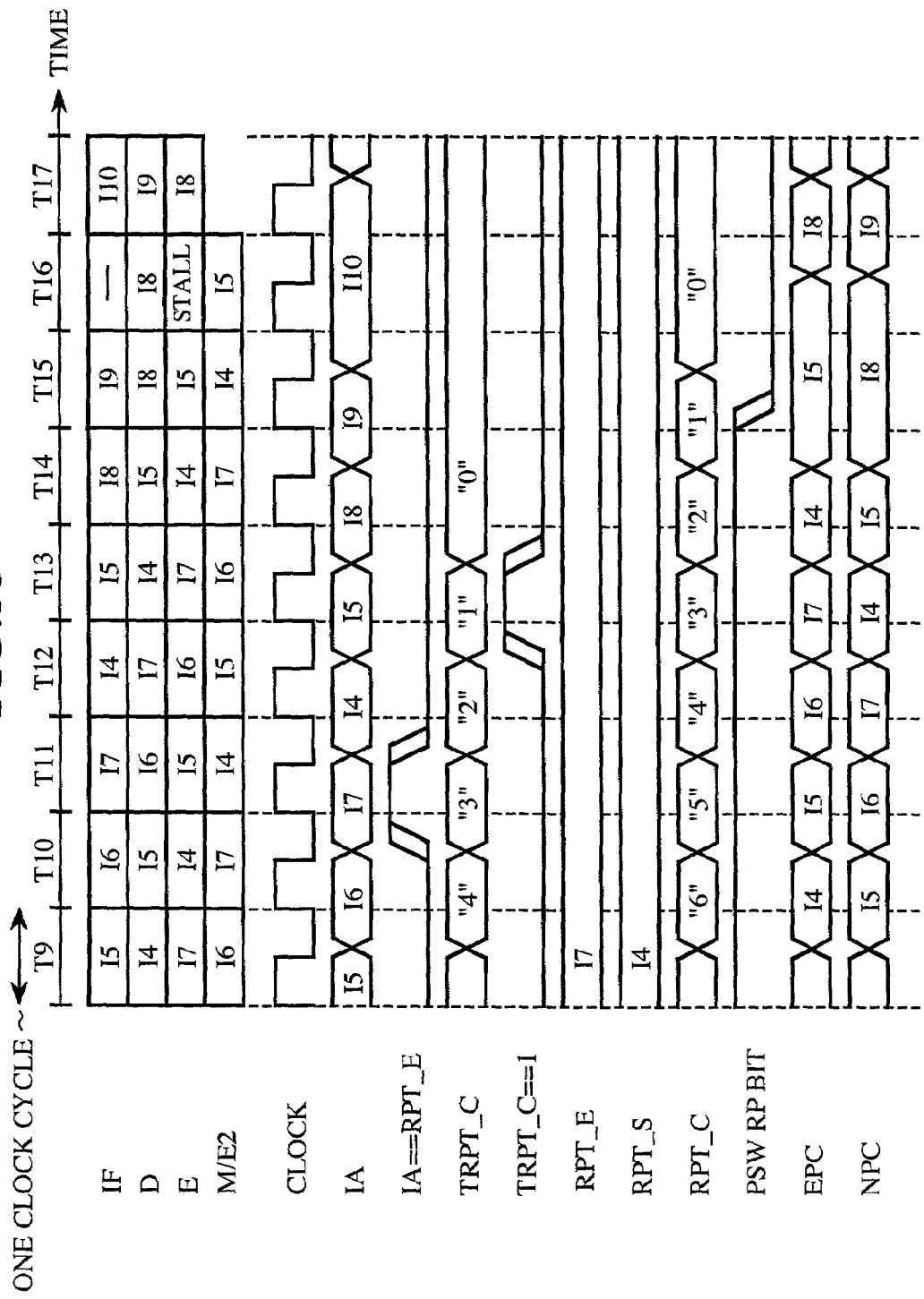
FIG. 35 is a timing chart of pipeline processing during repeat processing in the data processor according to the sixth preferred embodiment of the present invention.
Figure 36:
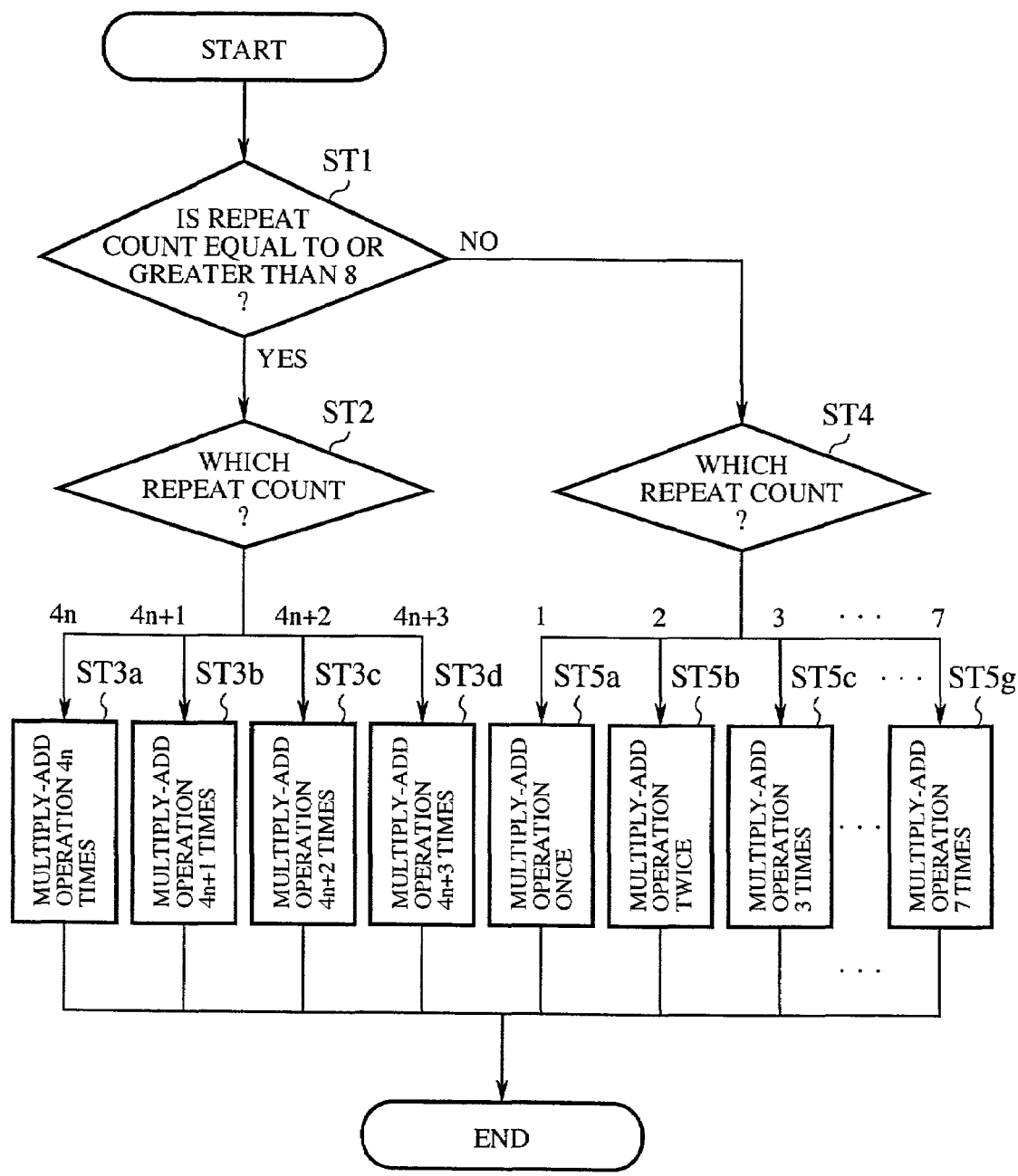
FIG. 36 is a flowchart of an example of repeat processing in a conventional data processor.

FIGS. 34 and 35 are timing chart of pipeline processing during the repeat processing according to this embodiment. FIGS. 34 and 35 show an unbroken sequence of operations, and the clock cycles T9 and T10 are shown in both of them for easy understanding. The upper four rows show processing of the respective pipeline stages, and the other lower rows show values held in registers and signal values that are associated with repeat processing. For simplicity sake, each instruction and each address will be referred to provisionally as instructions such as I5 or the like. "IA==RPT_E" indicates the result of comparison by the comparators 187 and 172, and "TRPT_C==1" indicates the output from the 1 detector 178. FIGS. 34 and 35 depict pipeline processing for conducting the multiply-add operation 10 times. In the illustrated example, the last instruction in the repeat processing is the instruction I5, and the processing of the repeat block by four instructions I4 to I7 is performed two more times, followed by the execution of the two instruction I4 and I5 and then by the execution of the instruction I8.

As depicted in FIG. 34, the data processor executes the DREP instruction I2 in two clock cycles T3 and T4. In the clock cycle T3 the data processor sets the RPT_E and RPT_C shown in FIG. 29 and the RP bit 43 of the PSW latch 222 as well. Under the control of the control unit 112 the PC unit 118 outputs the value held in EPC 194 to the S3 bus 303, and the AA latch 151 of the first operation unit 116 reads therein the value on the S3 bus 303. And, the displacement value disp16-835 is transferred to the AB latch 152 of the first operation unit 116. The ALU 153 of the fist operation unit 116 adds together the values held in the AA and AB latches 151 and 152, and the result of addition, which is the address of the last instruction of the repeat block, is output onto the JA bus 323. The RPT_E register 186 of the PC unit 118 reads therein the address on the JA bus 323. After this, the incrementor 173 increments the value in the RPT_E register 186 by 1, and transfers the incremented value to the latch 174. Further, the value held in the general-purpose register R10-11, specified by the register number Rsrc 834, is transferred to the RPT_C and TRPT_C registers 811 and 818 via the S1 bus 301, the latch 169, the selector 155 and the D1 bus 311. Following this, the value transferred to RPT_C register 811 is transferred to the latch 818. Then the control unit 112 sets the PR bit 43 of the PSW latch 222 to "1".

In the clock cycle T4 the control unit 112 sets the RPT_S register 184. The PC unit 118 outputs the value held in the NPC 191 to the S3 bus 302, and the AA latch 151 of the first operation unit 116 reads therein the value on the S3 bus 303. On the other hand, the control unit 112 sets "1" in the AB latch 152 of the first operation unit 116 hardware-wise. The ALU 153 of the first operation unit 116 adds together the value held in the AA and AB latches 151 and 152, and the result of addition, which is the address of the first instruction of the repeat block, is transferred to the RPT_S register 184 of the PC unit 118 via the selector 155 and the D1 bus 311. Then the value transferred to the RPT_S register 184 is transferred to the latch 185.

The data processor according to this embodiment begins the instruction I3 fetch upon the start of the decoding of the DREP instruction I2, but inhibits the instruction I4 fetch until the processing of the DREP instruction in the D stage ends. Since the decoding of the DREP instruction terminates in the clock cycle T3, the data processor performs the instruction I4 fetch in the clock cycle T4. By the execution of the DREP instruction, the RPT_E, the TRPT_E and the RP bit of the PSW latch 222 are set in the clock cycle T3. Accordingly, the data processor of this embodiment is capable of performing repeating processing with the contents set by the delayed repeat instruction, starting with the fetch of the instruction I4 that is the first instruction of the repeat block.

In the above example of processing, 10 instructions in the repeat block are executed. During the repeat processing (when the RP bit 43 of the PSW latch 222 is "1"), each time the instruction fetch unit 102 fetches the 32-bit instruction code, the decrementor 816 of the PC unit 118 decrements by 1 the value transferred to the TRPT_C register 814 via the latch 815, and the decremented value is written back to the TRPT_C register 814. And, the 1 detector 817 decides whether the value held in the TRPT_C register 814 is "1". When the instruction of the repeat block is executed during the repeat processing, the decrementor 813 decrements by 1 the value held in the TRPT_C register 814 in the last clock cycle during which each 32-bit instruction is processed, and the decremented value is written back to the TRPT_C register 814. (During processing of the instruction I3 the above-mentioned value is not decremented.) Then the value in the RPT_C register 811 is transferred to the latch 818. Until the value held in the TRPT_C register 814 goes to "1" the repeat processing of the repeat block is continued as in Embodiment 1. The repeat processing method for the repeat block in this embodiment is the same as in Embodiment. When the values held in the RPT_E register 186 and in the IA register 181 coincide with each other, the PC unit 118 transfers, as the address of the instruction to be fetched next, the value held in the latch 185 to the IA register 181 via the JA bus 323, switching the instruction fetch sequence.

The instruction, which is fetched when the value held in the TRPT_C 814 is "1", is the instruction to be executed last in the repeat block, that is, the repeat-processing last instruction. Accordingly, in this instance the instruction to be fetched next is switched to the next instruction of the repeat block. The data processor of this embodiment switches the instruction processing sequence as in Embodiment 1. The PC unit 18 transfers the value held in the latch 174 to the IA register 181 via the JA bus 323 under the control of the control unit 112. The value held in the TRPT_C register 814 is decremented by 1 by the decrementor 816 even at the time of fetching the repeat-processing last instruction. During the execution of the repeat-processing last instruction the control unit 112 clears the RP bit 43 of the PSW latch 222 to zero.

The data processor achieves correct repeat processing even when the repeat-processing last instruction is the repeat block start instruction or repeat-processing last instruction.

Further, the repeat-block last instruction information and the repeat-processing last instruction information are transferred in synchronization with the pipeline processing of the corresponding instruction, and the transferred information is used to update the NPC 191 or clearing the RP bit of the PSW latch 222 to zero. At the time of processing the instruction I3 immediately after the DREP instruction, the data processor controls the processing of the instruction in the E stage 403 so that the value RPT_C is not decremented.

When a jump occurs in the E stage 403, the PC unit 118 transfers the value held in the RPT_C register 811 to the TRPT_C register 814 via the latch 818. Hence, when the jump is inhibited in the repeat block, this transfer path is unnecessary.

As described above, according to this embodiment, the repeat-block processing end decision is made by managing the number of instructions to be executed in the repeat block. Accordingly, the data processor of this embodiment is applicable in the case where the number of instructions to be executed is dependent on data, for example, in the case where a conditional branch is caused during the repeat processing; hence, it is necessary to inhibit the repeat processing in such a case.

During the execution of the DREP instruction shown in FIG. 32, the control unit 112 transfers, in the first clock cycle, the number of instructions to be executed in the repeat block, which is specified by the immediate value data imm8-838 in FIG. 32, to the RPT_C register 811 and the TRPT_C register 814 via the transfer path from the PSW unit 221 to the D1 bus 311 depicted in FIG. 9. The other processing operations are exactly the same as in the case of the execution of the DREP instruction described above.

A variety of modifications may be made in Embodiment 6.

In this embodiment control is effected to keep the instruction I4 fetch from starting until after setting by the DREP instruction. By predecoding the fetched instruction and inhibiting the fetch of the repeat block start instruction until the RP bit of the PSW latch 222 is set after fetching the DREP instruction and the DREPI instruction, the embodiment is also applicable even in the case of using the size of the instruction queue and the instruction fetch control scheme that are different from those in this embodiment. Further, when the predecoding of the delayed repeat instruction is difficult in terms of timing, it is possible employ a delayed repeat instruction that provides a 2-instruction delay.

The values RPT_C, RPT_S and RPT_E may be set by any methods as long as required values can be set. For example, in the case of setting the value RPT_S in the RPT_S register 184, it is possible to set the output from the incrementor 193 in the register 184 via the D1 bus 311.

The data processor of this embodiment is intended for use in the case where the repeat block includes two or more instructions for the reasons given just below. That is, the setting of the RPT_S register 184 is followed by the transfer therefrom the value RPT_S to the latch 185, but when coincidence is detected by the comparator 187 in the instruction I4 fetch, the setting of the value RPT_S in the register 184 is not completed yet. For example, by making provision such that the value to be set in the RPT_S register 184 is also transferred via the JA bus 323 to the IA register 181 when the comparator 187 detects coincidence in the instruction I4 fetch immediately after the execution of the DREP instruction, the data processor of this embodiment is applicable even if the repeat block includes only one instruction.

Further, according to this embodiment, no interruption is accepted immediately after the DREP instruction. However, it is possible to get around the interruption-disabling constraint by a scheme in which information indicating the instruction immediately following the DREP instruction is held, for example, in the PSW in FIG. 2, and when an interruption is accepted immediately after the DREP instruction, the above-mentioned information is used, for one instruction (I3 in FIG. 33) succeeding the DREP instruction, to perform control to inhibit decrementing of the value held in each of the TRPT_C register 814 and the RTP_C register 811.

While in the above the value equal to the "number of instructions to be executed in the repeat block" has been described to be set in the RPT_C register 811 and the TRPT_C register 814, it is also recommended to set the "number of instructions to be executed in the repeat block −1" in the above registers and to substitute the 1 detector with a zero detector that decides whether the value RPT_C is zero. Alternatively, provision can be made to increment the value RPT_C from zero and to check the incremented value for coincidence with a preset number of instructions.

The data processor of this embodiment executes the DREP instruction or the like in two clock cycles due to hardware restraints, but additional provision of hardware permits execution of such an instruction in one clock cycle. On the contrary, reduction of the amount of hardware enables the DREP instruction to be executed in three or more clock cycles. Moreover, there is no need for setting all states by repeat instructions specifically prepared therefor, i.e. the DREP instructions, the state setting may be carried out using primitive instructions.

Although the two decrementors 816 and 813 are provided to update the values (count values held in the TRPT_C register 814 and the RPT_C register 811 in the IF stage 401 and the E stage 403 independently of each other, the decrementor 813 can be dispensed with by transferring the counter values from the IF stage 401 to the E stage 403 in synchronization with pipeline processing. This, however, requires additional transfer paths.

The data processor of this embodiment uses the delayed repeat instruction, but by setting the "number of instructions to be executed in the repeat block" as the value RPT_C and using a repeat instruction (not the delayed repeat instruction) of the specification that does not decrement the value RPT_C in the first instruction of the repeat block processing, it is possible, with substantially the same hardware structure as that of this embodiment, to implement unbroken execution of instructions without the need for delay control. In this case, however, since one instruction is fetched before setting of the repeat-associated registers by the repeat instruction, it is impossible to constitute the repeat block by one instruction or break the repeat processing by the execution of only one instruction.

As described above, according to this embodiment. The number of instructions to be executed in the repeat block is used to decide whether the processing of the repeat block breaks, and the repeat block is processed by executing the delayed repeat instruction (a delayed repeat) provided two or more instructions before the repeat block, instead of executing the repeat instruction immediately before the start of the repeat block. But the data processor produces the same effects as those by the data processor of Embodiment 1. That is, in the case where the repeat count undergoes a dynamic change and the repeat processing terminates prematurely halfway through the repeat block, this embodiment eliminates the overhead resulting from preprocessing/postprocessing for the decision on the repeat count and a branch, providing enhanced performance and permitting substantial reduction of the program size. Accordingly, it is possible to cut the cost for putting programs in the form of ROM chips and provide increased productivity in program development. Further, when the number of instructions of the repeat block to be executed can be set statically, that is, when the DEP instruction is usable, synchronous execution of load processing will increase the code efficiency and simplify the program used.

A wide variety of modifications may be made in the data processors of Embodiments 1 to 6.

The hardware technique according to the present invention, which is used to implement a break (switching of the instruction processing sequence) prematurely halfway through the repeat processing, is applicable not only to the data processors of the above-described embodiments but also to any data processors which perform the repeat processing, such as ordinary processors including a superscalar and DSP. Further, the present invention is not limited specifically to the pipeline configuration and instruction execution control schemes described above.

Moreover, the present invention uses repeat instructions specifically prepared for efficient setting of repeat-associated values as described above, but it is also possible to initialize the repeat-associated hardware resources by primitive instructions. Besides, according to the present invention, the repeat control is performed hardware-wise independently of the operations specified by instructions to be executed, but the invention is also applicable to data processors of the type that implement loop processing by an ordinary branch instruction or loop control instruction (a branch/jump instruction which involves decrementing the loop count value and deciding the count value).

Further, the method for implementing the repeat control by hardware can be determined taking into account the amount of hardware used (cost) and overhead which is contradictory to improving performance. The amount of hardware used may be decreased by imposing restrictions on the instructions executable in the repeat block or processible conditions (the number of instructions to be executed in the repeat block, the number of repetitions, and the like); alternatively, such restrictions may be lifted by adding hardware with the aim of providing enhanced performance. If the size of the repeat block is limited, there is no need for comparing all bits in the address comparison, too; hence, by comparing bits equal in number to the maximum size of the repeat block, the hardware cost may be cut.

Still further, any means can be used to implement the functions characteristic of the present invention. For example, as for the count value RPT_C or the like, it may be updated by increment from zero, instead of decrement from a preset value, for comparison with a predetermined value.

Still further, address comparison, advanced updating/decision of the count value, and switching of the instruction processing sequence may be performed at the instruction executing stage, not at the instruction fetch stage. This also permits reduction of the hardware cost. Since the sequence is switched at the instruction executing stage, however, overhead occurs by a branch, somewhat hindering improvement of performance.

As described above, any embodiments of the present invention implements, by hardware, a break (switching of the instruction processing sequence) prematurely halfway through the repeat processing. Accordingly, in the case where the repeat count undergoes a dynamic change and the repeat processing terminates prematurely halfway through the repeat block, it is possible to eliminate the overhead by a condition decision and preprocessing/postprocessing for a branch, providing enhanced performance and permitting substantial reduction of the program size. This allows cutting the cost for putting programs in the form of ROM chips and providing increased productivity in program development.

EFFECT OF THE INVENTION

According to an aspect of the present invention, the data processor comprises: detecting means implemented by hardware, for detecting a break of repeat processing in a repeat block independently of an operation specified by an instruction being executed; and instruction execution inhibit means responsive to the detection of the break of the repeat processing by the detecting means to inhibit the execution of the remaining instructions in the repeat block. Hence, it is possible to eliminate the overhead by a condition decision and preprocessing/postprocessing for a branch, providing enhanced performance and permitting substantial reduction of the program size. This permits reduction of the cost for putting programs in the form of ROM chips and providing increased productivity in program development.

According to another aspect of the present invention, the instruction execution inhibit means is means implemented by hardware for converting the remaining instructions in the repeat block to no operation instructions upon detection of the break of the repeat processing by the detecting means. Hence, it is possible to eliminate the overhead by a condition decision and preprocessing/postprocessing for a branch, providing enhanced performance and permitting substantial reduction of the program size. Further, since the remaining instructions in the repeat block are merely rendered to no-operation form, the hardware cost can be further reduced.

According to another aspect of the present invention, the instruction execution inhibit means is instruction processing sequence switching means for switching the instruction processing sequence to the next instruction of the repeat block at an instruction fetch stage upon detection of the break of the repeat processing by the detecting means. Hence, it is possible to eliminate the overhead by a condition decision and preprocessing/postprocessing for a branch, providing enhanced performance and permitting substantial reduction of the program size.

According to another aspect of the present invention, the instruction execution inhibit means is instruction processing sequence switching means for switching the instruction processing sequence to the next instruction of the repeat block at an instruction execution stage upon detection of the break of the repeat processing by the detecting means.

Hence, it is possible to eliminate the overhead by a condition decision and preprocessing/postprocessing for a branch, providing enhanced performance and permitting substantial reduction of the program size.

According to another aspect of the present invention, the instruction processing sequence switching means is means for performing jump processing to the next instruction of the repeat block during execution of last instruction that is executed last in the repeat processing of the repeat block. Hence, it is possible to eliminate the overhead by a condition decision and preprocessing/postprocessing for a branch, providing enhanced performance and permitting substantial reduction of the program size.

According to another aspect of the present invention, the instruction processing sequence switching means is means for performing jump processing to the next instruction of the repeat block after execution of the last instruction that is executed last in the repeat processing of the repeat block. Hence, it is possible to eliminate the overhead by a condition decision and preprocessing/postprocessing for a branch, providing enhanced performance and permitting substantial reduction of the program size.

According to another aspect of the present invention, the instruction processing sequence switching means is means for performing jump processing to the next instruction of the repeat block after execution of the last instruction that is executed last in the repeat processing of the repeat block. Hence, it is possible to eliminate the overhead by a condition decision and preprocessing/postprocessing for a branch, providing enhanced performance and permitting substantial reduction of the program size.

According to another aspect of the present invention, the detecting means has count means for counting the number of repetitions of processing of the repeat block, and comparison means for comparing the address of the instruction to be currently executed in the repeat block with the address of the last instruction to be executed last. Upon being informed from the comparison means of the coincidence of address between the current and last instructions when the count number of the count means has reached a predetermined value, the detecting means decides that the repeat processing breaks. Hence, it is possible to eliminate the overhead by a condition decision and preprocessing/postprocessing for a branch, providing enhanced performance and permitting substantial reduction of the program size.

According to another aspect of the present invention, the detecting means is means for deciding whether the repeat processing breaks, based on the number of instructions to be executed during repeat processing of the repeat block. Hence, it is possible to eliminate the overhead by a condition decision and preprocessing/postprocessing for a branch, providing enhanced performance and permitting substantial reduction of the program size.

According to another aspect of the present invention, the detecting means has count means for counting the number of instructions executed in the repeat block, and decides that the repeat processing breaks when the count number of the count means reaches a predetermined value. Hence, it is possible to eliminate the overhead by a condition decision and preprocessing/postprocessing for a branch, providing enhanced performance and permitting substantial reduction of the program size.

According to still another aspect of the present invention, the detecting means has first count means for counting the number of repetitions of processing of the repeat block and second count means for counting the number of instructions executed in the repeat block, and the detecting means decides that the repeat processing breaks when the count number of the first count means reaches a first predetermined value and the count number of the second count means reaches a second predetermined value in the last repeat processing of the repeat block. Hence, it is possible to eliminate the overhead by a condition decision and preprocessing/postprocessing for a branch, providing enhanced performance and permitting substantial reduction of the program size.

What is claimed is:

1. A data processor with a hardware repeat function which executes a repeat block composed of plural instructions N times (N is an integer equal to or more than 0) repeatedly, and stops the repeat processing after processing a designated instruction in a N+1 th repeat processing, independently of an operation specified by an instruction being executed, said data processor comprising:
    a detecting unit for detecting that a processing instruction is said designated instruction and the repeat processing breaks after said designated instruction has been completed;
    a first instruction processing sequence switching unit to switch the instruction processing sequence to a first instruction within the repeat block after a last instruction in the repeat block has been completed when the repeat processing is made to continue by a detection result of said detecting unit; and
    a second instruction processing sequence switching unit to inhibit fetching of remaining instructions within the repeat block after completion of said designated instruction and to make fetching of a next instruction outside of said repeat block when the repeat processing is made to break by the detection result of said detecting unit.

2. A data processor with a hardware repeat function which executes a repeat block composed of plural instructions N times (N is an integer equal to or more than 0) repeatedly, and stops the repeat processing after processing a designated instruction in a N+1 th repeat processing, independently of an operation specified by an instruction being executed, said data processor comprising:
    a detecting unit for detecting that a processing instruction is said designated instruction and the repeat processing breaks after said designated instruction has been completed;
    a first instruction processing sequence switching unit to switch the instruction processing sequence to a first instruction within the repeat block after a last instruction in the repeat block has been completed when the repeat processing is made to continue by a detection result of said detecting unit; and
    a second instruction processing sequence switching unit to perform a jumping process to a next instruction outside of said repeat block by hardware, in parallel to executing said designated instruction and independently of an operation specified by said designated instruction when the repeat processing is made to break by the detection result of said detecting unit.

3. A data processor with a hardware repeat function which executes a repeat block composed of plural instructions N times (N is an integer equal to or more than 0) repeatedly, and stops the repeat processing after processing a designated instruction in a N+1 th repeat processing, independently of an operation specified by an instruction being executed, said data processor comprising:
- a detecting unit for detecting that a processing instruction is said designated instruction and the repeat processing breaks after said designated instruction has been completed;
- an instruction processing sequence switching unit to switch the instruction processing sequence to a first instruction within the repeat block after a last instruction in the repeat block has been completed when the repeat processing is made to continue by a detection result of said detecting unit; and
- an instruction execution inhibit unit to inhibit execution of following instructions after said specific instruction within said repeat block,
- wherein said detecting unit includes a detecting part that detects the processing is said N+1 th repetition of said repeat block and another detecting part that detects the processing instruction is said specified instruction based on address information of the processing instruction and address information related to said specified instruction which is designated beforehand.

4. A data processor with a hardware repeat function which executes a repeat block composed of plural instructions N times (N is an integer equal to or more than 0) repeatedly, and stops the repeat processing after processing a designated instruction in a N+1 th repeat processing, independently of an operation specified by an instruction being executed, said data processor comprising:
- a detecting unit for detecting that a processing instruction is said designated instruction and the repeat processing breaks after said designated instruction has been completed;
- an instruction processing sequence switching unit to switch the instruction processing sequence to a first instruction within the repeat block after a last instruction in the repeat block has been completed when the repeat processing is made to continue by a detection result of said detecting unit; and
- an instruction execution inhibit unit to inhibit execution of following instructions after said specified instruction within said repeat block,
- wherein said detecting unit detects whether said repeat processing is completed or not based on a number of instructions which are processed during repeat processing of said repeat block, and includes a first counter which counts a number to perform the repeat processing of said repeat block and a second counter that counts a number of processed instructions in said N+1 th repeat processing, and
- wherein said detecting unit detects completion of said repeat processing when a counter value of said first counter reaches a first predetermined value and a counted value of said second counter reaches a second predetermined value at the N+1 th repeat processing of said repeat block.

* * * * *